United States Patent
Tsunemiya et al.

(10) Patent No.: US 7,111,109 B2
(45) Date of Patent: Sep. 19, 2006

(54) CONTROL SYSTEM, RECORDING DEVICE AND ELECTRONIC APPARATUS

(75) Inventors: Takanobu Tsunemiya, Taichung (TW); Masanori Ohtsuka, Kanagawa (JP); Koji Ohshima, Kanagawa (JP); Yasuhiro Harada, Kanagawa (JP); Yoshiaki Honda, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 602 days.

(21) Appl. No.: 10/383,950

(22) Filed: Mar. 7, 2003

(65) Prior Publication Data

US 2003/0182520 A1    Sep. 25, 2003

(30) Foreign Application Priority Data

Mar. 13, 2002 (JP) .............................. 2002-067766
Apr. 23, 2002 (JP) .............................. 2002-120248
Jul. 31, 2002 (JP) .............................. 2002-222855

(51) Int. Cl.
*G06F 12/00* (2006.01)

(52) U.S. Cl. .................... 711/103; 713/300; 713/323; 713/324

(58) Field of Classification Search .................. None
See application file for complete search history.

(56) References Cited

U.S. PATENT DOCUMENTS

| | | | |
|---|---|---|---|
| 5,565,957 A * | 10/1996 | Goto | 396/48 |
| 5,696,718 A * | 12/1997 | Hartmann | 365/185.27 |
| 6,243,321 B1 * | 6/2001 | Banks | 365/233 |
| 6,266,279 B1 * | 7/2001 | Yoshimura | 365/185.24 |
| 6,359,809 B1 * | 3/2002 | Tedrow et al. | 365/185.29 |
| 6,414,873 B1 * | 7/2002 | Herdt | 365/185.08 |
| 6,714,457 B1 * | 3/2004 | Hsu et al. | 365/185.28 |
| 6,809,965 B1 * | 10/2004 | Rosendale | 365/185.18 |
| 6,920,066 B1 * | 7/2005 | Pascucci et al. | 365/185.03 |
| 2001/0005878 A1 * | 6/2001 | Sasaki et al. | 711/154 |
| 2002/0156539 A1 * | 10/2002 | Ahn | 700/5 |

* cited by examiner

*Primary Examiner*—Reginald Bragdon
*Assistant Examiner*—Horace L. Flournoy
(74) *Attorney, Agent, or Firm*—Cowan, Liebowitz & Latman, P.C.

(57) ABSTRACT

A control system comprises multiple memories consuming different current amounts for operation, wherein multiple programs corresponding to different functions are stored in the memories, wherein, in accordance with a function to be processed by an operating circuit, one of the programs is read from one of the memories and is processed, and wherein, from a specific memory for which the current consumed during an operation is equal to or smaller than a predetermined amount, the operating circuit reads and executes one of the programs that performs a function for which an operating time period is equal to or greater than a predetermined value.

13 Claims, 41 Drawing Sheets

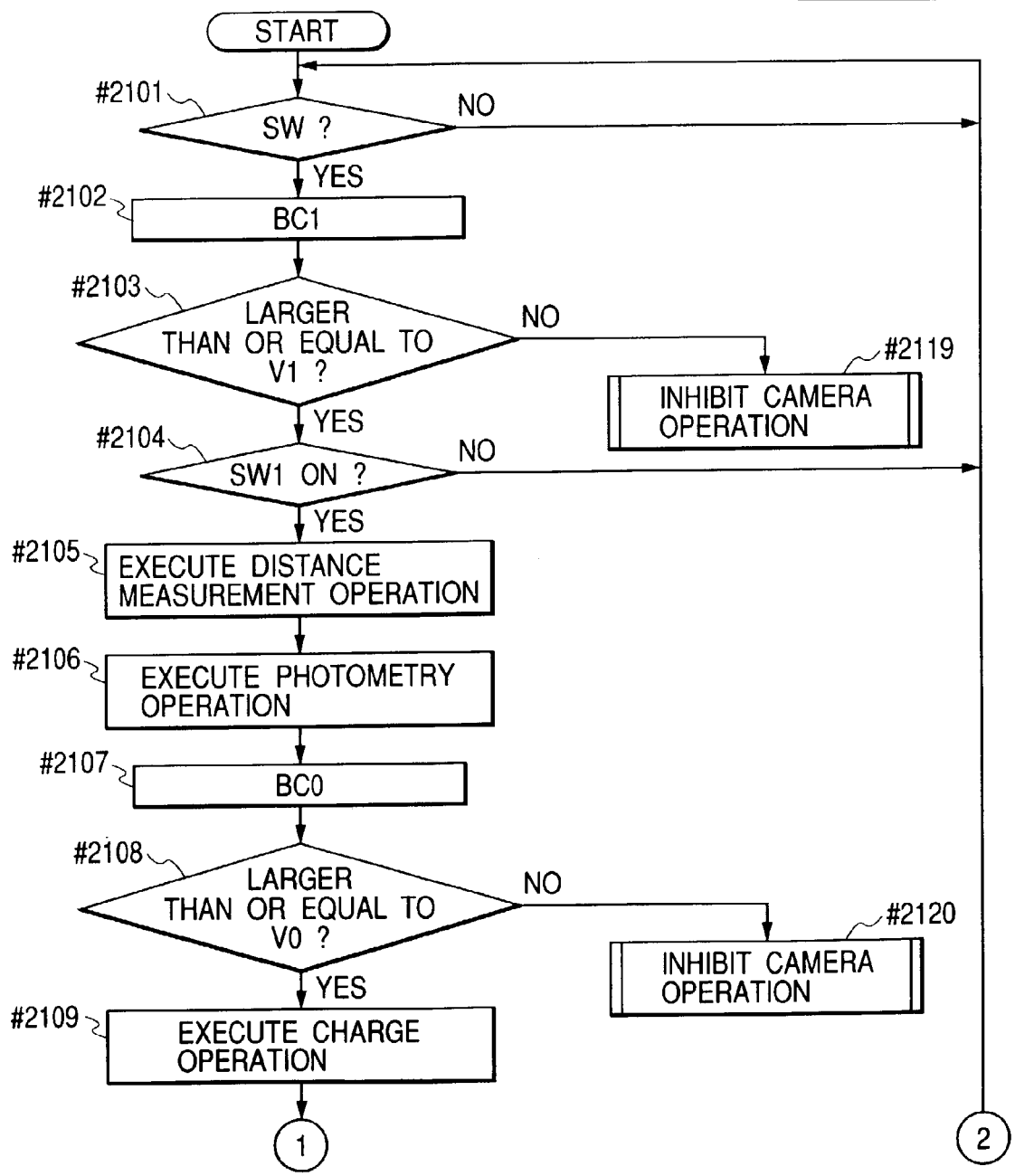

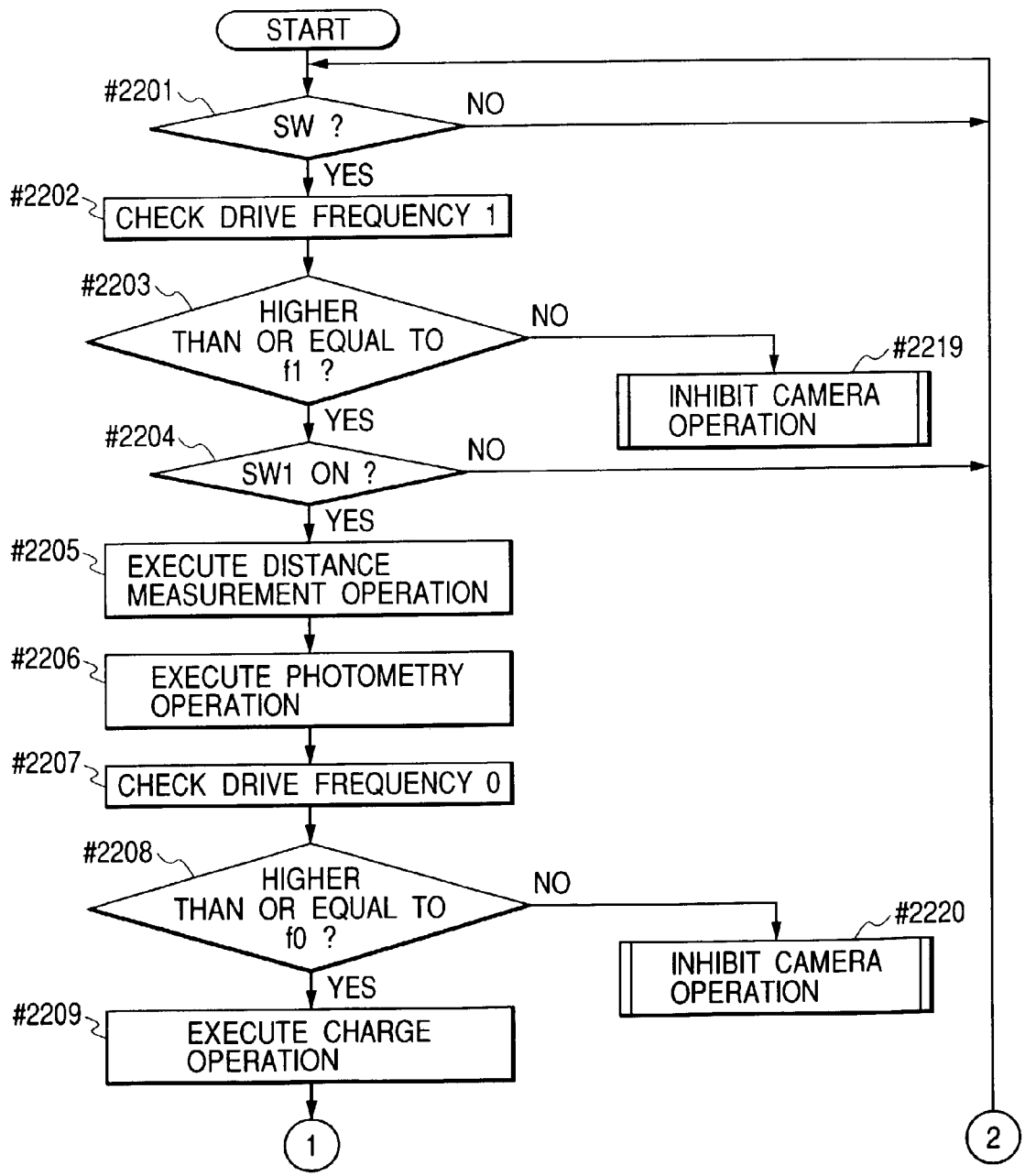

CONTROL SYSTEM, RECORDING DEVICE AND ELECTRONIC APPARATUS

BACKGROUND OF THE INVENTION

1. Field of the Invention

The present invention relates to a control system for reading out a program in a more preferable state from a plural memories stores the program used for causing an electronic apparatus to be operated processing, to an electronic apparatus therefor, and to a recording device wherein the plural memories are included.

2. Related Background Art

Conventionaly, within the semiconductor storage device field, the use has been proposed of a variety of memory devices (hereafter referred to as memories). Included in these proposed memories are various semiconductor devices, such as mask ROMs, EPROMs, EEPROMs and flash memories.

For instance, since for microcomputers used for controlling electronic apparatuses such as cameras, compact size and the frugal use of space are prerequisites, one-chip microcomputers for which memory and peripheral devices are mounted on a single chip are frequently employed. Recently, since the sizes of programs and the data memory capacities have been increased as the functions provided for cameras have become more varied and enhancements have been added, electrically rewritable memories having large capacities are demanded, and one-chip microcomputers that incorporate electrically rewritable flash memories, as well as mask ROMs and RAMs, have gradually come to be employed.

As an example, proposed is a system wherein a program for operating a microcomputer is stored in a read only memory (a mask ROM) and is executed to operate the microcomputer, or a system wherein such a program is stored in an electrically rewritable read only memory so as to cope with a bug in the program.

In addition, also proposed is a microcomputer that includes an electrically rewritable read only memory and a read only memory. In this case, parameters for individual controllers are stored in the rewritable memory, i.e., parameters are stored that are obtained by adjusting variances in manufacturing procedures and individual performances, so that individual products can be provided for which the performances are uniform with little manufacturing variances.

A camera system using multiple memories, including a flash memory, is actually disclosed in Japanese Patent Application Laid-Open No. 2000-89090. This system employs a flash memory and an EEPROM, and a large amount of data for which rewriting is not required, or is seldom required is stored in the flash memory, while a small amount of data for which rewriting is frequently performed is stored in the EEPROM. In this manner, the multiple memories can be employed efficiently without reducing their service lives. Also disclosed in U.S. Pat. No. 5,678,082 is a system wherein a flash memory is divided into multiple blocks, and means for rewriting data only in a specified block is provided. In this manner, a program can be easily changed without requiring the rewriting of the contents in all the areas of the flash memory. Furthermore, disclosed in Japanese Patent Application Laid-Open No. 6-168599 is a configuration wherein a flash memory and a mask ROM are employed (overall, the configuration is regarded as a virtual flash memory) and wherein data that will not be rewritten are stored in the mask ROM and data that can be rewritten are stored in the flash memory. In this manner, an inexpensive flash memory is provided for which the writing time is reduced. And proposed in U.S. Pat. No. 5,565,957 is a camera comprising switching means for, only during the writing process, rendering a flash memory conductive by supplying writing power.

However, all of these conventional examples are provided in accordance with the writing characteristic of nonvolatile memory, and while memory types are devised that depend on the data to be written or on the size of a program, in no proposal are there included other memory characteristics, such as an operating voltage (=operating current consumption) and an operating frequency. Especially for battery operated apparatuses, such as cameras, an often repeated request is for the provision of efficient control for their operation, and the reduction, to the extent possible, of their consumption of power.

Furthermore, in the above conventional examples, no consideration is given to the use of power control for executing a control program stored in flash memory. And while after the flash memory is rendered conductive a constant rising time is required before the reading and writing enabled state is reached, no consideration is given in the conventional examples to the falling time for the conductive memory. It is expected that flash memory will be used as electrically rewritable memory having a large capacity; however, for a battery-operated apparatus, such as a camera, the level of current consumed by flash memory is such that a conductive state can not be constantly maintained, and thus, from a viewer's perspective, the consumption of power must be reduced as much as possible. Whereas, an increase in operating speed is also required to improve usability and to reduce a release time lag, and the control provided for a camera must be optimized in order that low current consumption can be implemented while there is no deterioration of the usability.

In addition, according to the above conventional examples, in a case wherein control programs for the individual functions of a camera are to be stored in memories and wherein there is a memory switch each time there is a change to a different function, when before and after a memory change the operating voltage or the operating frequency differ greatly, time is required to reach a voltage or a frequency that can adequately support the operation of the selected memory. In some cases, when a memory change occurs while the voltage or the frequency is still within a range wherein the operation is disabled, an erroneous camera operation will occur. Since especially for such camera functions as a strobe function and an autofocusing function for which there is a large difference in the operating voltage or the frequency, when a change is made from the strobe operation, for which the voltage drops greatly, to the autofocusing function, for which a fast operation is required, a failure in the operating sequence of the camera will occur. However, while in the conventional examples consideration is given to the size of the data that is to be employed, the data rewriting speed, the size of the memory and the data contents to be written, no consideration is given to the operating conditions for the individual memories that are to be employed. Therefore, control of the memories must be exercised under power conditions that ensure all the memories can be employed, and the efficiency with which this control is exercised is not always adequate for an apparatus, such as a camera, that uses a battery. Thus, when a predetermined camera operation is performed for which the power voltage drops precipitously, a power state will exist wherein the operation of a specific memory is guaranteed while the operation of another memory is not. In this case, so long as the camera operation can be performed only by the operation of the memory that is guaranteed, the camera can be operated at a lower voltage. However, for a system, such as an inexpensive compact camera for which a battery voltage is directly supplied to power a microcomputer, it is demanded that a stable camera operation be guaranteed even when the power source voltage is lowered.

SUMMARY OF THE INVENTION

It is one feature of the present invention to provide a control system and an electronic apparatus, wherein the location of a memory for storing a control program is changed as needed in accordance with the power consumed for the operation, the time available for rewriting and the operating speed, so that control of various functions can be exercised under optimal conditions.

It is another feature of the present invention to provide a control system and an electronic apparatus wherein, when a control program for accessing multiple nonvolatile storage means during being operated is to be executed, a reduction in the speed at which the access operation is performed can be prevented, and wherein, during the execution of the control program, the current consumed by all the nonvolatile storage means can be reduced as much as possible.

It is an additional feature of the present invention to provide a control system and an electronic apparatus wherein, when performing a shift between memories and a predetermined process, an operation for making the operation corresponding to the operating conditions of shifted memory is executed before the shift between memories, thereby ensuring that an operation is smoothly performed under an operating condition of any of the individual memories, and wherein, during memory shifting, either the performance of an erroneous operation can be prevented or an operation can be performed for the electronic apparatus that fully demonstrates the function of a memory after shifted.

DETAILED DESCRIPTION OF THE PREFERRED EMBODIMENTS

The preferred embodiments of the present invention will now be described in detail while referring to the accompanying drawings.

First, an explanation will be given for the configuration for employing the relationship of the amount of current that is consumed, the available rewriting times and the operating speed to be changed so as to appropriately change the location of the memory used for storing a control program.

Figure 1:
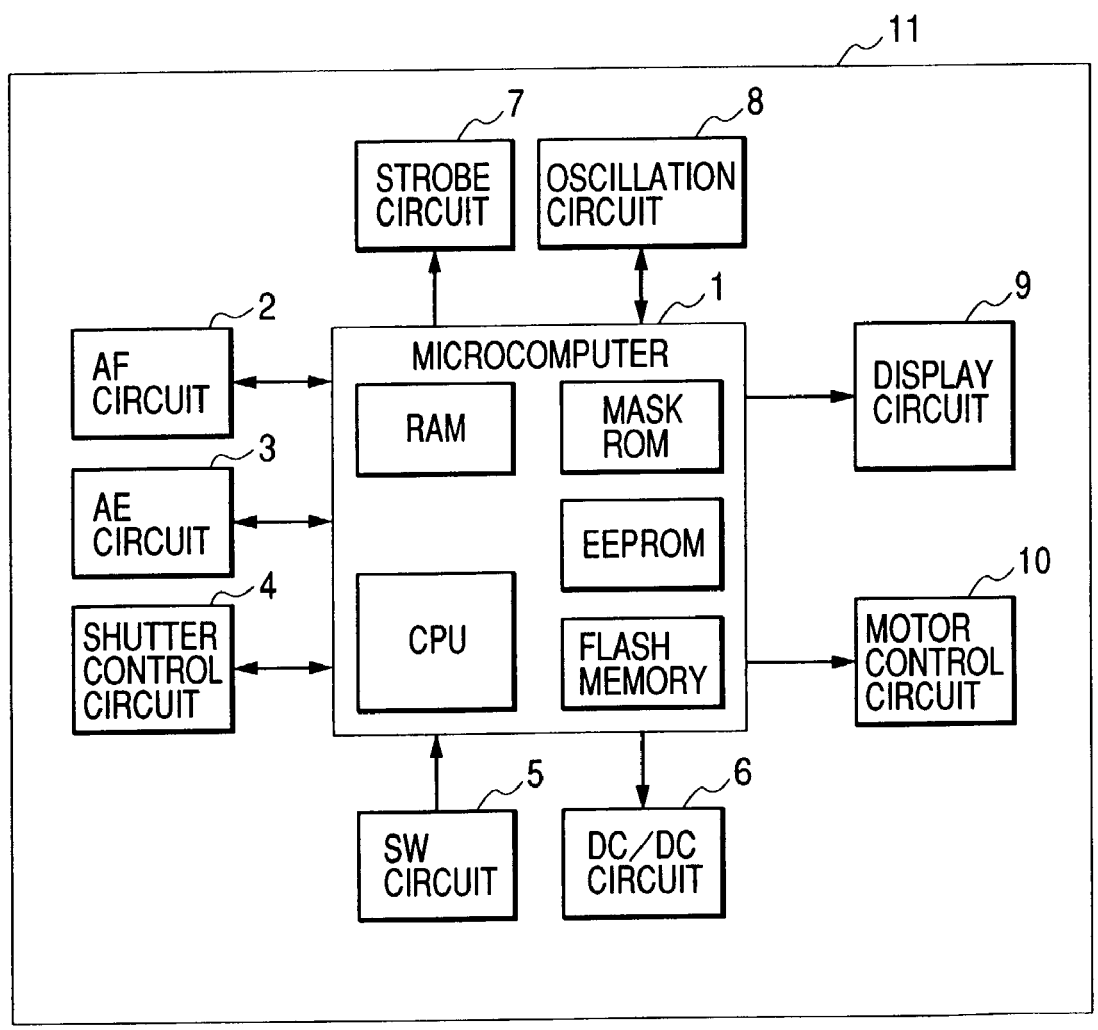
FIG. 1 is a block diagram showing the essential configuration of a camera IC system according to a first embodiment to a fourth embodiment of the present invention.

FIG. 1 is a schematic block diagram showing the configuration of a camera system according to a first embodiment to a fourth embodiment of the present invention.

A one-chip microcomputer 1, which is control means for controlling various operations of a camera 11, comprises a central processing unit (CPU), a mask ROM, an EEPROM, a flash memory, a RAM and peripheral circuits (not shown), and for storage has a data area, a program area and an I/O in the same memory. An AF circuit 2 employs a sensor for distance measurement or focal point detection to obtain data for the distance to an object or defocus data for an image taking lens, and focuses the image taking lens based on the obtained data. An AE circuit 3 obtains object brightness data using a photometry sensor, and performs an exposure control from an information based on the object brightness data. A shutter control circuit 4 opens or closes a shutter. A switch (SW) circuit 5 includes switches SW1 and SW2 for starting an image taking operation, and a switch for setting the individual photography modes.

A DC/DC circuit 6 transforms a power voltage into a predetermined voltage and supplies the predetermined voltage to the individual circuits. A well known strobe circuit 7 charges a main capacitor to perform strobe emission. An oscillation circuit 8 supplies a clock for the microcomputer 1, and generates two operating clocks, one fast and one slow. A display circuit 9 made of liquid crystal displays the remaining battery power and various photographic data, generates a warning and the like. A motor control circuit 10 controls a feed motor for winding or rewinding a film, and a barrel drive motor.

Before an explanation is given for each embodiment, the general characteristics of the individual memories provided for the camera system will be described while referring to FIGS. 6 to 8. In these graphs, the vertical axis represents an operating frequency and the horizontal axis represents an operating voltage.

Figure 6:
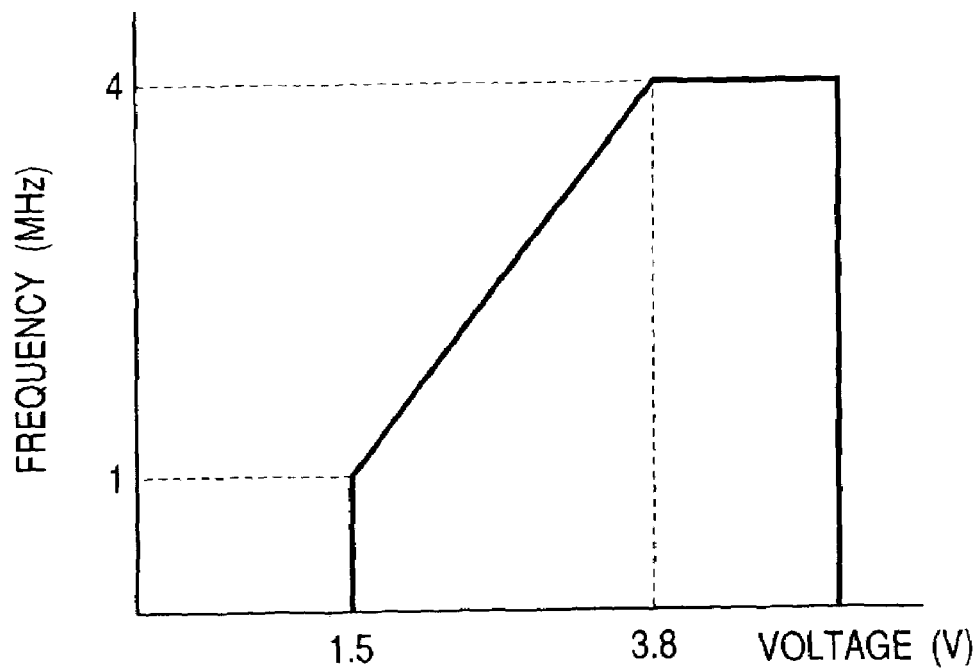
FIG. 6 is a graph showing an operating voltage-operating frequency characteristic for a mask ROM according to the first embodiment to the fourth embodiment of the present invention.

FIG. 6 is a graph showing the characteristic of a mask ROM, and as a feature, the operating voltage is guaranteed up to 1.5 V while the operating frequency is low.

Figure 7:
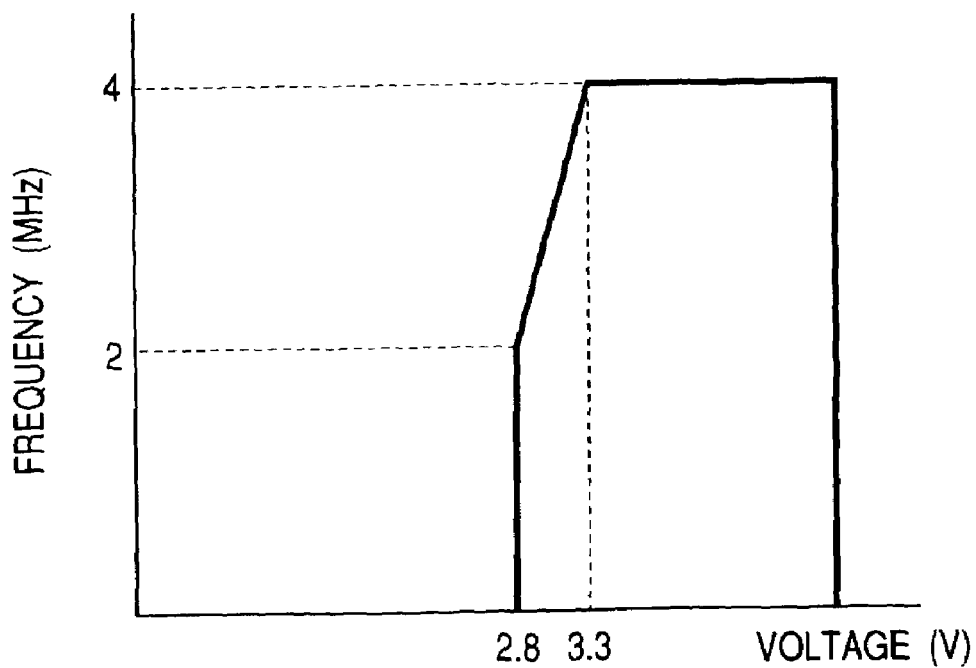
FIG. 7 is a graph showing an operating voltage-operating frequency characteristic for a flash memory according to the first embodiment to the fourth embodiment of the present invention.

FIG. 7 is a graph showing the characteristic of a flash memory, and as a feature, the operating frequency is high while the operating voltage is high, i.e., 2.8 V.

Figure 8:
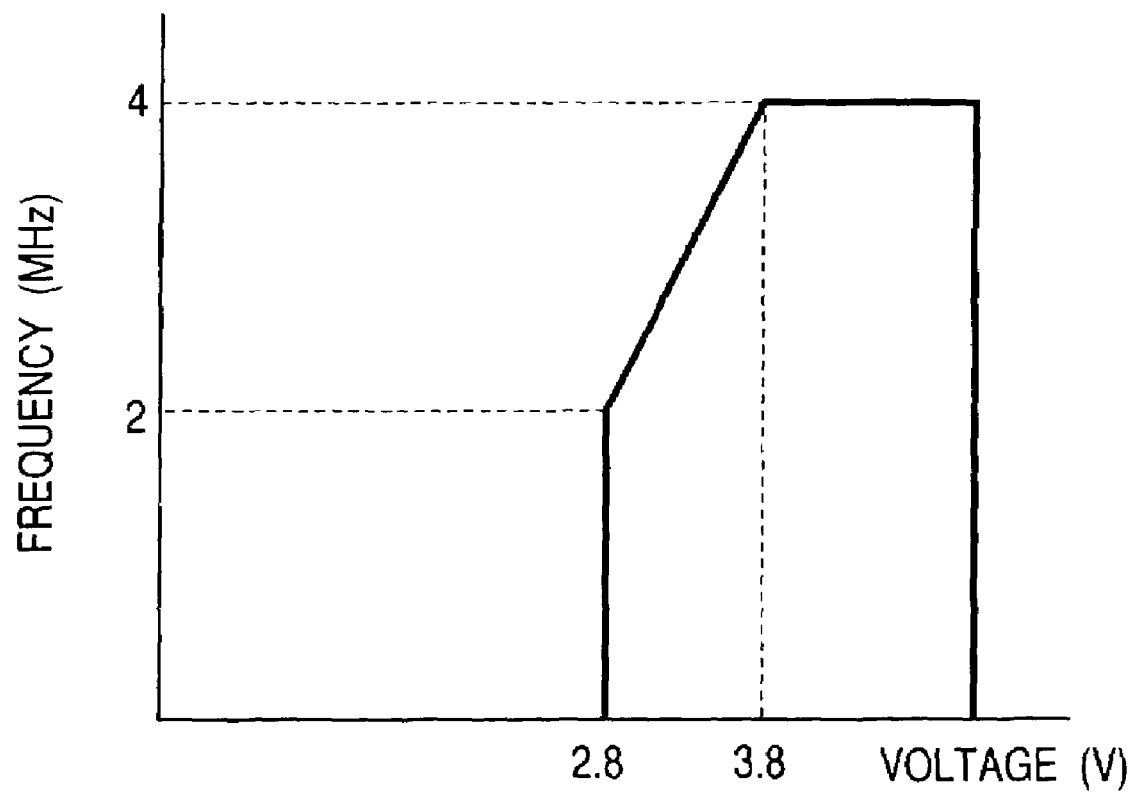
FIG. 8 is a graph showing an operating voltage-operating frequency characteristic for an EEPROM according to the first embodiment to the fourth embodiment of the present invention.

FIG. 8 is a graph showing the characteristic of an EEPROM. While the operating voltage and the operating frequency are similar to those of the flash memory, a difference is that only a small memory area can be accessed if the amount of data is small.

An explanation will now be given for the operation for selecting an appropriate memory, from among the example memories in FIGS. 6 to 8 in the microcomputer 1 of the thus arranged camera system, for storing a program that performs various functions for the camera (an operation for determining how the performance of a battery-operated apparatus, such as a camera, can be efficiently controlled while power consumption, for example, is reduced as much as possible).

While referring to the flowchart in FIG. 2, an explanation will be given for the operation of the first embodiment of the present invention for selecting an appropriate storage memory for a program that executes a timer function, one of the functions of the camera system.

As is well known, the timer function is continuously executed for counting time. In this case, it is preferable that the timer operation be continued, using limited power, for an extended period of time while ensuring that the power consumption is as small as possible.

Figure 2:
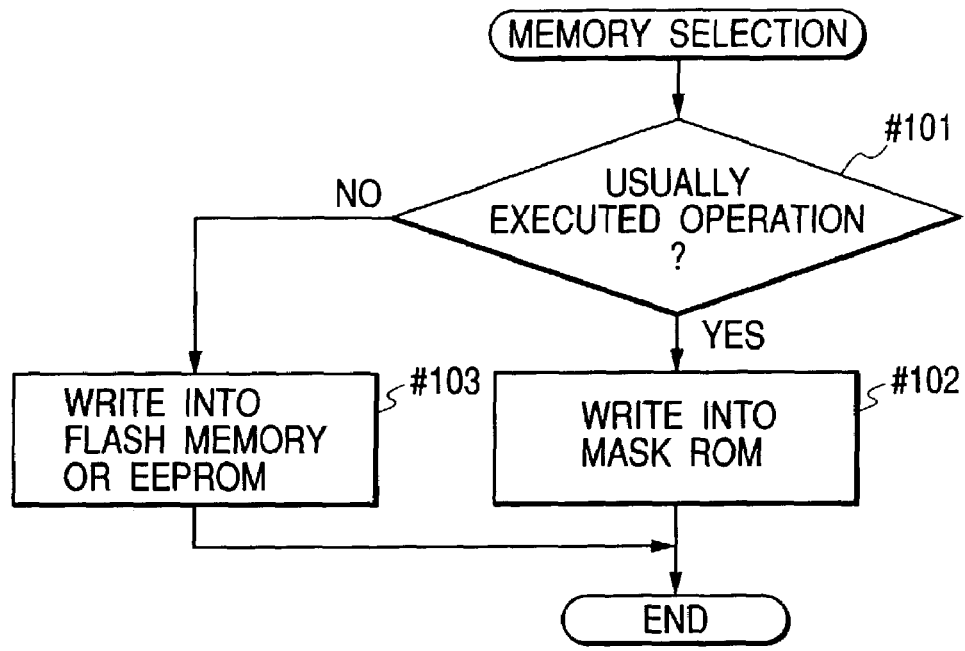
FIG. 2 is a flowchart showing a function according to the first embodiment and the processing for selecting a memory as a storage destination.

When the selection of a destination memory is started in accordance with the flowchart in FIG. 2, at step #101, a check is performed to determine whether the timer function is a function that usually is executed. Since the timer function is a function that usually is executed, program control advances from step #101 to step #102, and a program is written to the mask ROM, the characteristic of which, as represented in FIG. 6, is that it is a memory that consumes only a small current.

When a program is other than one used for a function such as the timer function that is usually executed, program control moves to step #103, and the program for this function is written to an appropriate memory, e.g., a flash memory having the characteristic represented in FIG. 7 or the EEPROM having the characteristic represented in FIG. 8.

As is described above, since it is preferable that usually the timer function be executed and that power consumption be minimized, to the extent possible, a program need only be stored in a memory (mask ROM) for which the power consumption is low, so that a timer function can be implemented that requires less battery power.

In addition, another function for which low power consumption should be required is one for monitoring a switching operation.

Furthermore, instead of a function that is usually executed, either a function that is continuously operated for at least a predetermined period of time or a function that is performed longer than other functions may be employed.

While referring to the flowchart in FIG. 3, an explanation will be given for the processing performed, for a second embodiment of the present invention, for determining an appropriate memory used for storing a program that executes an autofocusing function (hereinafter referred to as an AF function), one of the several functions of the thus arranged camera system.

The AF function is performed before the image taking operation starts, and if an especially long time is required to calculate distance measurement data or focal point detection data, this directly causes an image taking time lag (hereinafter referred to as a release time lag), and the image taking of a desired scene would be missed. In this case, it is preferable that the operation frequency also be fast, so as to increase the calculation speed.

Figure 3:
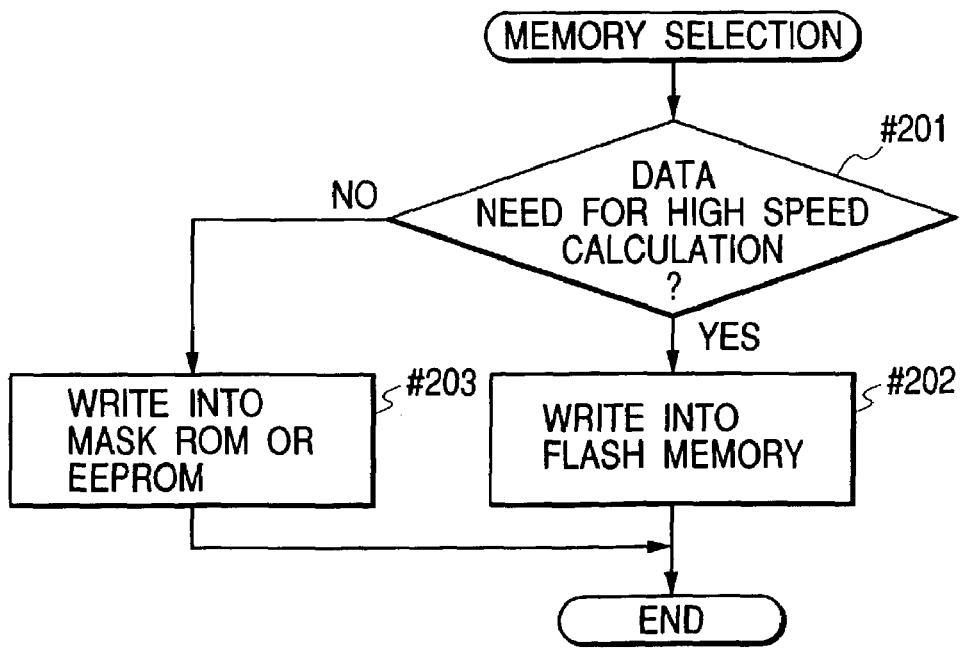
FIG. 3 is a flowchart showing a function according to the second embodiment and the processing for selecting a memory as a storage destination.

When the selection of a memory as a storage destination is initiated in the flowchart in FIG. 3, at step #201 a check is performed to determine whether the high speed calculation of data is required. For the AF function, because of the effect on camera usability, it is very preferable that the distance measurement results or the focal point detection results be output at high speed. Since a calculation speed that is as high as possible is required, program control advances from step #201 to step #202, whereat the AF function writes a program to a flash memory for which the calculation speed is high, even at a low voltage.

When a program is not for a function, such as the AF function, that requires the performance of high speed calculation, program control advances to step #203, and the program for the pertinent function is written to a corresponding appropriate memory, such as a mask ROM or an EEPROM.

As is described above, the program for the AF function need only be stored in a memory (flash memory) for which the calculation speed is high, so that a handy camera having a short release time lag can be implemented.

Another function for which the high calculation speed is preferable is a function such as a photometry function for which a predetermined processing speed or higher is required, or a function for which a processing speed is required that is higher than that for other functions.

While referring to the flowchart in FIG. 4, an explanation will be given for the processing for a third embodiment of the present invention for determining an appropriate memory used for storing a program that executes a film feeding function, one of the several functions of the camera system.

The film feeding function must rewrite film count (the number of taken images obtained) data. In this case, rewritable memory is desirable.

Figure 4:
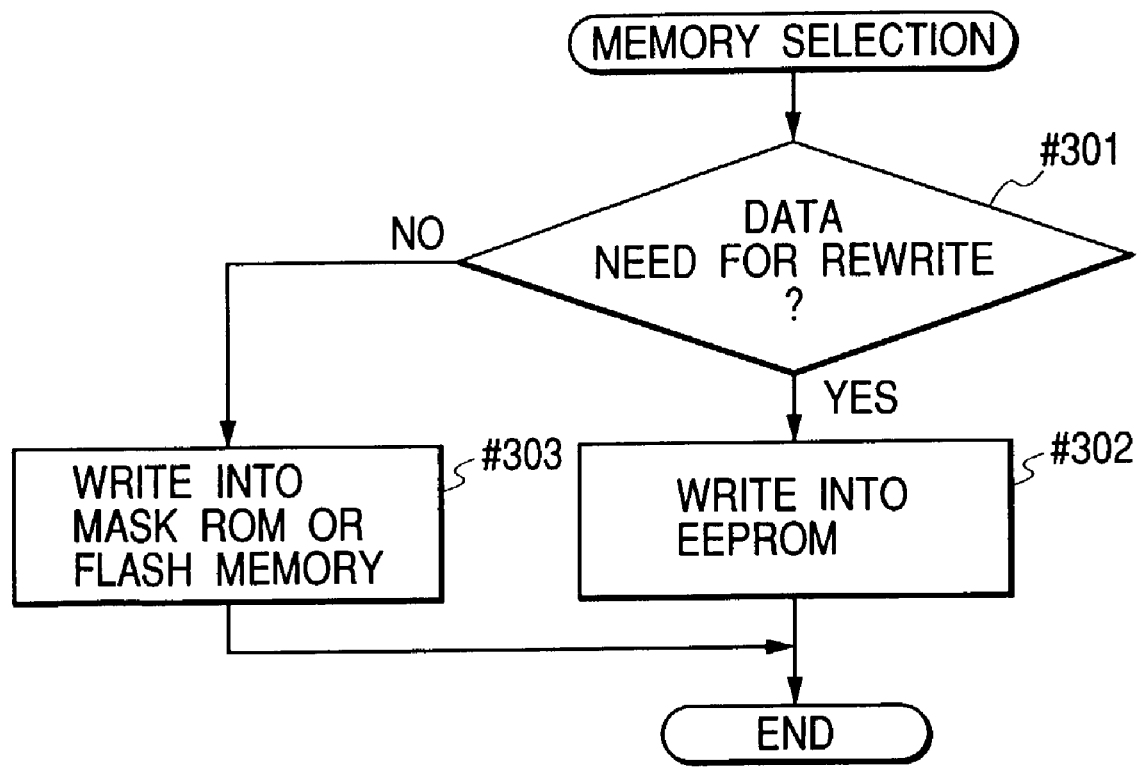
FIG. 4 is a flowchart showing a function according to the third embodiment and the processing for selecting a memory as a storage destination.

When the selection of a memory as a storage destination is initiated in the flowchart in FIG. 4, at step #301, a check is performed to determine whether the film feeding function is a usually executed function. Since for the film feeding function the rewriting is required of data such as film count data, a program is to be written to the EEPROM having the characteristic shown in FIG. 8.

When a program is not for a function, such as the film feeding function, for which data rewriting is required, program control moves to step #303, and the program for this function is written to an appropriate memory (a mask ROM or a flash memory).

As is described above, since film count data rewriting is required for the film feeding function requests, the program for this function need only be stored in a memory (EEPROM) for which data rewriting is enabled many times. As a result, the film feeding function that maintains the film count data can be provided, when film is present in the camera.

Other than the film feeding function, a function that permits data rewriting at least a predetermined number of times, or a function that permits the rewriting of data a greater number of times than the other functions, may be applied.

While referring to the flowchart in FIG. 5, an explanation will be given for the processing, for a fourth embodiment of the present invention, for determining appropriate memories to be used for storing the individual programs that execute the timer function, the film feeding function and the AF function of the camera system.

First, an explanation will be given for the timer function. As is well known, the time is measured by continuously operating the timer function. In this case, it is preferable that the power consumed by the timer function be as small as possible, in order that the timer operation may be continued for an extended period of time using only a limited amount of power.

Figure 5:
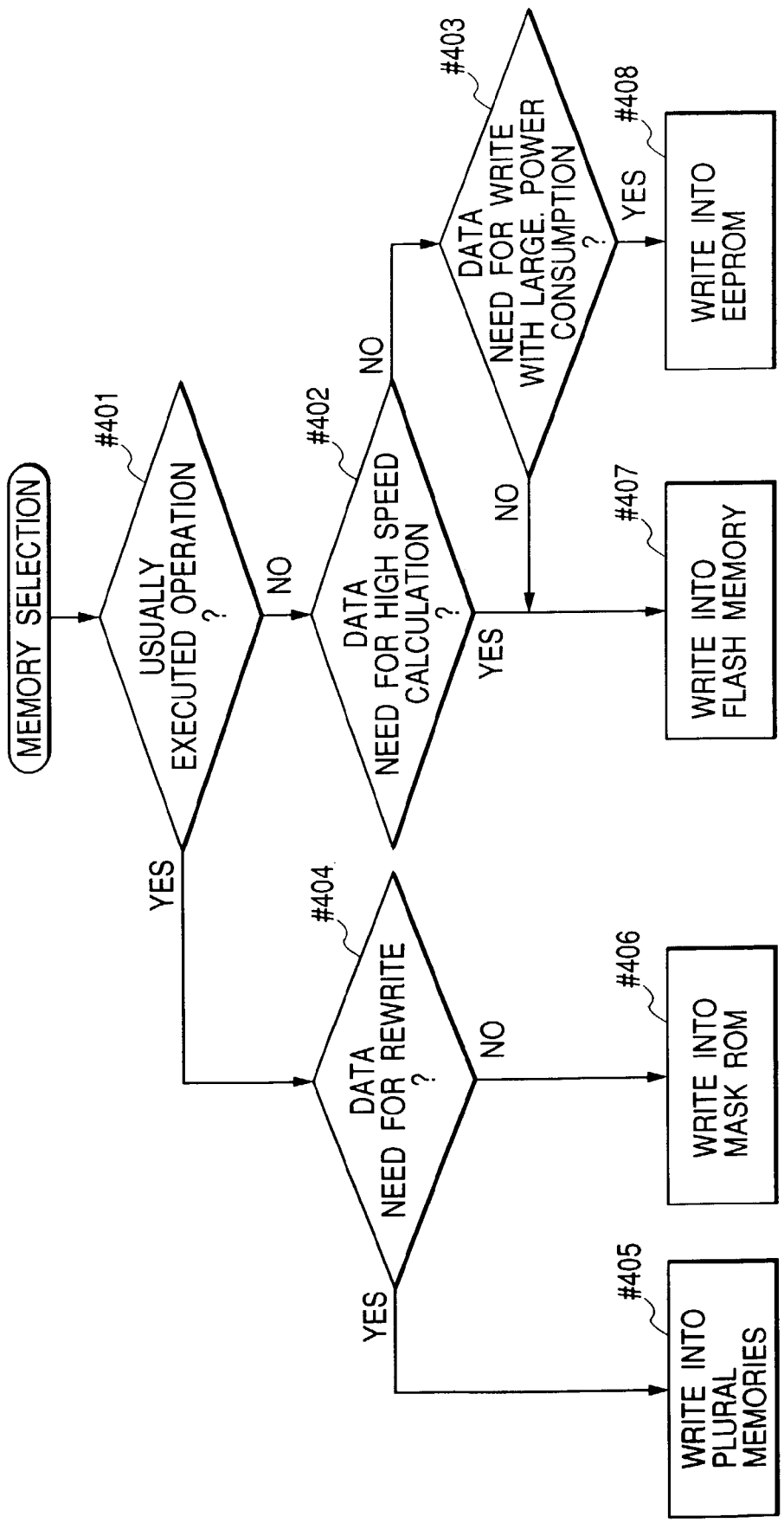
FIG. 5 is a flowchart showing various functions according to the fourth embodiment and the processing for selecting a memory as a storage destination.

When the selection of a memory as a storage destination is initiated in the flowchart in FIG. 5, first, at step #401 a check is performed to determine whether the timer function is one that is usually executed. Since the timer function is one that is usually executed, program control advances from step #401 to step #404 and a check is performed to determine whether data rewriting is necessary. It should be noted that data to be rewritten is data that should be stored even when the power is off. When data rewriting is not necessary, program control advances from step #404 to #406 and the program for the timer function is written to the mask ROM having the characteristic in FIG. 6, which indicates that the power consumption for this memory is small.

When it is desired that data for a year, a month, a day and a time be stored and retained when the power is off, as one method for accomplishing this, program control may move from step #404 to #405, whereat the program is stored in multiple memories and data are rewritten.

As is described above, since the timer function must be executed constantly and since the power consumption must be as small as possible, the program for this function is stored in a memory (mask ROM) for which power consumption is small, so that the timer function, for which the required battery power is low, can be implemented.

Next, an explanation will be given for the film feeding function. As is well known, the film feeding function is employed only when a film is loaded into the camera, or after the image taking operation has been performed. Further, since when film is fed a DC motor is driven, power consumption is comparatively large, while also taking film tension into account; however, the voltage will not be dropped. Further, the function for the rewriting of data, such as film count data, should also be included. In this case, while a high operating speed is not required, a rewritable memory that can be operated at a low voltage is preferable.

When the selection of a memory as a storage destination is initiated in the flowchart in FIG. 5, first, at step #401 a check is performed to determine whether the film feeding function is one that is usually executed. Since the film feeding function is not one that is usually executed, program control advances from step #401 to #402, whereat a check is performed to determine whether a high calculation speed is necessary. Since fast signal processing is not especially required for film feeding, program control moves from step #402 to #403, and a check is performed to determine whether during the operation the power consumption is large and whether data rewriting is required. As is described above, while the power consumption is large, this does not affect the power voltage, and the rewriting of data, such as film count data, is necessary. Thus, program control advances from step #403 to #408, and the program for this function is written to the EEPROM that has a data rewriting characteristic.

As is described above, although the film feeding function will reduce the available power voltage by driving the DC motor, this has no great effect. In addition, since the rewriting of film count data is also required, the program for this function need only be stored in the memory (EEPROM) for which data rewriting is enabled. As a result, the film feeding function can be provided that maintains the film count data, when film is present in the camera.

As well as the film feeding function, the power consumption for the strobe control function is large, while a high calculation speed is not required. In this case, program control moves from step #403 to #407, and a program for this function is stored in a memory (flash memory) that can be operated at a low voltage.

An explanation will now be given for the AF function. The AF function is performed before the image taking operation, and when a long time is required for calculating the distance measurement data or the focal point detection data, this directly causes the image taking time lag, and image taking of a desired scene would be missed. In this case, it is preferable that the operating frequency be high in order to increase the calculation speed.

When the selection of a memory as a storage destination is initiated in the flowchart in FIG. 5, first, at step #401 a check is performed to determine whether the AF function is one that is usually executed. Since the AF function is not one that is usually executed, program control advances from #401 to #402, and a check is performed to determine whether a high calculation speed is required. For the AF function, it is preferable that the distance measurement results or the focal point detection results be output at high speed because of their effect on the usability of the camera. Therefore, since a high calculation speed is required, program control advances from step #402 to #407, and a program for the AF function is written to the flash memory for which the calculation speed is high.

As is described above, since the program for the AF function is stored in the memory (flash memory) for which the calculation speed is high, a handy camera having a short release time lag can be provided.

As is described in the first embodiment and the fourth embodiment, for functions such as the timer function and the switch monitoring function that must usually be executed, the programs for them need only be stored in (written to) a memory in the camera IC system, such as a mask ROM, that can be operated at a low voltage and at low power. As a result, the battery power that is consumed can be reduced until it is as small as possible.

That is, since the power consumption for a usually executed function must be as small as possible, the program for this function is stored in a mask ROM for which the power consumption is small (low operating voltage), so that the camera can be employed for an extended period of time.

In addition, as is described in the second embodiment and the fourth embodiment, for a function, such as the film feeding function, for storing the value of a film counter each time the film is wound, the program for this function need only be stored in a memory, such as an EEPROM, of the camera IC system in which data will not be erased even if data rewriting is performed many times. Therefore, the current state of the film can be maintained even when the battery is changed while film is loaded, and the state of the camera can be constantly obtained.

In other words, for the function for frequently rewriting the data in the memory, the program for this function is stored in a memory, such as the EEPROM, wherein data will not be destroyed or wherein data will be maintained even when data rewriting is performed frequently. As a result, a handy and safe camera that does not lose the data for the usage state of the camera can be provided.

Furthermore, as is described in the third embodiment and the fourth embodiment, for a function, such as the AF function (or the photometry function), that performs many complicated calculations, and that, since it takes time to control, directly causes a release lag time and deteriorates the usability of the camera, the program for this function is stored in a memory, such as a flash memory of the camera IC system, for which the operating speed is the highest. As a result, the calculation speed can be increased.

That is, when a camera operation that requires accuracy is to be performed, the program for this operation need only be stored in, for example, a flash memory that can be controlled even at a high operating speed, so that accurate calculations can be performed at high speed, the accurate distance to an object (further, the luminance of the object) can be calculated, and clear image taking is enabled.

According to these embodiments, when the relationship between multiple camera memories having different characteristics and various functions of camera is employed to change the storage destination of a program that performs a camera function, the optimal operating condition can be set. That is, when the memory for storing the control program is changed as needed based on the relationship existing among the power consumption, the available rewriting times and the operating speed, the various functions of the camera can be controlled under optimal conditions.

Therefore, the specifications for the camera, such as the number of different films that can be used, the release time lag and the usability, and the operability of the camera can be improved, so that a handy camera can be provided.

In the above embodiments, the memory for storing a program has been selected based on the operation characteristics of the individual functions of the camera. The individual memories used for storage may more precisely be partially changed as needed.

Further, the camera has been employed for the embodiments of the invention; however, in addition to the camera, the present invention can also be applied for a system that comprises multiple memories having characteristics that differ in at least one of the amount of power consumed, the operating speeds and the available rewriting times, and the various function that differ in operation characteristics, such as the power consumption or the operating speed.

An explanation will now be given for the configuration that can prevent a reduction in the operating speed upon the execution of a control program for accessing multiple nonvolatile storage means, and that can reduce as much as possible the power consumed by all the nonvolatile storage means upon the execution of the control program.

Figure 9:
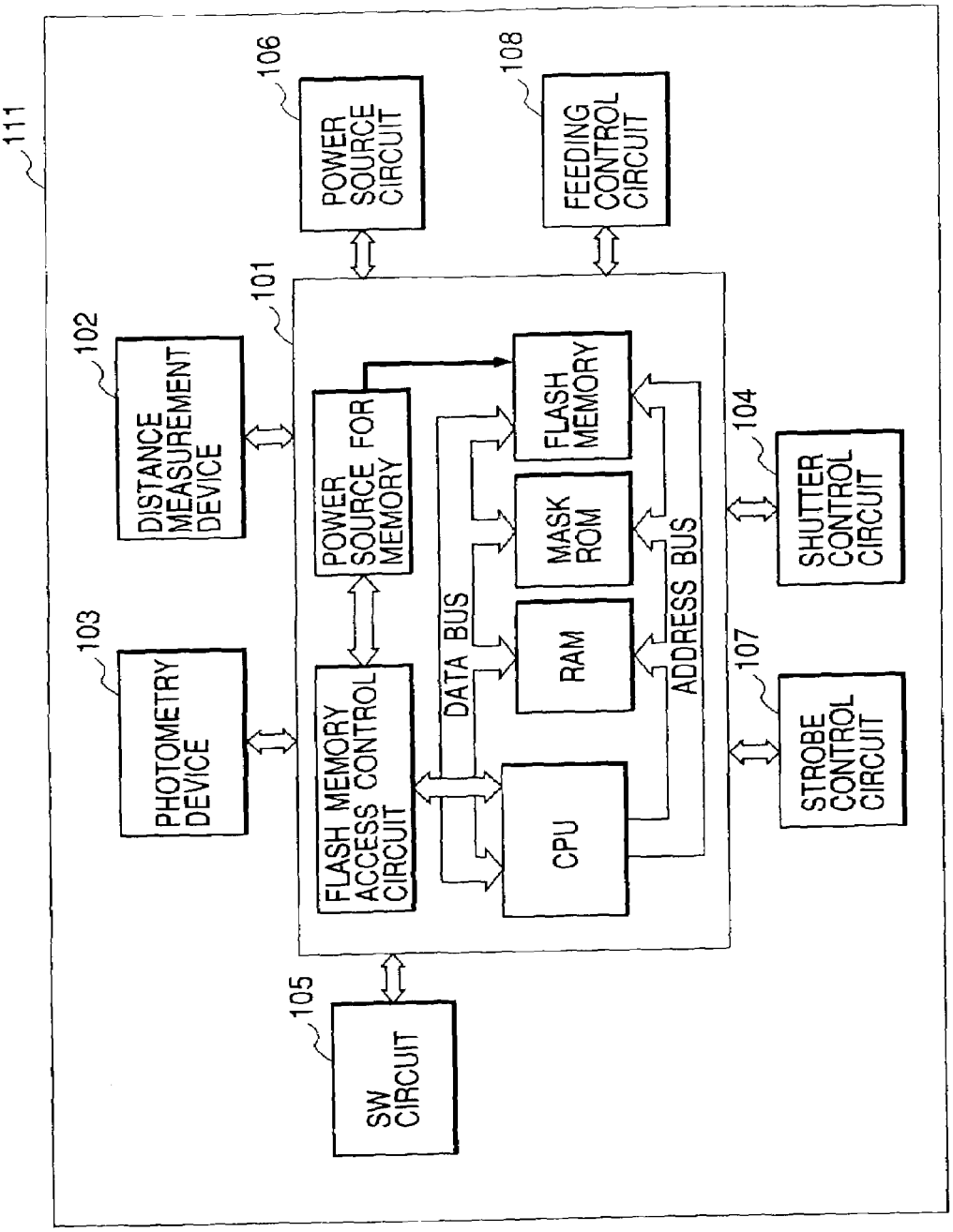
FIG. 9 is a block diagram showing the circuit configuration of the essential portion of a camera according to the present invention.

FIG. 9 is a block diagram showing the electric configuration of the essential portion of a camera according to a fifth embodiment to a seventh embodiment. In order to simplify the explanation, the other components of the camera are not shown.

In FIG. 9, a one-chip microcomputer 101 serves as control means for controlling the various operations of a camera 111, and comprises a central processing unit (CPU), a mask ROM, a flash memory, a RAM, a flash memory access control circuit, a power source for a flash memory, and peripheral circuits (not shown). A control program for controlling various camera operations, such as the detection of the statuses of operating switches, photometry, distance measurement, film feeding and strobe charging, and control data are stored in the flash memory and the mask ROM, and the control program and the control data are read by the CPU and corresponding functions are executed.

The flash memory access control circuit receives, from the CPU, a request signal for data writing or reading, performed relative to the flash memory, and renders the flash memory on or off in accordance with the request signal. When a rising time for the flash memory has elapsed following the entry into the conductive state of the flash memory, the flash memory access control circuit outputs, to the CPU, a permission signal for accessing the flash memory. This is because the flash memory can not be accessed immediately after becoming conductive, a predetermined warmup period must first elapse, and an access permission signal is not output until the rising time has elapsed.

A distance measurement device 102 employs a distance measurement sensor (not shown) to obtain data for the distance to an object. A photometry device 103 employs a photometry sensor (not shown) to obtain data for the brightness of the object. A shutter control circuit 104 opens and closes a shutter. A switch (SW) circuit 105 includes various operating switches, such as switches SW1 and SW2 for starting an image taking preparation operation and an image taking operation, and switches for setting photographic modes. A power source circuit 106 transforms a power voltage into a predetermined voltage, and supplies the voltage to the individual circuits. A strobe control circuit 107 charges a main capacitor (not shown), and performs strobe emission. And a feeding control circuit 108 drives a feeding motor for winding or rewinding a film (not shown).

The camera control operation for the thus arranged camera according to the fifth embodiment of the invention will now be described while referring to the flowchart in FIG. 10.

First, at step #1001, the microcomputer 101 waits until the switch SW1 is turned on by depressing the first stroke of a release button, in accordance with the control program for the operation switch status detection that is stored in the mask ROM. In this case, it is assumed that the control program for the switch status detection is stored in the mask ROM, as is shown in FIG. 11A (operation switch detection block). Therefore, since access of the flash memory is not necessary, the flash memory is not rendered conductive during the execution of the operation switch status detection program, and no power can be consumed. Referring again to FIG. 10, when the switch SW1 is turned on by depressing the first stroke of the release button, program control advances to step #1002. Then, a distance measurement program for measuring the distance to, an object is executed, and the distance to the object is measured by using the distance measurement device 102.

The execution of the distance measurement program will now be described in detail.

Figure 12:
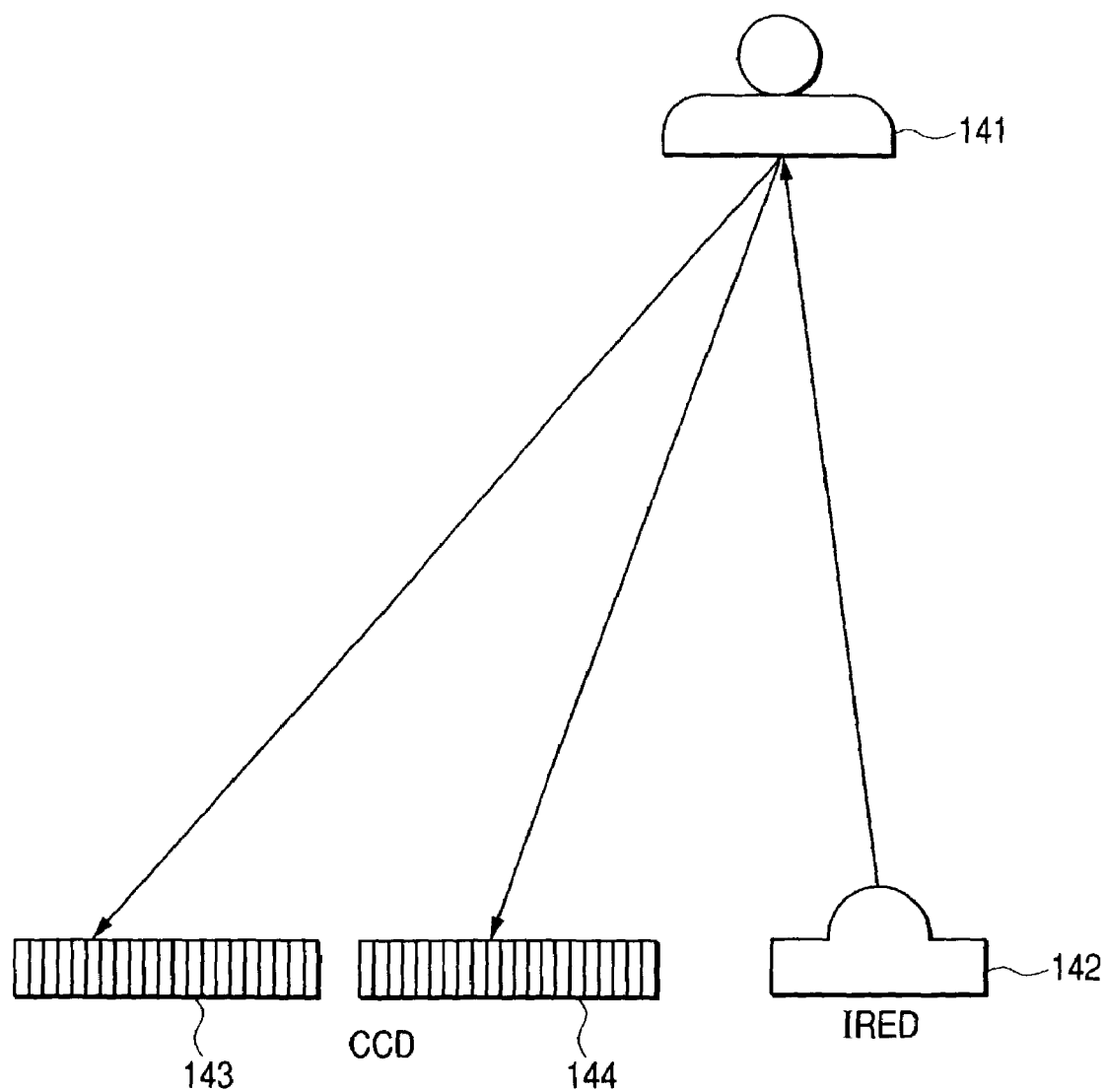
FIG. 12 is a schematic diagram showing an active AF system included in the camera according to the fifth embodiment to the seventh embodiment of the present invention.

An example structure for an active distance measurement system is shown in FIG. 12. An active distance measurement apparatus having the structure shown in FIG. 12 employs an infrared-emitting diode (IRED) 142 to emit infrared light to an object 141, condenses and accumulates light reflected by the object 141 to semiconductor position detectors (CCDs) 143 and 144, which are a pair of light-receiving sensor arrays, calculates the shifting distance from the image forming location using a correlation operation, and obtains the distance to the object 141.

Specifically, the distance measurement program using this active distance measurement apparatus sequentially performs an "initialization operation", for confirming the power, and a clock to drive the CCDs 143 and 144; "accumulation control", for accumulating light at the CCDs 143 and 144 during an appropriate period of time while permitting the emission of light by the IRED 142; "image data processing (image data reading)", for reading accumulated image signals, for reducing noise by averaging the signals, and for compressing image data to reduce the amount of data; "correlation calculation", for calculating a phase difference between the data for a pair consisting of a right image and a left image obtained by the image data processing; and "distance information calculation", for employing the phase difference obtained by the correlation operation to calculate the data for the distance to the object 141. Thus, the distance measurement process is performed in this manner.

How the distance measurement program is stored in the memory will now be described while referring to FIG. 11B.

In this embodiment, control programs, such as the "accumulation operation block", the "correlation calculation block" and the "distance information calculation block", which should employ an adjustment value because of variances present in the CCDs and the optical system, are stored in an electrically readable and writable flash memory. The "initialization operation block" and the "image data processing (image data reading) block" are stored in a mask ROM. It should be noted that for these memories the uses are not limited to this example, and control programs may be appropriately stored in accordance with the capacities and the operating conditions of the memories.

The operations for implementing the distance measurement process are performed by accessing the mask ROM and the flash memory.

Figure 13:
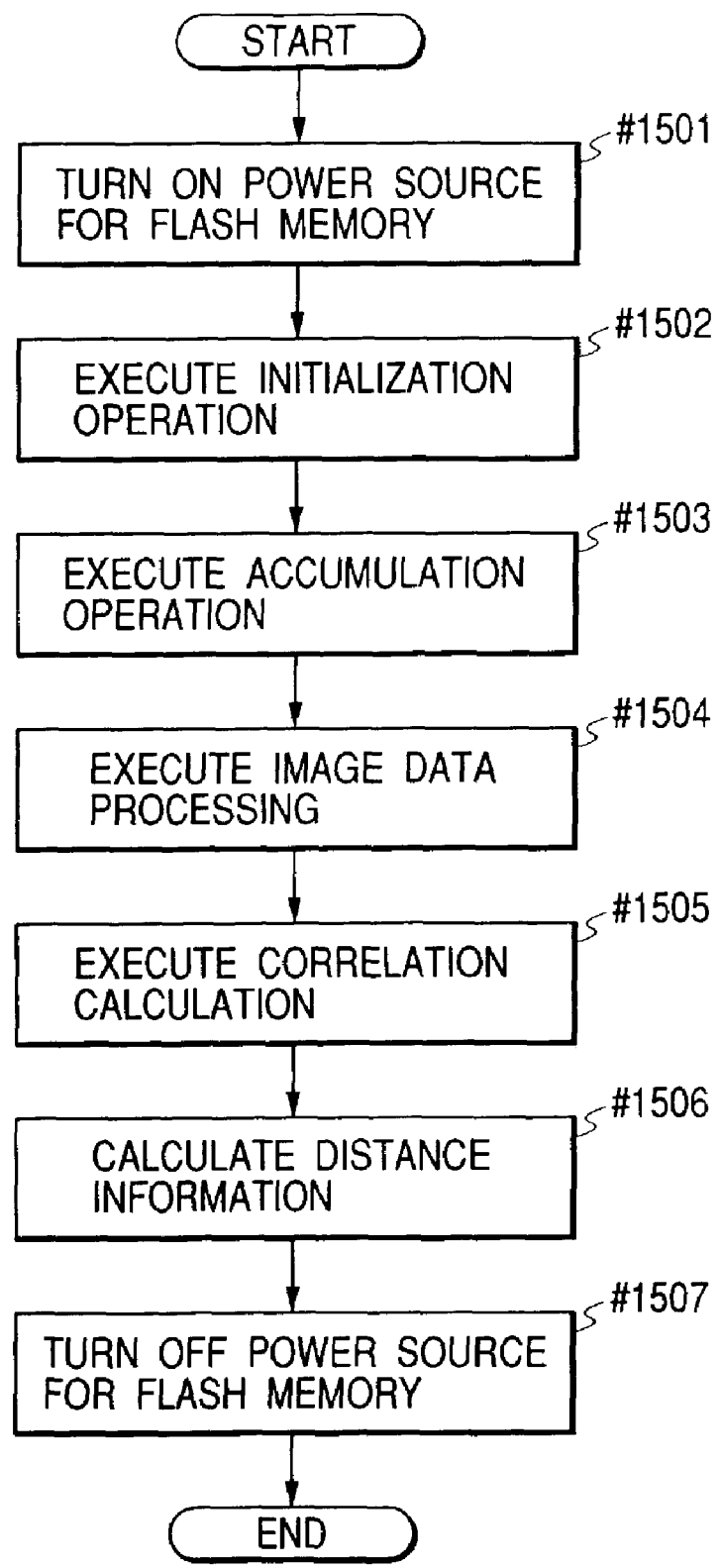
FIG. 13 is a schematic flowchart showing the distance measurement processing performed by the camera according to the fifth embodiment of the present invention.

The process for supplying power to the flash memory during the execution of the distance measurement program will now be described while referring to the flowchart in FIG. 13 and the timing chart, for the power control for the flash memory, in FIG. 14.

The distance measurement program includes the blocks for "initialization operation", "accumulation control", "image data processing", "correlation calculation" and "distance information calculation", and the control programs which are required to access for the flash memory are "accumulation control", "correlation calculation" and "distance information calculation".

Therefore, it seems that the flash memory need only be rendered conductive immediately before each control program is started. However, the rising time for Δt (e.g., 50 μS) is required since the flash memory is rendered conductive until it can be appropriately accessed, and when the ON/OFF state of the flash memory is controlled as each block is executed, the operation is started with a delay equivalent to the rising time for the memory. As a result, the operating speed (processing speed) would be reduced.

Figure 14:
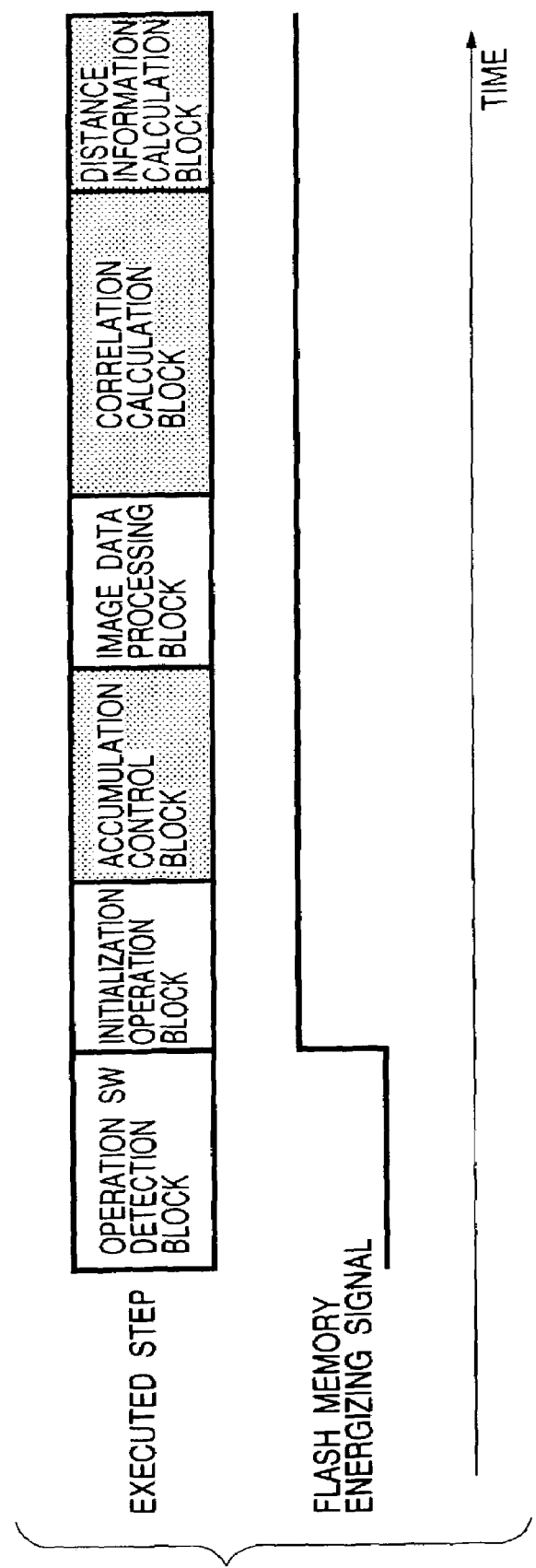
FIG. 14 a timing chart showing the conducive state of the flash memory during the distance measurement processing in FIG. 13.

In this embodiment, as is shown in FIG. 14, for a program, such as a distance measurement program (a control program operated by accessing both the mask ROM and the flash memory), that is operated using both the mask ROM and the flash memory, the flash memory is rendered conductive when the program is started. Then, instead of being rendered off for each control block, the flash memory is maintained in the access-enabled state until the distance measurement program has been completed. Therefore, the process sequence for the distance measurement operation can be rapidly performed without reducing the operating speed.

The distance measurement operation will now be described while referring to the flowchart in FIG. 13.

Since the distance measurement operation (distance measurement program) is to be executed while accessing the flash memory and the mask ROM, first, at step #1501 a power source for the flash memory is turned on through the flash memory access control circuit in FIG. 9 and begins to supply power to the flash memory, and the flash memory is set in the access-enabled state. Then, at step #1502, the "initialization operation" stored in the mask ROM is initiated, and at step #1503, the "accumulation control" stored in the flash memory is started. As is shown in FIG. 14, since the flash memory is rendered conductive when the distance measurement program is started, the accumulation process can be performed immediately, without waiting for the rising time of the flash memory.

Following this, at step #1504, the "image data processing" stored in the mask ROM is performed, and at steps #1505 and #1506, the "correlation calculation" and the "distance information calculation" stored in the flash memory are performed without waiting for the rising time. Thereafter the distance measurement operation is completed, and finally, at step #1507, the power source for the flash memory is turned off and the distance measurement program is terminated.

Figure 10:
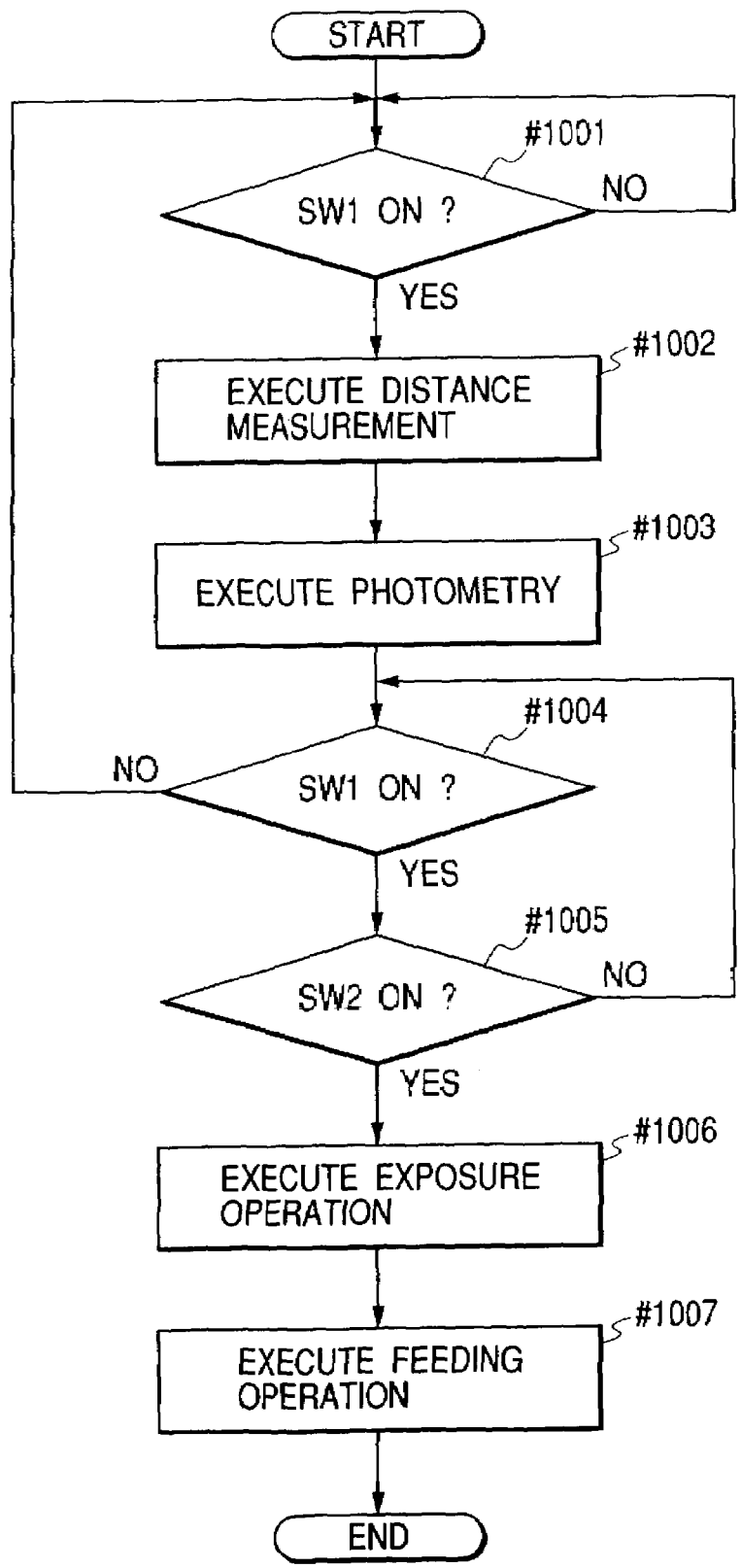
FIG. 10 is a schematic flowchart showing the image taking sequence of a camera according to a fifth embodiment to a seventh embodiment of the present invention.
Figure 11A:
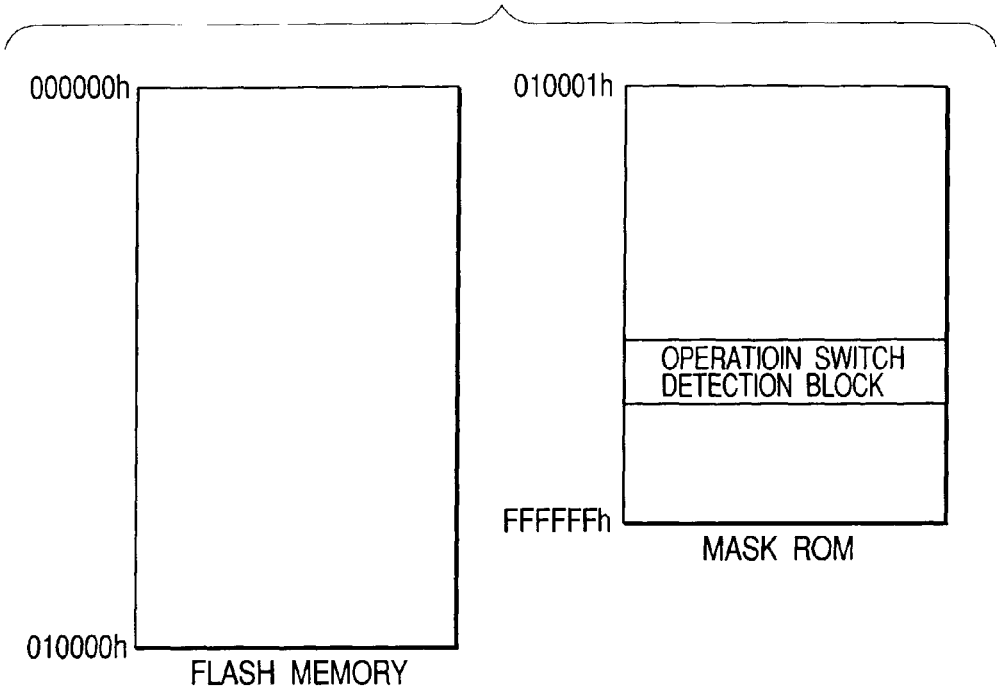
FIGS. 11A and 11B are diagrams showing multiple memories and a control program included in the camera according to the fifth embodiment to the seventh embodiment of the present invention.

Referring again to the image taking sequence in FIG. 10, when the distance measurement operation at step #1002 has been completed, program control advances to step #1003, and the brightness measurement for the object is performed by the photometry device 103 (photometry process). At step #1004, a check is performed to determine whether the switch SW1 is still in the ON state. When switch SW1 is ON, program control advances to step #1005, while when it is OFF, program control returns to step #1001.

At step #1005, a check is performed to determine whether the switch SW2 is in the ON state by depressing the second stroke of the release button. When switch SW2 is not ON, program control returns to step #1004, while when it is ON, program control advances to step #1006. In accordance with the designated exposure information, which is based on the object brightness information, the microcomputer 101 performs the exposure operation by using the shutter control circuit 104 and, as needed, the strobe control circuit 107. Then, program control advances to step #1007, and the feeding motor (not shown) is driven through the feeding control circuit 108 and performs the feeding operation (the winding performed for film frames after use). The image taking process sequence is thereafter terminated.

In this embodiment, the energizing of the flash memory has been explained during the operation switch status detection operation and the distance measurement operation. However, the energizing of the flash memory is performed not only for these operations, but for other camera operations, such as the feeding operation.

For example, the feeding program operations for winding one frame of the film are executed in the order, a "sensor driving operation" for energizing a photosensor that detects the location of a film, a "motor driving operation" for energizing a motor to move a film by one frame, a "film location detection operation" for detecting the location of a film based on the output of the photosensor, and a "motor halting operation" for, when the location whereat the film is halted has been detected by the film location detection operation, inhibiting the energization of the motor and halting the film at a predetermined location. The program blocks that should be adjusted in accordance with the variance of sensors, such as the "sensor driving operation block" and the "film location detection operation block", are stored in an electrically readable and writable flash memory, while the program blocks, such as the "motor driving operation block" and the "motor halting operation block" are stored in the mask ROM.

The power control for the flash memory has also been described, and may be performed for other built-in memories.

For example, when an EEPROM that also requires the rising time is employed instead of the flash memory, the same control process can be performed.

Specifically, when a program required for the predetermined operation of an electronic apparatus is not stored in a rewritable flash memory or EEPROM, the flash memory and the EEPROM can be powered off, so that the unnecessary consumption of power can be prevented. When the program required for the predetermined operation is stored in the flash memory, the flash memory can remain on constantly, and a savings in the rising time for the memory can be realized, and the electronic apparatus can be quickly prepared for operation.

Further, when multiple memories are employed, the power control process described in this embodiment may be performed for a memory having a large power consumption, whereas a memory having a small power consumption may remain energized constantly.

That is, when an electronic apparatus performs a predetermined operation, a memory having a relatively large power consumption (or that consumes a more power than a predetermined amount) is energized only when a necessary program is stored, and a memory having a relatively small power consumption (or that consumes less power than the predetermined amount) is energized constantly, regardless of whether a necessary program is stored.

So long as only the memory that requires a relatively small amount of power is energized when a necessary program for a predetermined operation is not stored, the unnecessary consumption of power can be reduced.

Further, since as well as the flash memory the memory having a large power consumption is energized only when a program required for an operation is stored, the unnecessary consumption of power can be prevented.

According to the fifth embodiment, for a camera operation, such as the distance measurement operation, that is executed by accessing multiple nonvolatile memories, the memory to be accessed is not powered on at the time the memory is accessed, but is powered on before the process sequence is initiated, so that an unnecessary memory rising time can be eliminated. In addition, during the execution of a function, such as the operation switch status detection, that does not need to access multiple memories, a memory that need not be accessed may be powered off, so that the consumption of power by this memory can be avoided.

Specifically, a camera control apparatus can be provided wherein, during the execution of the control program (e.g., the distance measurement program) to be run while accessing multiple memories, a reduction in the operating speed at the memory access time can be prevented, and wherein, during the execution of the control program (e.g., the operation switch detection program) that can be run only for a specified memory without another being accessed, the consumption of power by a memory that is not accessed during the execution of this control program can be prevented.

When the power control process for the flash memory described in the fifth embodiment is performed, the effect produced by the rising time for the flash memory can be eliminated during the distance measurement operation. However, in the fifth embodiment, since the flash memory is energized during the execution of the "initialization operation" block and the "image data processing" block, which do not need to access the flash memory, power is unnecessarily supplied to the flash memory during this period.

According to a sixth embodiment of the present invention, in a camera operation wherein the rising time for a memory does not adversely affect the execution of the camera function, the flash memory is energized immediately before the flash memory is accessed, so that the consumption of power can be reduced.

For camera operations that are adversely affected by the rising time for the flash memory, as is described in the fifth embodiment, the flash memory is energized when each camera operation is started, and power is constantly supplied to the flash memory during this operation.

Figure 11B:
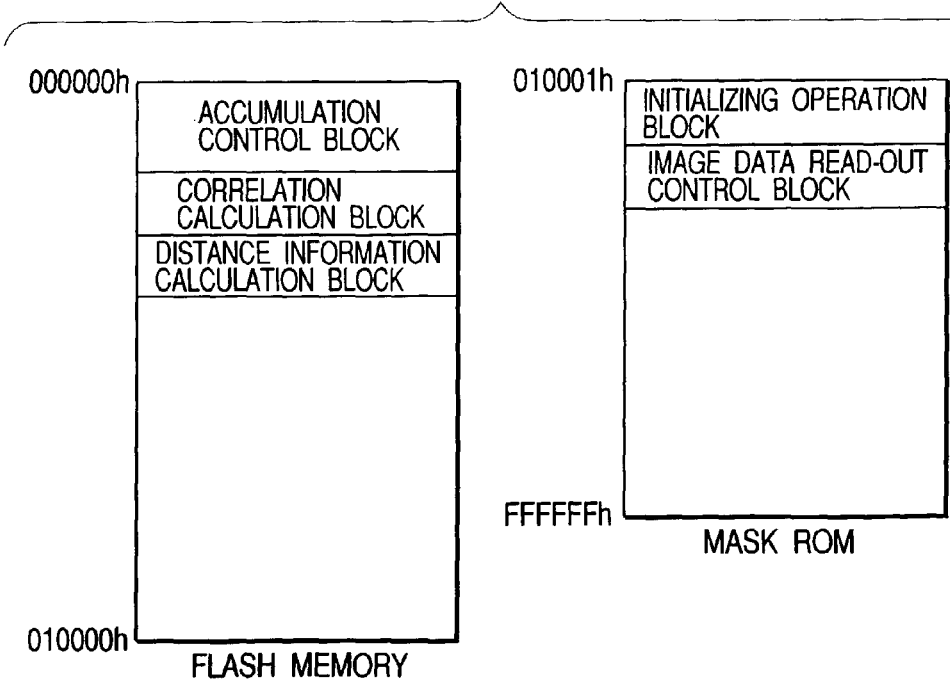

For the sixth embodiment, the distance measurement program is also located in the memory as is shown in FIG. 11B.

Figure 15:
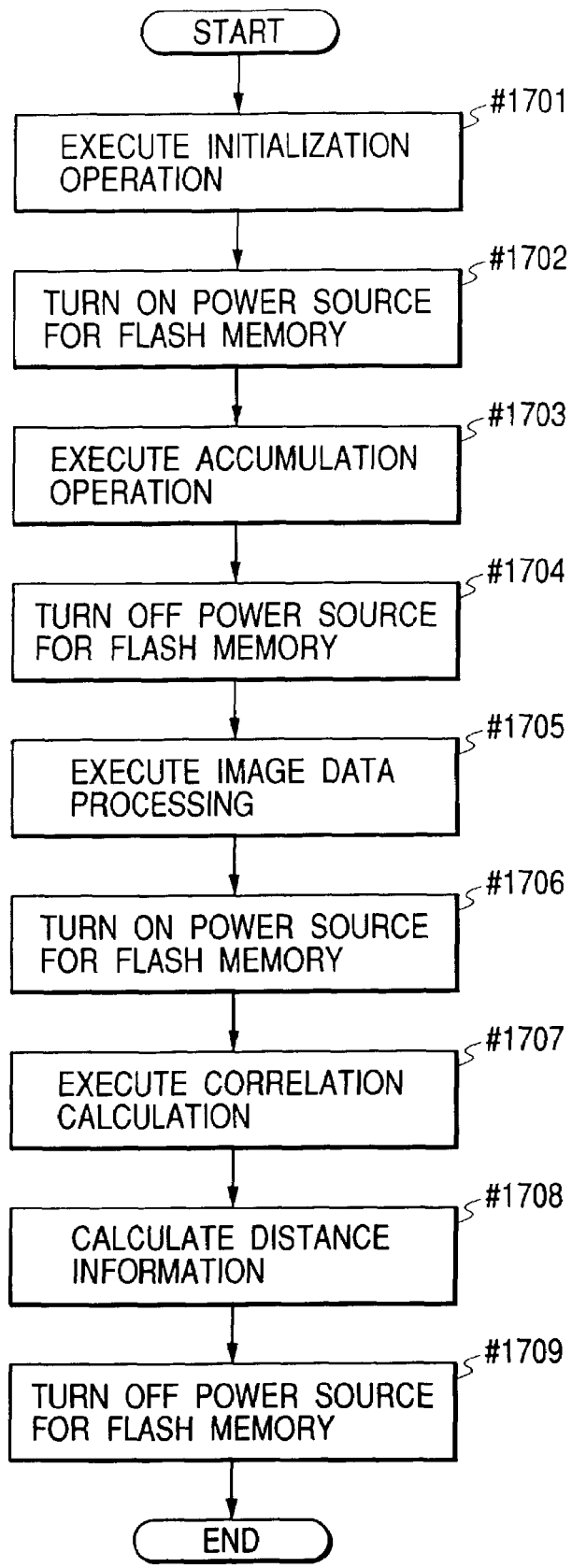
FIG. 15 is a schematic flowchart showing the distance measurement operation of the camera according to the sixth embodiment when tAF1<200 mS is satisfied.

While referring to the flowchart in FIG. 15 and the timing chart in FIG. 16 for power control for the flash memory, an explanation will be given for a power control example for the flash memory during the distance measurement operation according to the sixth embodiment of the present invention (an example where the distance measurement operation is not adversely affected by the memory rising time.

Figure 16:
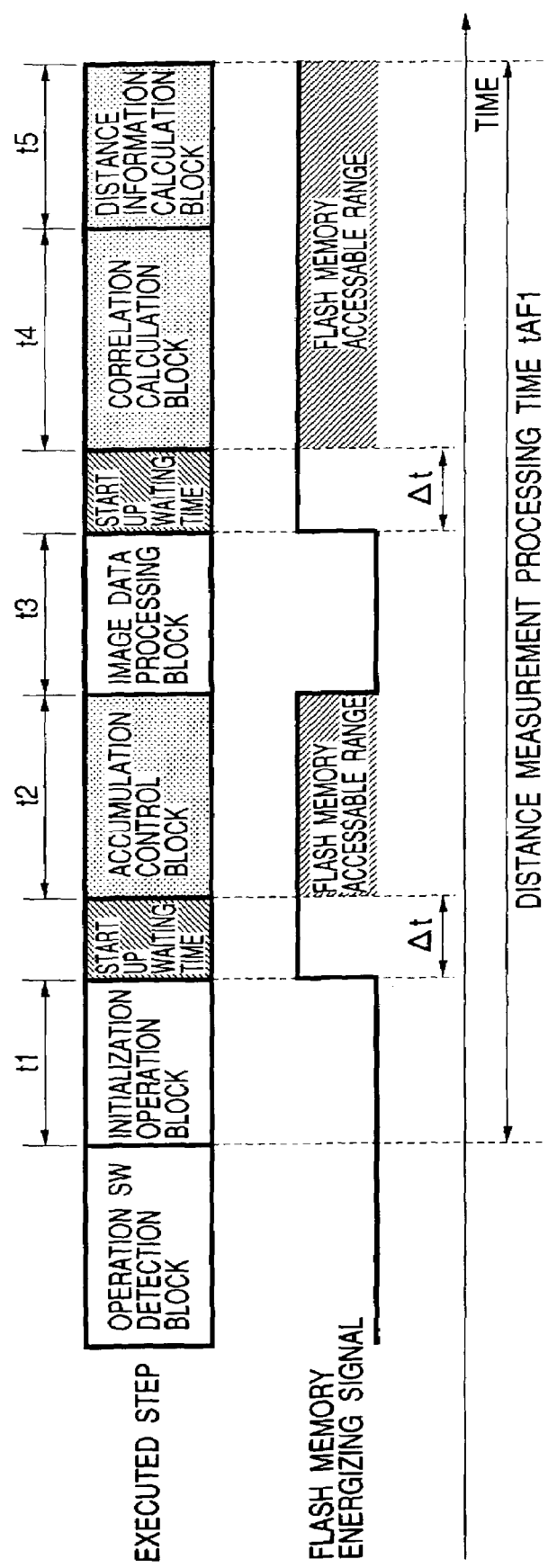
FIG. 16 is a timing chart showing the conducive state of the flash memory during the distance measurement operation in FIG. 15.

Assume, as is shown in FIG. 16, that the periods of time required for the individual control blocks of the distance measurement operation are: t1 for an "initialization operation", t2 for "accumulation control", t3 for "image data processing", t4 for "correlation calculation", and t5 for "distance information calculation". When the flash memory is to be energized as the memory access is started, the time tAf1 required for the total distance measurement operation is equivalent to a value obtained by adding, to the sum of times t1 to t5 required to execute the individual control blocks, the twice of the rising time Δt for the flash memory.

The operating speed is requested for the individual functions of the camera, and in the distance measurement operation, for example, tAf1 should be within 200 mS in order to set the release time lag within a predetermined period of time. At this time, when tAF1<200 mS is satisfied, the requested operating speed can be obtained even including the rising time for the flash memory. Therefore, instead of constantly supplying power to the flash memory from the start of the distance measurement operation, the flash memory need only be energized when the flash memory is to be accessed, specifically, before the "accumulation control", the "image data processing" and the "distance information calculation" are started. As a result, the requested operating speed can be obtained, and unnecessary consumption of power by the flash memory can be avoided.

This processing will now be described while referring to the flowchart in FIG. 15. It should be noted that, when the distance measurement operation is initiated, the flash memory is not yet energized.

First, at step #1701, the "initialization operation" stored in the mask ROM is performed. At step #1702, in order to perform the "accumulation control" stored in the flash memory, the flash memory power source is turned on through the flash memory access control circuit in FIG. 9, and energizes the flash memory. At step #1703, after the rising time (Δt) for the flash memory has elapsed, the "accumulation control" stored in the flash memory is performed.

At step #1704, the flash memory power source is turned off, and at step #1705 the "image data processing" stored in the mask ROM is performed. At step #1706, the flash memory is energized again before the "correlation calculation" and the "distance information calculation" stored in flash memory are started. At steps #1707 and #1708, after the rising time of the flash memory has elapsed, the "correlation calculation" and the "distance information calculation" are performed. Finally, at step #1709, the flash memory power source is turned off, and the distance measurement processing is terminated.

Figure 18:
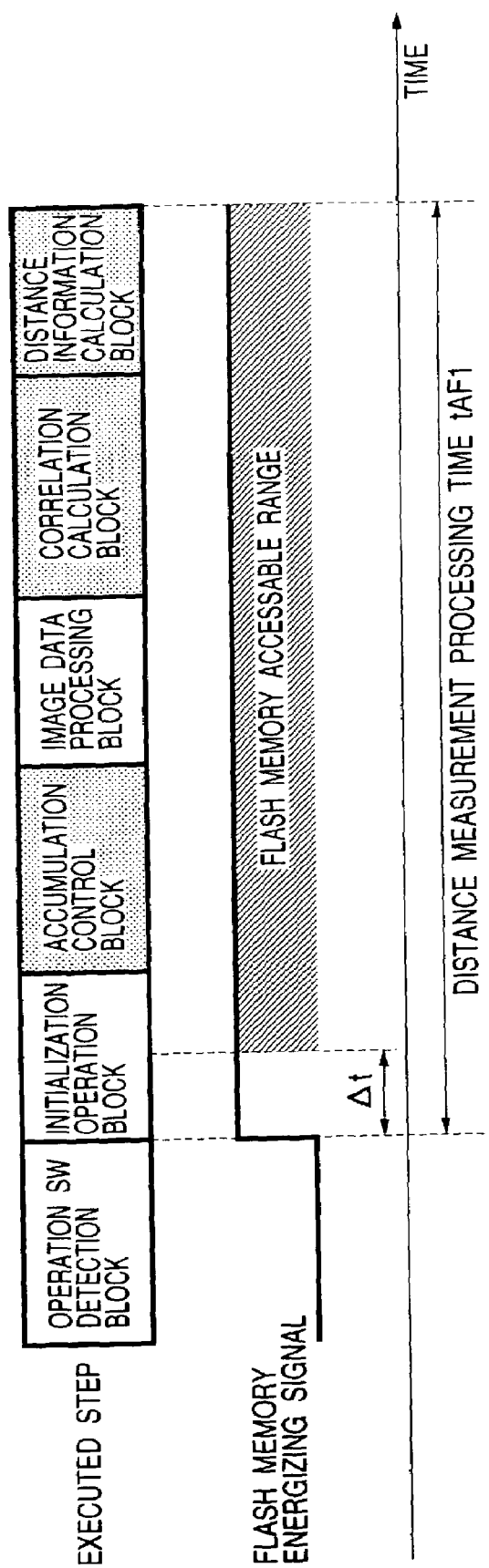
FIG. 18 is a timing chart showing the conducive state of the flash memory during the distance measurement operation in FIG. 17.

When tAF1<200 mS is not satisfied, i.e., when the operating speed is not satisfied when the flash memory is energized immediately before being accessed, as is shown in FIG. 18, the flash memory is maintained ON since the distance measurement operation is started. As a result, as is apparent from the comparison between the timing charts in FIGS. 16 and 18, while the reduction of the consumption of power can not be expected, the rising time 2Δt of the flash memory can be eliminated, and the operating speed can be satisfied.

Figure 17:
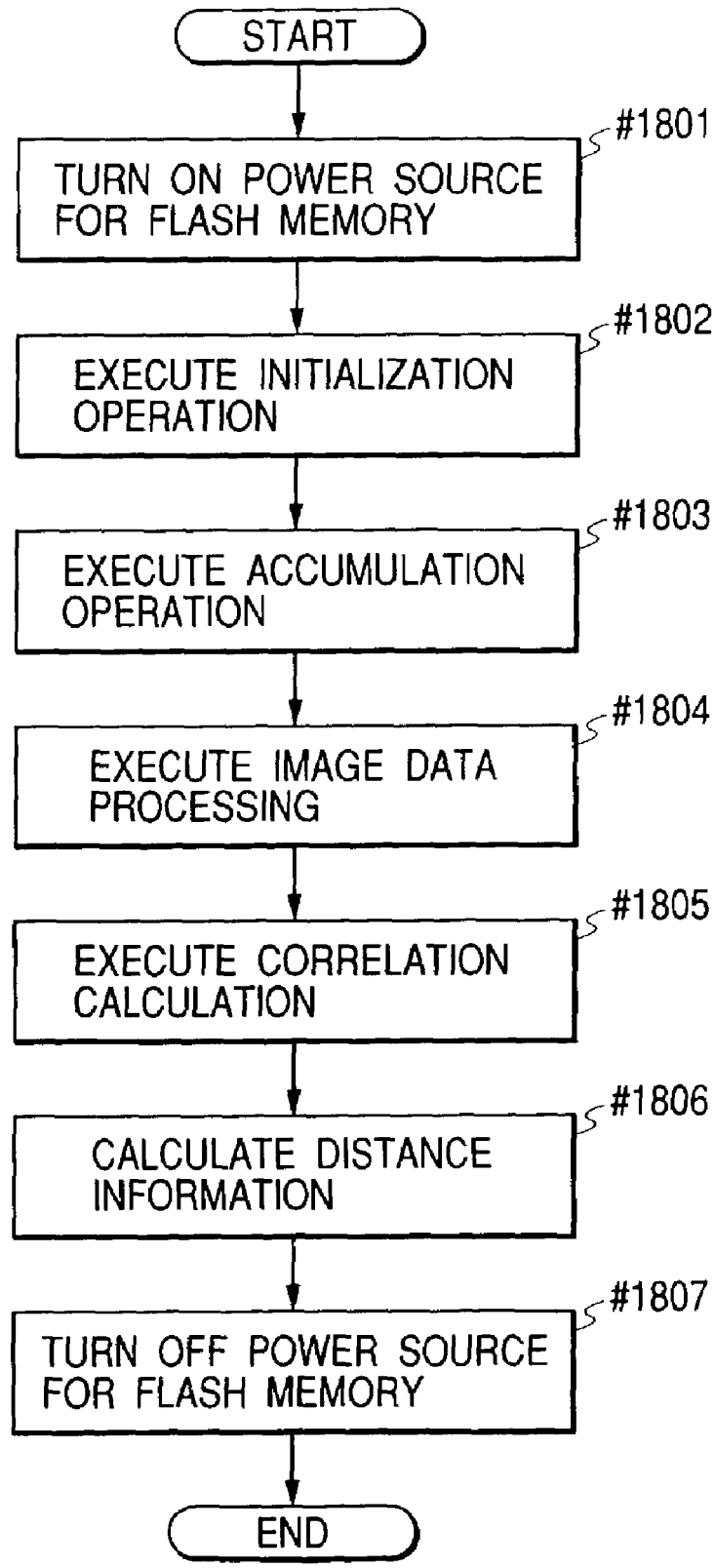
FIG. 17 is a schematic flowchart showing the distance measurement operation of the camera according to the sixth embodiment when tAF1<200 mS is not satisfied.

While referring to the flowchart in FIG. 17, an explanation will now be given for the operation for obtaining the above results, i.e., the distance measurement operation where the memory rising time adversely affect the execution of the camera function.

At step #1801, the flash memory power source is powered on through the flash memory access control circuit in FIG. 9, and starts energizing of the flash memory to set it to the access-enabled state. At step #1802, the "initialization operation" stored in the mask ROM is performed, and at step #1803, the "accumulation control" stored in the flash memory is performed. Since the flash memory is energized when the distance measurement program is started, the "accumulation control" can be immediately performed without waiting until the rising time elapses.

At step #1804, the "image data processing" stored in the mask ROM is performed, and at steps #1805 and #1806, the "correlation calculation" and "distance information calculation" stored in the flash memory are performed without waiting until the rising time for the flash memory elapses. The distance measurement operation is thus completed. Finally, at step #1807, the flash memory power source is turned off, and the processing based on the distance measurement program is terminated.

In the sixth embodiment, the energization of the flash memory during the distance measurement operation has been explained. However, the energization of the flash memory can also be performed in the same manner for other camera operations, such as the feeding operation.

Further, the power control for the flash memory has been explained. This power control can also be performed when another built-in memory (e.g., an EEPROM) that requires the rising time is employed.

According to the sixth embodiment, a camera control apparatus can be provided wherein, at the time of the execution (see FIGS. 15 and 16) of the control program that accesses multiple memories and is run at least at a predetermined operating speed, the reduction of the operating speed at the memory access is prevented and the operation at least at the predetermined operating speed is guaranteed, and wherein, at the time of the execution (see FIGS. 17 and 18) of the control program that does not access the memories and can be executed only for a specified memory, the consumption of power by the memory that is not accessed during the execution of the program can be reduced as much as possible.

According to a seventh embodiment of the present invention, power control for the flash memory is performed while taking into account the accurate rising time of the flash memory, so that the consumption of power can be reduced, and that the reduction of the operating speed caused by the memory rising time can be prevented. Since a control program operated only for the mask ROM is the same as that for the fifth embodiment, no explanation for it will be given.

According to this embodiment, a distance measurement program is also located in the memory as is shown in FIG. 11B.

Figure 19:
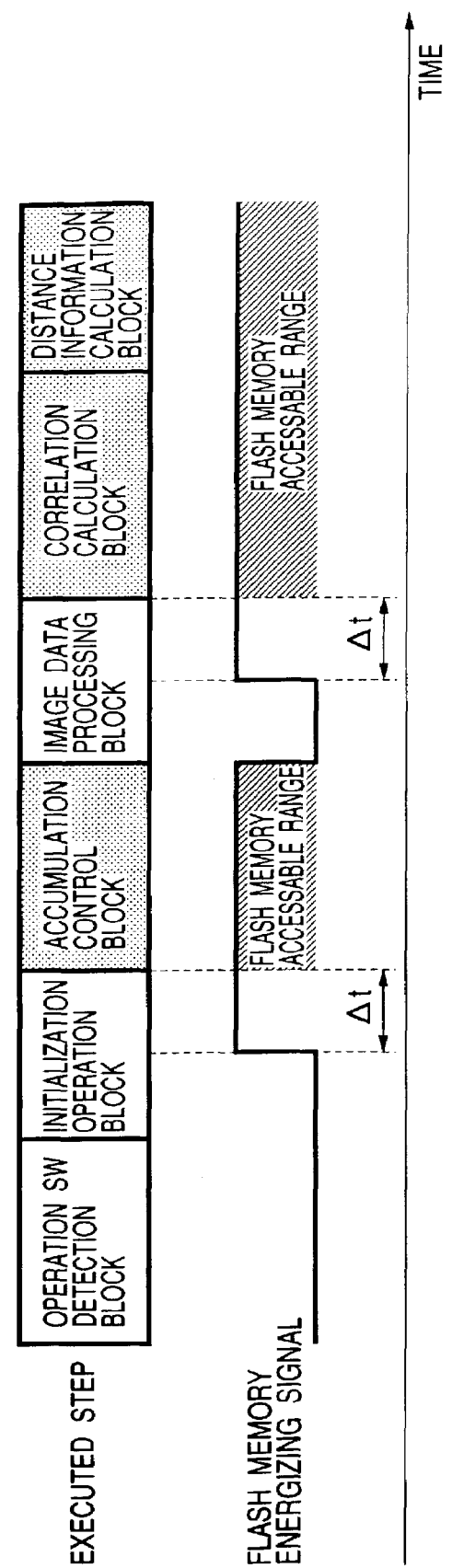
FIG. 19 is a timing chart showing the conductive state of the flash memory during the distance measurement operation of the camera according to the sixth embodiment of the present invention.

The power control process for the flash memory during the distance measurement operation according to the seventh embodiment will now be described while referring to the timing chart in FIG. 19 showing the power control for the flash memory.

A predetermined period of time, i.e., time Δt, is required until the energized flash memory is set to the access-enabled state. Therefore, when the energization of the flash memory is started before Δt, the waiting time until the flash memory rises can be eliminated from the operation period.

When the distance measurement sequence is initiated, first, the "initialization operation" is performed. Since the "initialization operation" is performed in the mask ROM, the access to the flash memory is not required. Whereas, since the "accumulation control" at the next step is to be performed in the flash memory, the access to the flash memory is required.

Therefore, at a step before Δt where program control is shifted to the "accumulation control", i.e., in the "initialization operation" block, the energization of the flash memory is started. That is, when program control is shifted to the "accumulation control", the flash memory has been already set to the access-enabled state, and the waiting time required at the rise of the memory can be eliminated.

Similarly, since the "image data processing" at the next step is to be performed in the mask ROM, the power of the flash memory is off at the beginning, and at a step before Δt where program control is shifted to the "correlation calculation" and the "distance information calculation" performed using the flash memory, i.e., in the "image data processing" block, the energizing of the flash memory is started. Therefore, when program control is shifted to the "accumulation control", the flash memory is set to the access-enabled state, and the waiting time required at the rise of the memory can be eliminated.

Also in this embodiment, the energizing of the flash memory during the distance measurement operation has been described. However, the energizing of the flash memory can also be performed in the same manner for the other camera operations, such as the feeding operation.

Further, the power control for the flash memory has been explained. This power control can be performed also when another built-in memory (e.g., an EEPROM) requiring the rising time is employed.

As is described above, according to the seventh embodiment, a camera control apparatus can be provided wherein, at the time of the execution of the control program that is run while accessing multiple memories, a memory to be accessed is energized in advance (before the memory rising time Δt), i.e., the memory to be accessed is set to the state where it can be immediately and appropriately employed, so that the reduction of the operating speed at the access time can be prevented (the memory rising time Δt can be eliminated) and the consumption of power by the memory can be reduced as much as possible.

An explanation will now be given for the configuration wherein, before shifting a memory to another memory to perform a camera operation, the operating condition matches that of a memory at a destination, so that the camera operation can be smoothly performed under the operating condition of each memory, and an erroneous operation during the shifting of the memory can be prevented, or the performance of the memory at the destination can be effectively employed.

Figure 20:
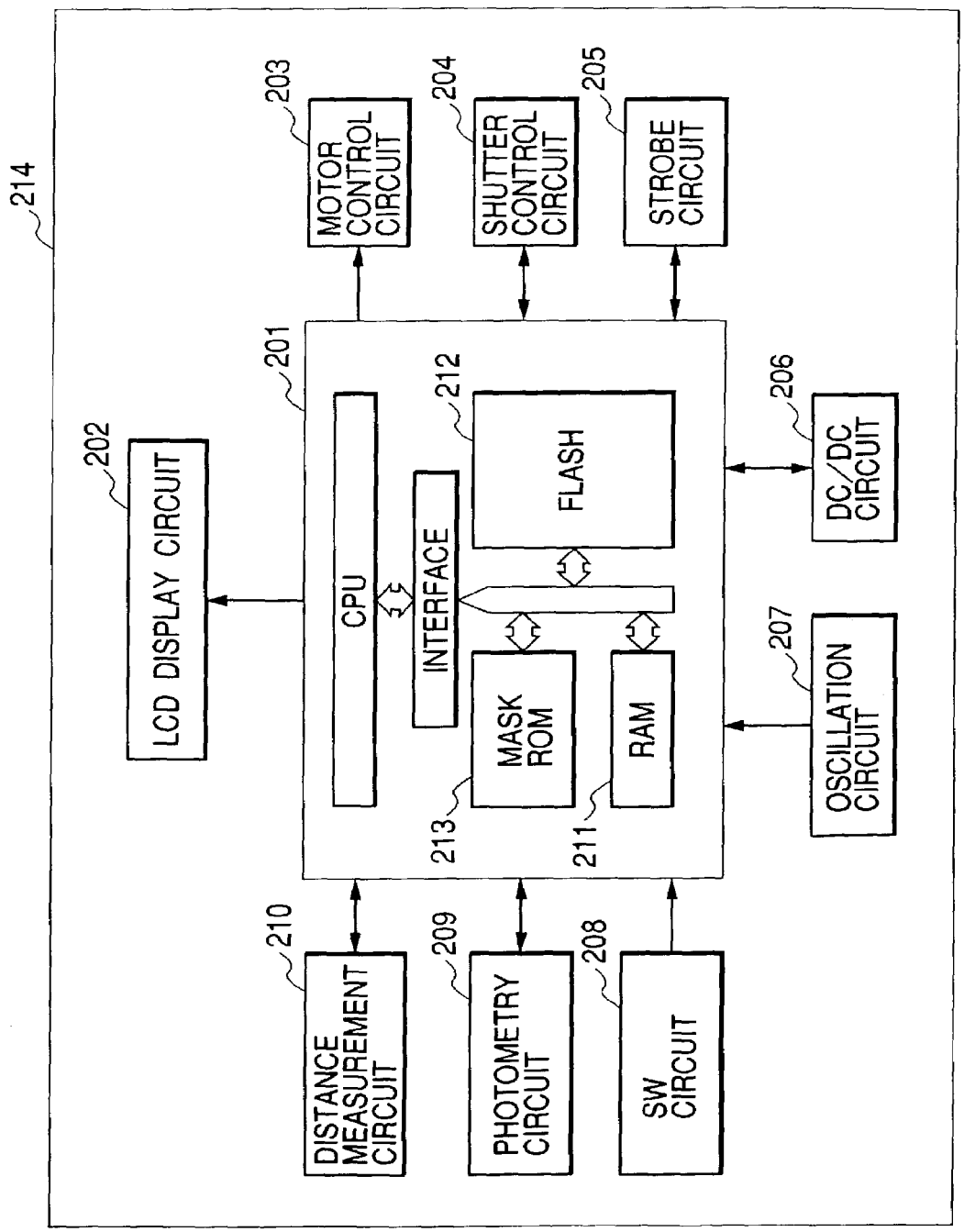
FIG. 20 is a block diagram showing the circuit configuration of the essential portion of a camera according to an eighth embodiment of the present invention.

FIG. 20 is a block diagram showing the circuit structure of the essential portion of a camera according to an eighth embodiment of the present invention.

In FIG. 20, a camera 214 comprises: a control microcomputer 201, for controlling the overall operation of the camera 214; an LCD display circuit 202, for displaying a camera mode; a motor control circuit 203, for controlling a feeding motor; a shutter control circuit 204, for controlling a shutter; a strobe circuit 205, for controlling a strobe; a DC/DC circuit 206, for controlling the power source of the camera 214; an oscillation circuit 207; a SW circuit 208, for detecting the state of a switch; a photometry circuit 209, for measuring the brightness of an object; and a distance measurement circuit 210, for measuring a distance from the object. A RAM 211, a flash memory 212 and a mask ROM 213 are provided in the microcomputer 201, and the operating characteristics of these memories are shown in FIGS. 22 to 26.

Figure 22:
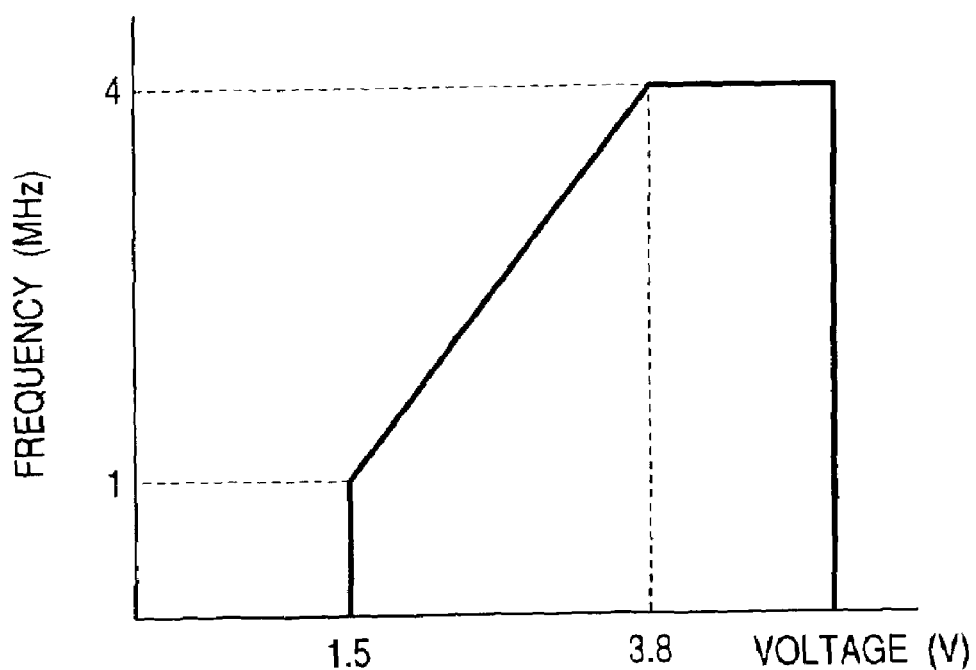
FIG. 22 is a graph showing an operating voltage-operating frequency characteristic for a mask ROM according to the eighth embodiment of the present invention.
Figure 23:
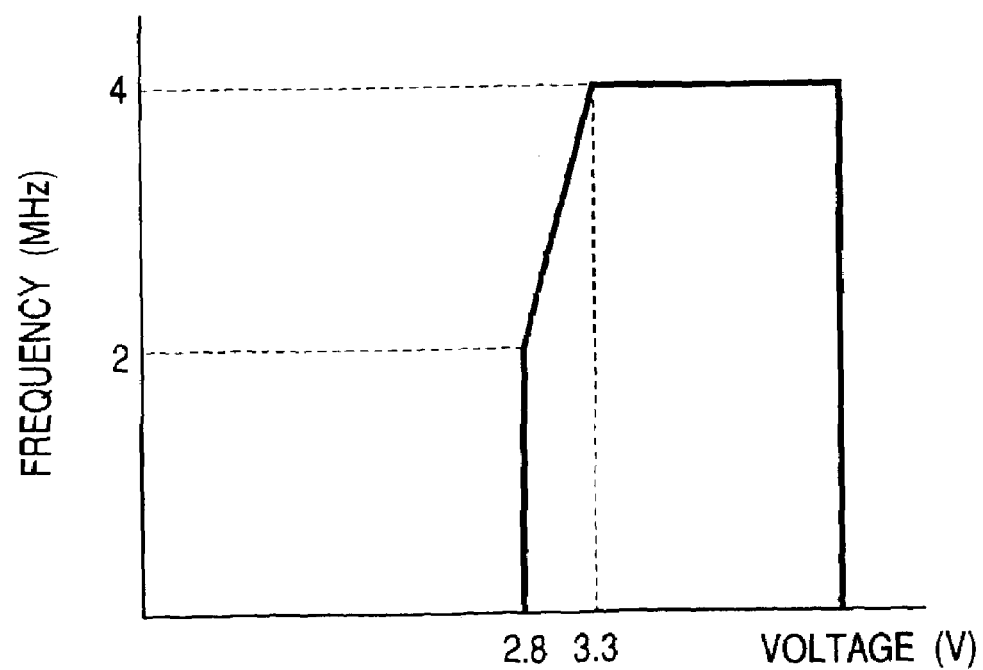
FIG. 23 is a graph showing an operating voltage-operating frequency characteristic for a flash memory according to the eighth embodiment of the present invention.
Figure 24:
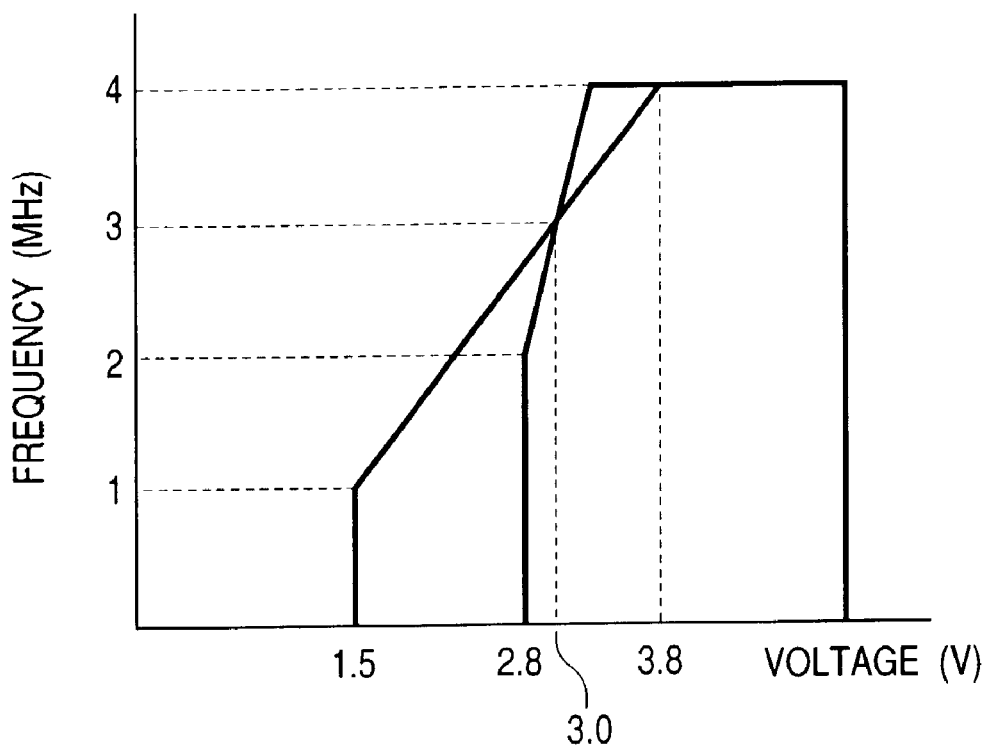
FIG. 24 is a diagram showing a first comparison example for the mask ROM and the flash memory according to the eighth embodiment of the present invention.
Figure 25:
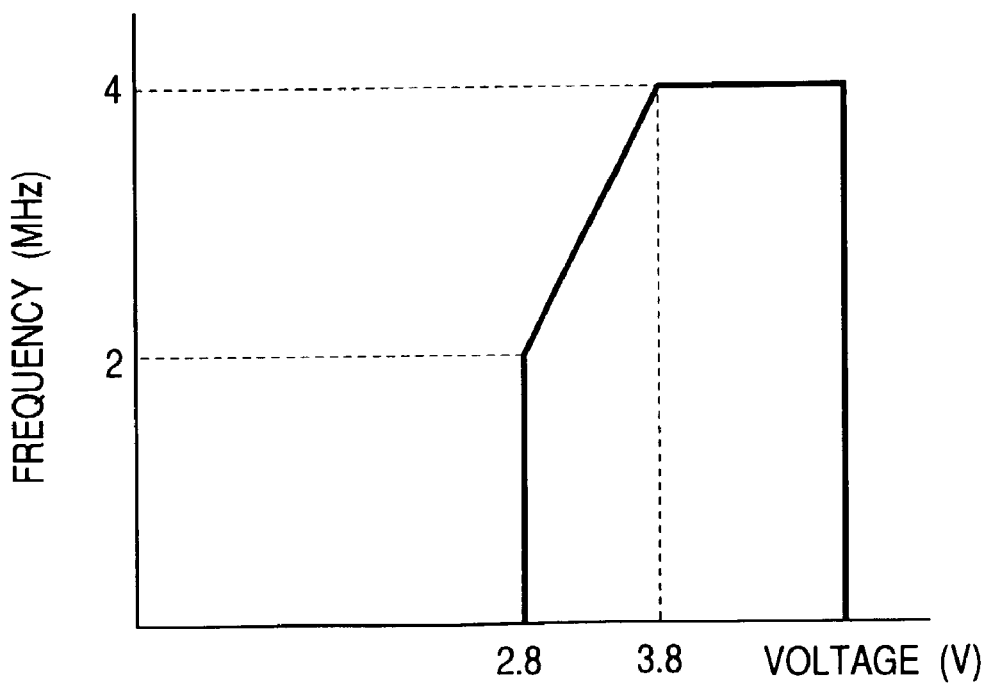
FIG. 25 is a graph showing an operating voltage-operating frequency characteristic for an EEPROM according to the eighth embodiment of the present invention.
Figure 26:
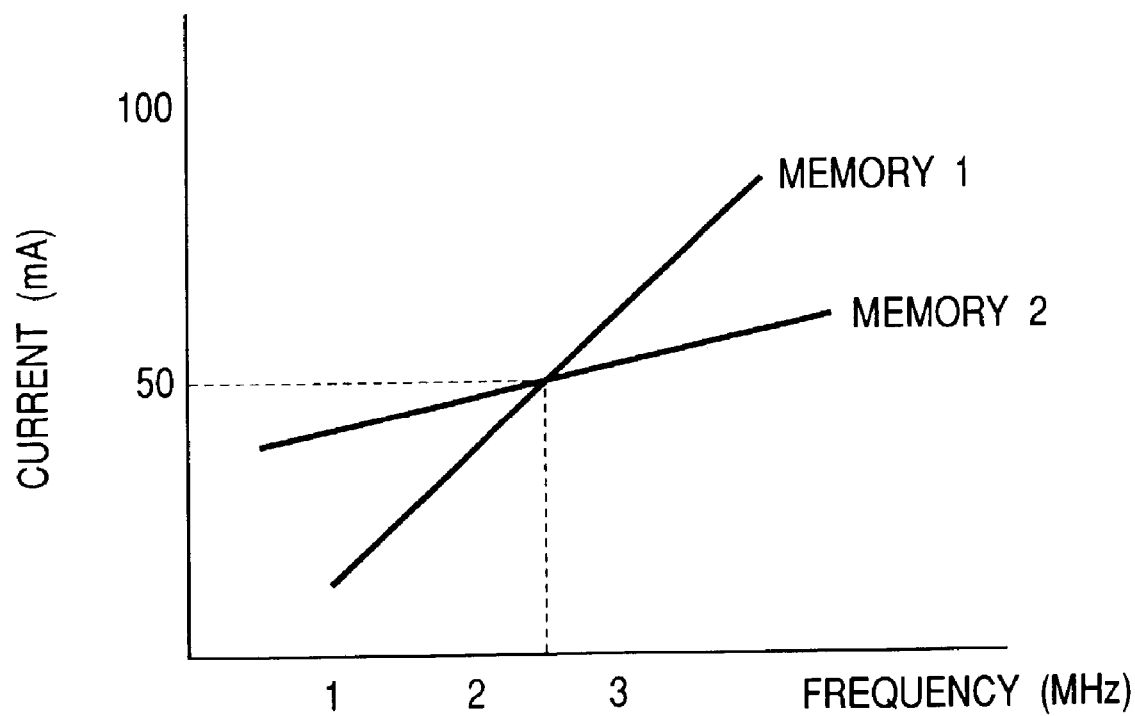
FIG. 26 is a diagram showing a second comparison example for the mask ROM and the flash memory according to the eighth embodiment of the present invention.

The characteristic of the mask ROM 213 is shown in FIG. 22, and represents that the operating voltage up to 1.5 V can be guaranteed while the operating frequency is low. The characteristic of the flash memory 212 is shown in FIG. 23, and represents that a high operating frequency is available while a high operating voltage of 2.8 V is required. The characteristic of the EEPROM is shown in FIG. 25. While the operating voltage and the operating frequency of the EEPROM are similar to those of the flash memory, the EEPROM differs from the flash memory in that even a small memory area can be accessed for a small amount of data. FIG. 24 is a graph showing the comparison between the characteristics of the mask ROM 213 and the flash memory 212. Further, for a reference, the comparison of the consumption of power by these memories is shown in FIG. 26 where, for example, memory 1 represents the mask ROM 213 and memory 2 represents the flash memory 212.

The actual control processing performed by the thus arranged camera will now be described while referring to the flowchart in FIG. 21.

Figure 28:
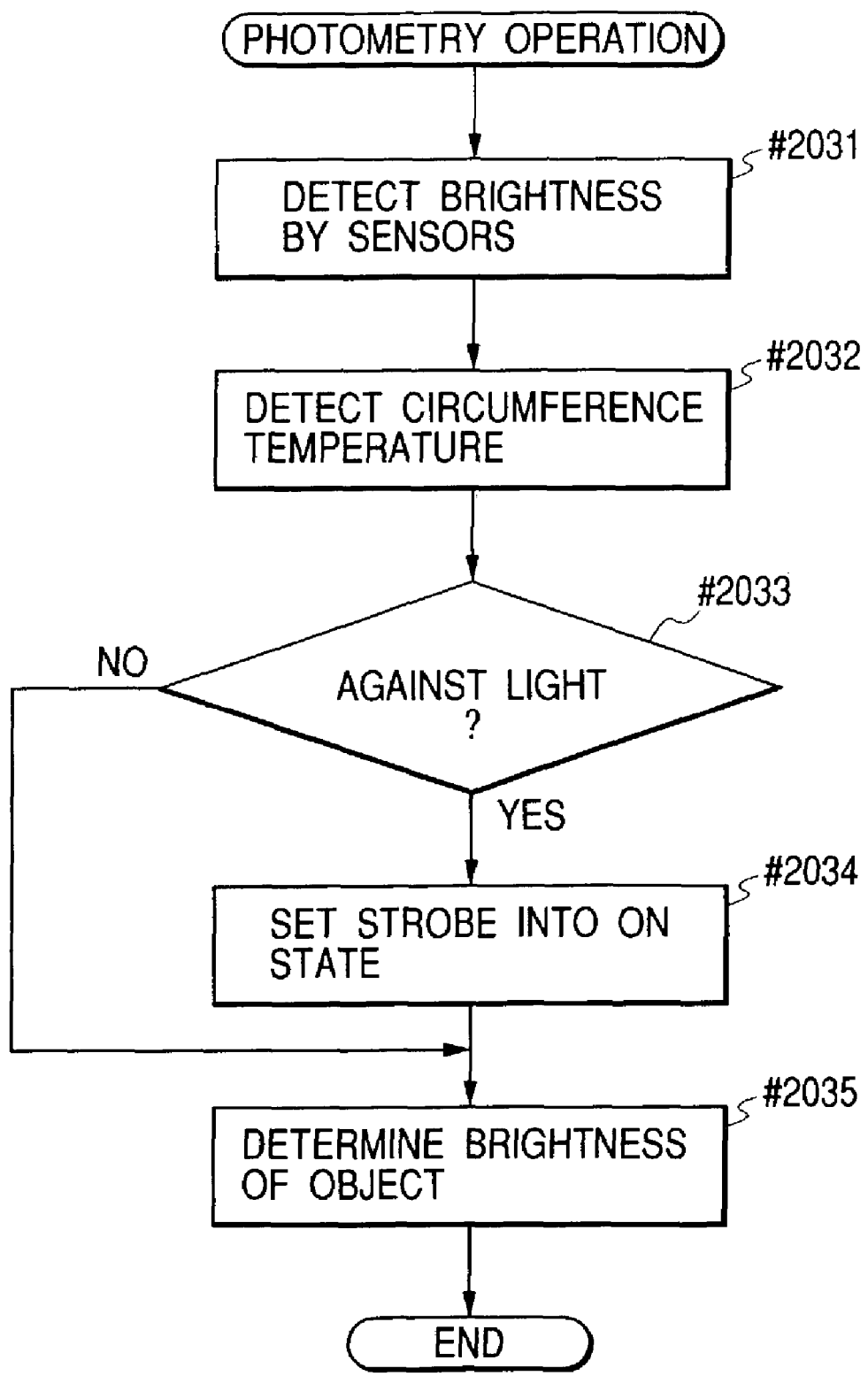
FIG. 28 is a flowchart showing the general photometry operation according to the eighth embodiment of the present invention.

First, the photometry operation is performed based on a program stored in the flash memory 212. At step #2001, a check is performed to determine whether the switch SW1 is turned on by half-depression of a release switch (not shown). When the switch SW1 is turned on, program control advances to step #2002, and the photometry circuit 209 is driven to perform a photometry operation. Since the photometry operation is the general processing as shown in detail at step #2031 to step #2035 in FIG. 28, this operation will be briefly explained. The brightness of an object is measured by each photometry sensor to determine whether the object is against light or at a low brightness. When the object is against light, the setup for the strobe image taking is required. When the object is not against light, the brightness of the object is determined immediately.

Referring again to FIG. 21, when the photometry operation is completed, program control advances to step #2003, and a check is performed to determine whether, as the result of the photometry, the object is dark because the brightness of the object does not reach a predetermined brightness level (this determination may be performed in accordance with the setup state at step #2034). When the object is dark, the strobe should be set because appropriate exposure can not be obtained to take an image of the object. In order to perform strobe image taking, program control is shifted to the strobe charge operation. However, since the strobe charge operation consumes a large amount of energy, the power source voltage is drastically dropped. Therefore, a program for executing the strobe charge operation is stored in the mask ROM 213 that can be driven at a low voltage. Therefore, the flash memory 212 is changed to the mask ROM 213, and the strobe charge operation is initiated. First, at step #2004, the operating frequency is changed to a low frequency (Hi to Lo). This is the best operation (the operation for, after the memory is shifted, adjusting the operating condition to that of a memory at a destination). This is because, when the strobe sequence is stored in the flash memory 212, the operating voltage limit is 2.8 V even by changing a high frequency to a low frequency, while, when the strobe sequence is stored in the mask ROM 13, the operating voltage up to 1.5 V can be guaranteed. When the low-voltage operation has been set in this manner, at step #2005 the strobe charge operation is initiated.

Figure 31:
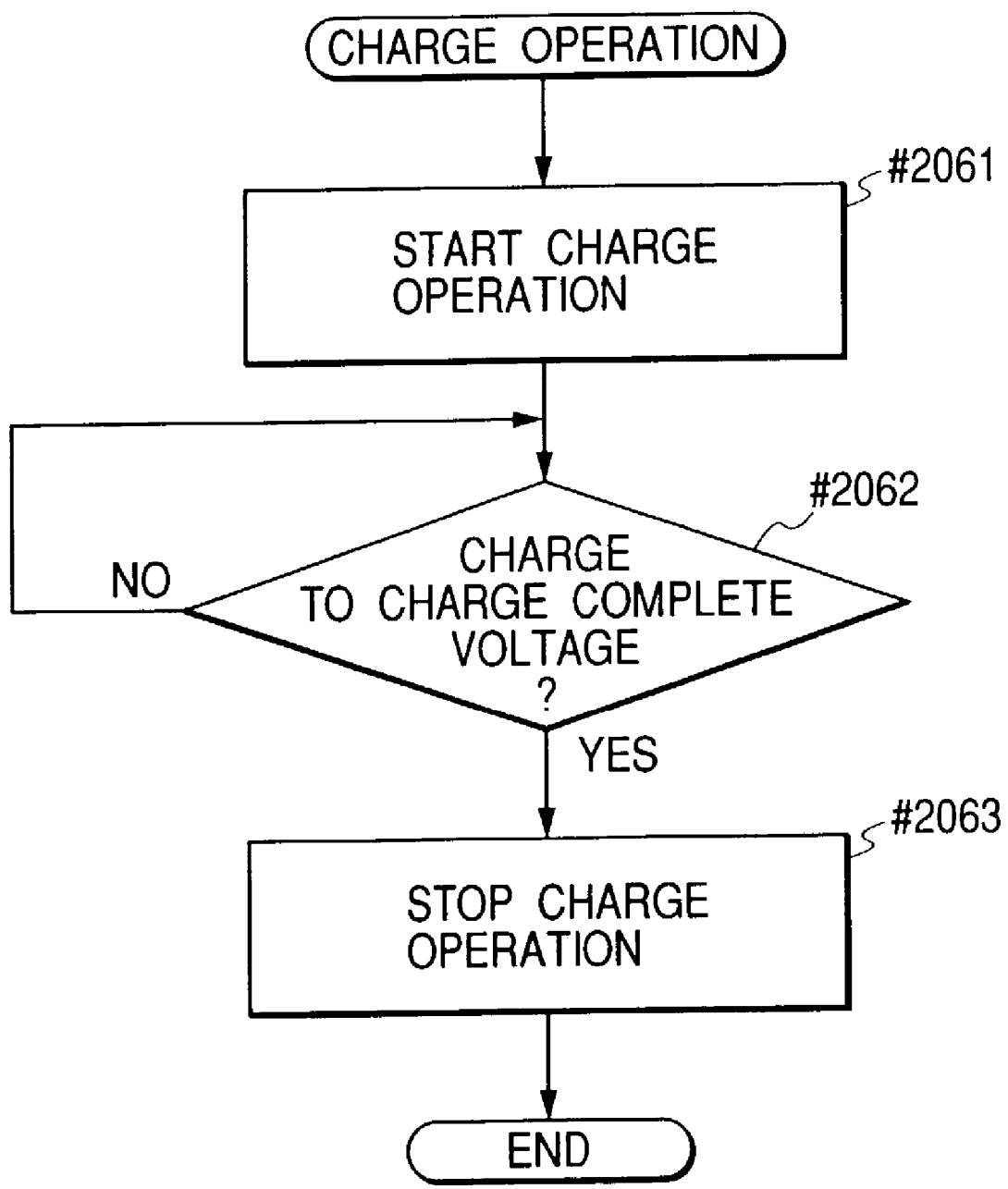
FIG. 31 is a flowchart showing the general charge operation according to the eighth embodiment of the present invention.

The general processing for the charge operation at step #2005 is shown at steps #2061 to #2063 in FIG. 31. When the charge operation is initiated, this operation is continued until the charge voltage reaches a predetermined charge end voltage. When the strobe charge operation is completed, the low-voltage operation is not necessary. Therefore, at step #2006 in FIG. 21, the operation is changed to the original fast clock operation (Lo to Hi). This is the guarantee operation (the operation for, before the memory is shifted, adjusting the operating condition to that of a memory at a destination) for shifting the mask ROM again to the flash memory 212 for the next operation. This is because the frequency used for the mask ROM can not be appropriate for the flash memory. In this case, the frequency whereat the flash memory 212 can also be operated is set during a period where the program in the mask ROM 213 is executed. When the frequency has been set, the mask ROM 213 is changed to the flash memory 212, and the distance measurement program stored in the flash memory 212 is performed at step #2007.

Figure 29:
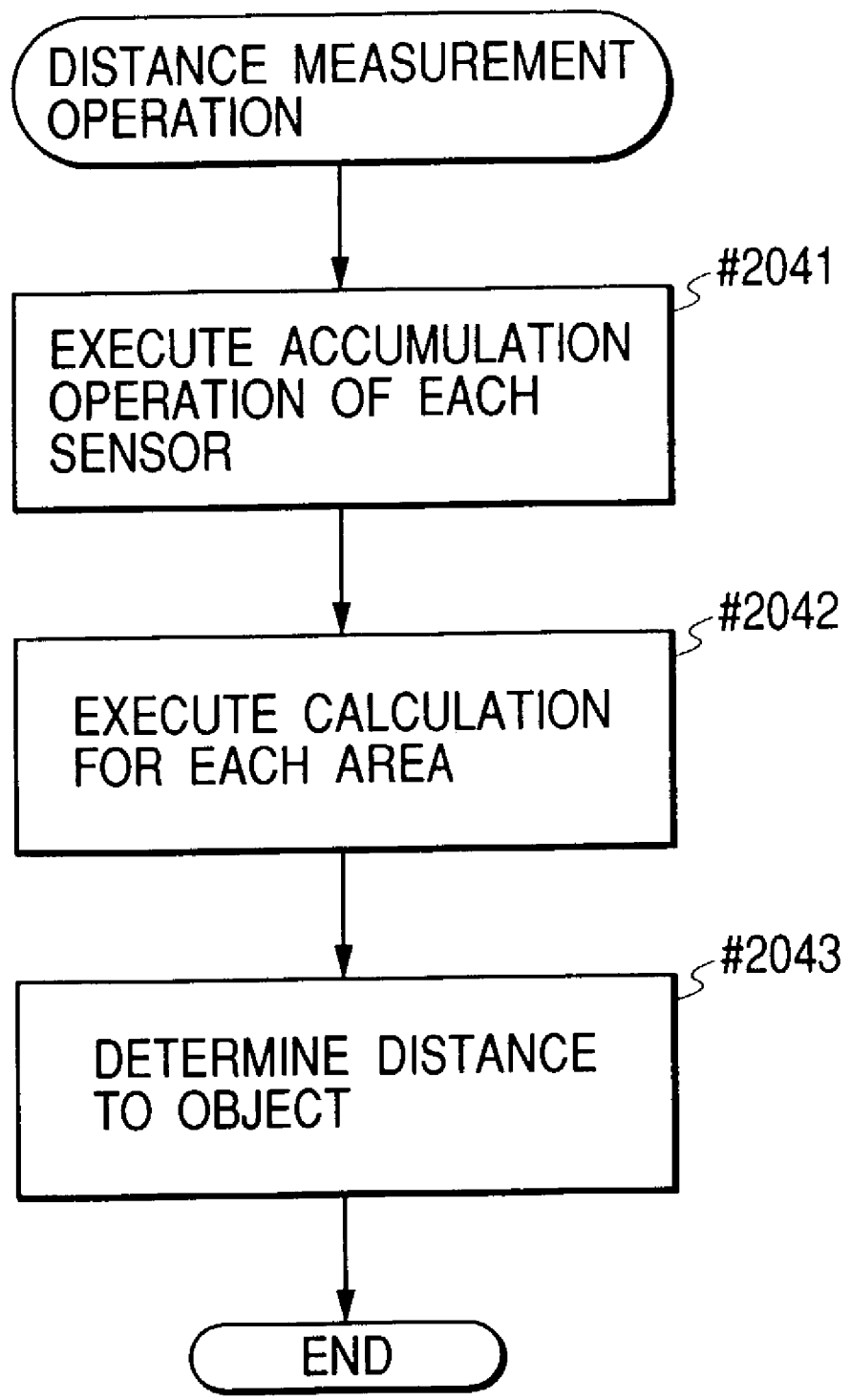
FIG. 29 is a flowchart showing the general distance measurement operation according to the eighth embodiment of the present invention.
Figure 30:
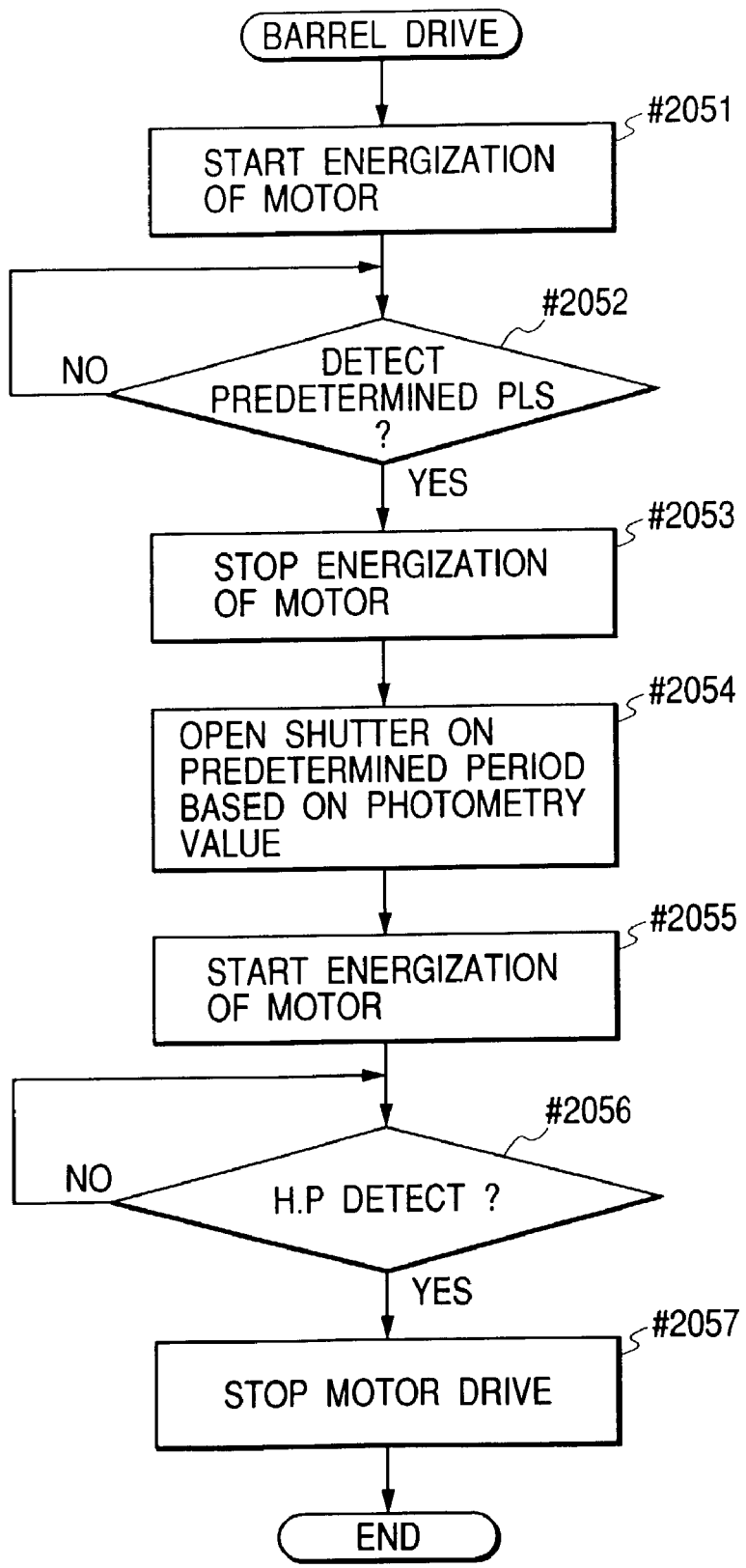
FIG. 30 is a flowchart showing the general barrel drive operation according to the eighth embodiment of the present invention.

The general processing for the distance measurement operation is shown at steps #2041 to #2043 in FIG. 29, and the distance to the object is calculated in accordance with each sensor signal. When the distance to the object is obtained, at step #2008, the sequence is held to waiting state until a switch SW2 is turned on by full depression of the release switch (not shown). When the SW2 is turned on, program process advance to step #2009, and a barrel is moved to a predetermined position to focus the camera on the object. Since the general processing for the barrel driving operation is shown in detail at steps #2051 to #2057 in FIG. 30, this operation will be briefly described. The barrel is moved to a measured distance value by driving the motor. When the barrel is moved at a predetermined position, the shutter control is performed in accordance with the photometry value (brightness of the object). When the image taking process is completed, the barrel is returned to the original position.

In the above described control processing, the memory is changed to another memory where a program matching the memory characteristic is stored, and the program is executed. Further, since the guarantee operation and the best operation are performed as the memory is changed, a stable operation can be provided.

The processing according to a ninth embodiment of the present invention will now be described while referring to the flowchart in FIG. 27. The circuit arrangement of a camera is the same as that in FIG. 20.

Figure 27:
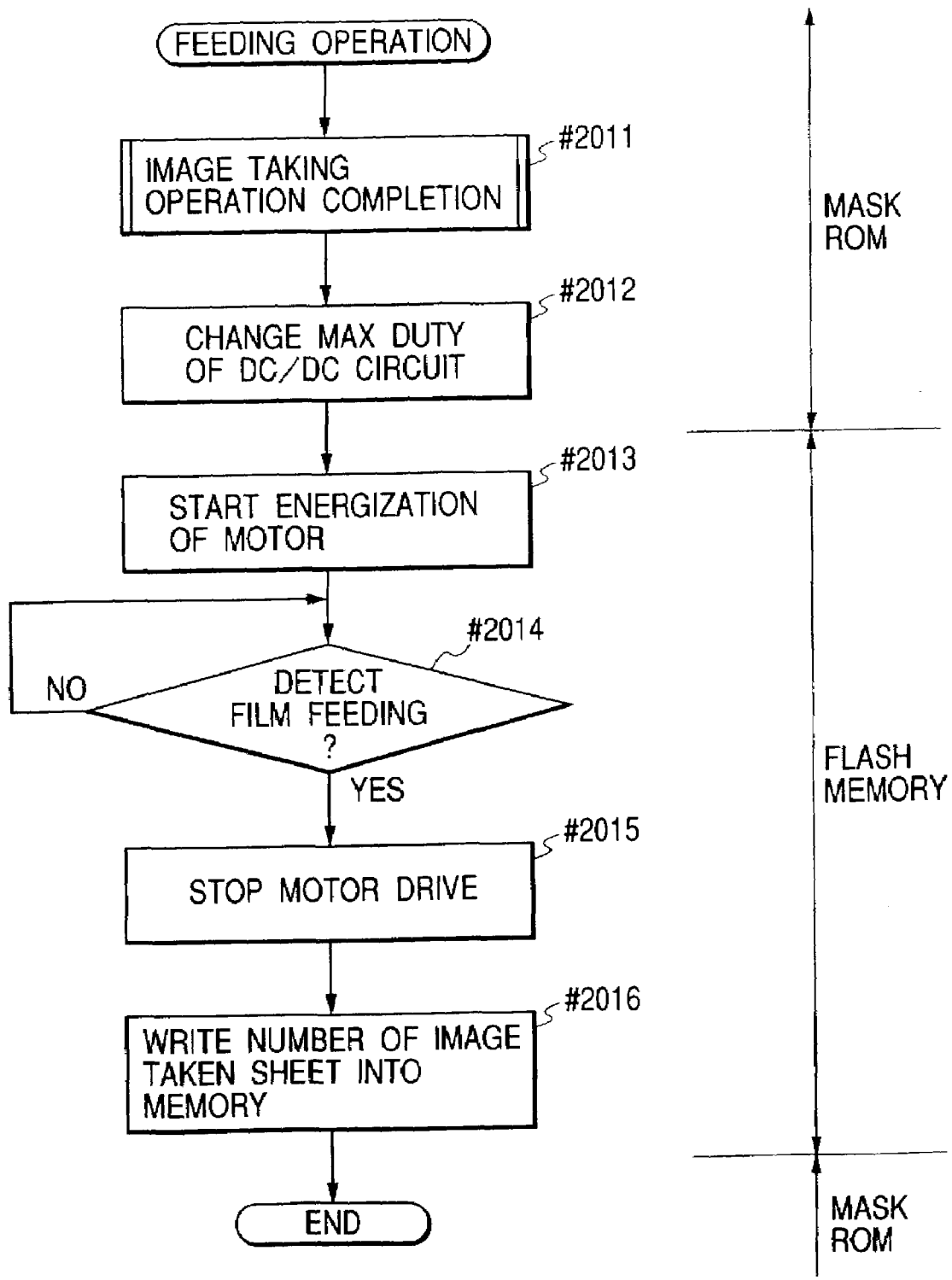
FIG. 27 is a flowchart showing an operation for a ninth embodiment of the present invention.

At step #2011 in FIG. 27, the image taking operation is performed in accordance with a program stored in a mask ROM 213. When the image taking operation is completed, at step #2012, the maximum duty of a DC/DC circuit 206 is changed. In the normal operation, the duty of the DC/DC circuit 209 or a drive frequency is limited in order to prevent excessive voltage boosting. In this embodiment, a voltage drop due to following motor driving operation is predicted, and a limiter is changed so that the control operation is not adversely affected even when the power voltage is dropped. This operation is the guarantee operation.

At step #2013, the motor is driven in order to initiate the film feeding operation using the flash memory 212 where the film feeding program is stored. At step #2014, the film feeding detection process is performed, and when the film is fed by a predetermined distance, at step #2015, the driving of the motor is halted and the film is set to enable the image taking of the next image. During the film feeding, even when the power voltage is dropped by film bracing, the overrun (erroneous operation) of the microcomputer can be prevented because the power regulation capability is improved by changing in advance the limiter of the DC/DC circuit 206. When the film has been set, finally at step #2016, the number of frames after use is written to the flash memory, and can be maintained even when the battery is removed.

As is described above, before the memory is shifted to another memory, the control process is set so as to prevent the state where the operation of the memory at a destination can not be guaranteed, i.e., the guarantee operation is performed. As a result, a failure is prevented in the control process after the memory is changed.

The operation according to a tenth embodiment of the present invention will now be described while referring to the flowchart in FIG. 32. The circuit arrangement of a camera is the same as that shown in FIG. 8.

When the image taking operation is performed in accordance with the program stored in a flash memory 212, at step #2071, the change of the switch state is detected based on the output of a SW circuit 208. When the switch operation has been performed and the change of the switch state is detected, the normal sequence is performed in accordance with the switch state (YES at #2071).

When the change of the switch state is not detected, at step #2072 a check is performed to determine whether two seconds have elapsed. When two seconds do not elapse, the above process is repeated. Thereafter, when two seconds have elapsed without detecting the change of the switch state, program control advances to step #2073, and power supplied to the individual functions is halted, and the operating mode approaches to a low current mode. This is the guarantee operation. Further, the memory is changed to the mask ROM 213 that requires only small power consumption, and at step #2074 the operation of the DC/DC circuit 206 is halted. It should be noted that there is a memory for which the operation is not guaranteed unless the DC/DC circuit 206 is operated. When the DC/DC circuit 206 is halted at step #2074, the operating mode enters the actual low current consumption mode, and at step #2075, is shifted to another mode, wherein an operation other than the timer counting operation and the detection of the change of the switch state is not performed.

The operating condition is set before the memory is shifted so as to prevent the state where the operation of a memory at a destination can not be guaranteed. That is, through the guarantee operation, a failure is prevented in the control process after the memory is changed.

Figure 21:
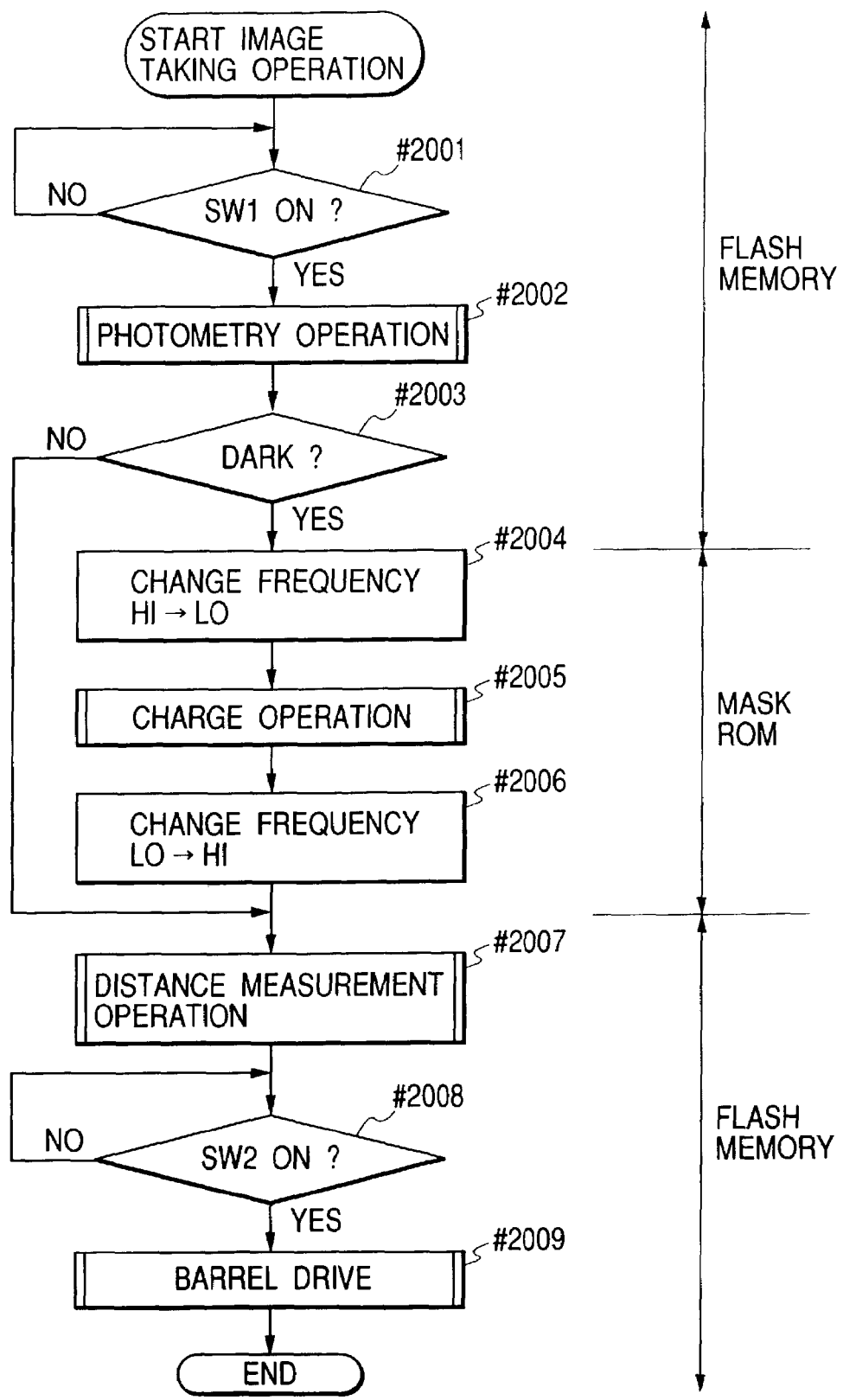
FIG. 21 is a flowchart showing the operation performed for the eighth embodiment of the present invention.
Figure 32:
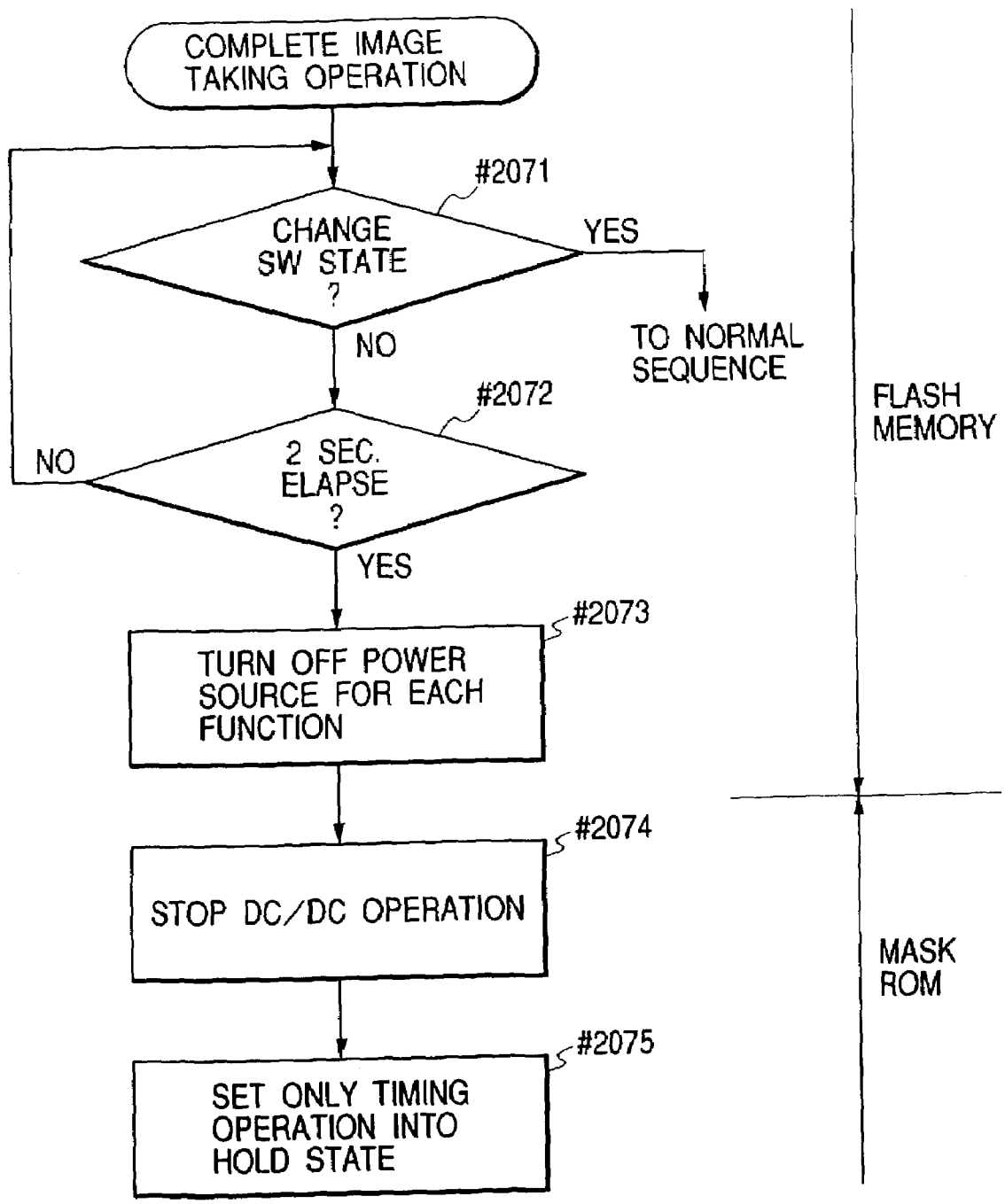
FIG. 32 is a flowchart showing an operation for a tenth embodiment of the present invention.

According to the eighth embodiment to the tenth embodiment, before a camera system using multiple memories shifts the memories to control the operation, the camera system is adjusted in consonance with the operating condition of the memory at a destination, and changes the memory (step #2006 in FIG. 21, step #2012 in FIG. 27, or step #2073 in FIG. 32). As a result, the overrun of the microcomputer that tends to occur during the memory shifting operation can be prevented, and the stable operation can be provided.

Further, after the memory is changed to another memory, the operating condition need only be switched (step #2004 in FIG. 21) to a superior operating condition of the new memory (e.g., the condition where the low-voltage operation is enabled, the fast processing is enabled, or the operation at low power consumption is enabled). Then, the operation more appropriate for the function can be performed, and the specification and the accuracy can be easily increased, so that a superior product is provided.

Figure 33:
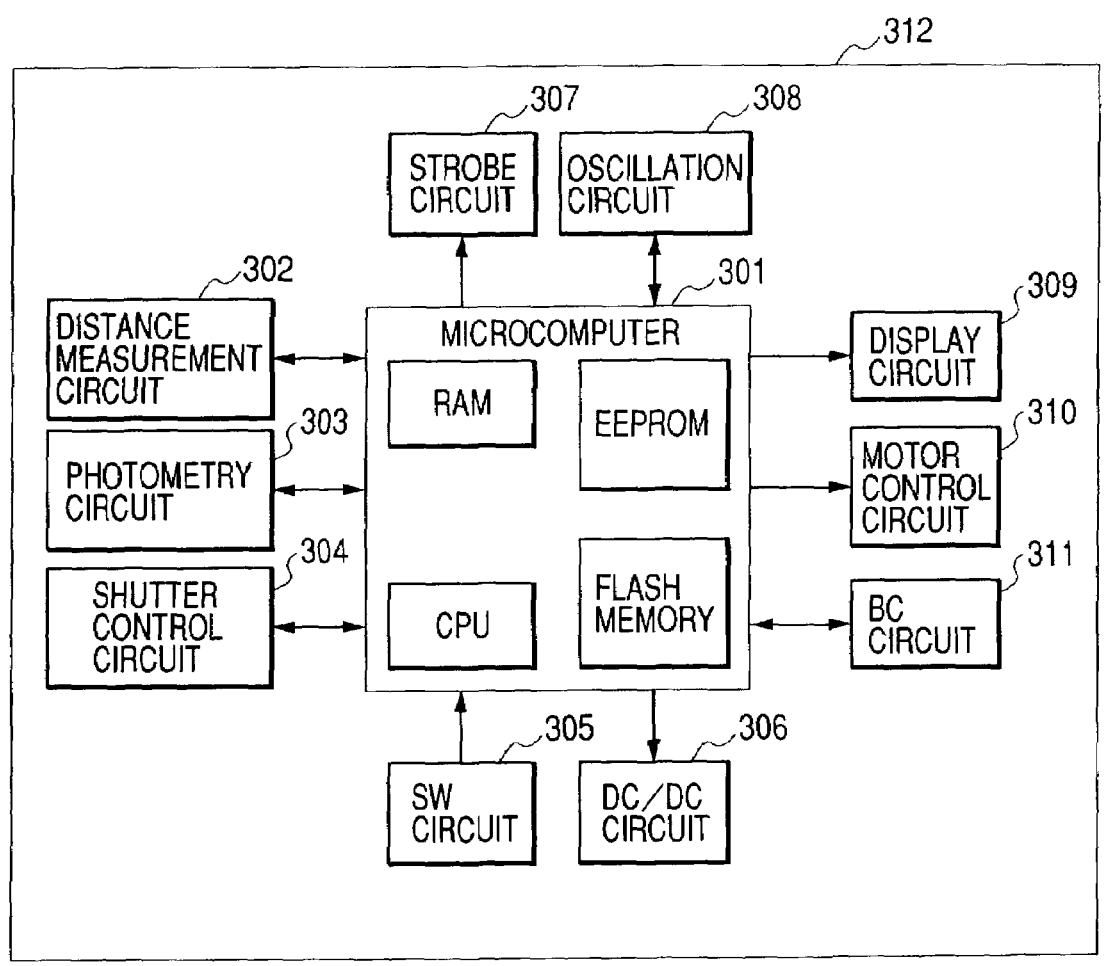
FIG. 33 is a block diagram showing the circuit configuration of the essential portion of a camera according to an eleventh embodiment and a twelfth embodiment of the present invention.

FIG. 33 is a block diagram showing the circuit structure of the essential portion of a camera according to an eleventh embodiment of the present invention.

In FIG. 33, a one-chip microcomputer 301 controls various operations of a camera 312, and includes a central processing unit (CPU), an EEPROM, a flash memory, a RAM and peripheral circuits (not shown), and a data area, a program area and an I/O are stored in the same memory space. Further, a shutter control program, a distance measurement control program and a photometry control program are stored in the flash memory, and a strobe charge control program and a film feeding control program are stored in the EEPROM. These programs are read and executed by the CPU.

A distance measurement circuit 302 measures a distance to an object using a distance measurement sensor (not shown). A photometry circuit 303 measures brightness of the object using a photometry sensor (not shown). A shutter control circuit 304 opens or closes a shutter. A switch circuit 305 includes switches SW1 and SW2 that are turned on respectively by half-depression and full-depression of a release switch (not shown), and switches for setting the individual photography modes. A DC/DC circuit 306 converts a power source voltage into a predetermined voltage, and supplies the voltage to the individual circuits. A well known strobe circuit 307 charges a main capacitor (not shown), and emits light. An oscillation circuit 308, which supplies a clock to the microcomputer 301, supplys a reference clock to a timer circuit (not shown) using a fixed vibrator (e.g., crystal oscillator) (not shown). Further, the oscillation circuit 308 generates a fast operating clock and a slow operating clock by using multiple oscillators, such as a CR oscillator using time constants of a resistor and a capacitor, and a ceramic oscillator using a ceramic vibrator. A display circuit 309 displays the remaining power of a battery and various image taking information, and generates a warning. A motor control circuit 310 controls a feeding motor and a barrel drive motor to wind or rewind a film (not shown). A battery check (BC) circuit 311 employs an A/D converter to detect a power source voltage.

An explanation will now be given for the range for guaranteeing the operations of the EEPROM and the flash memory that are incorporated by the microcomputer 301.

Figure 35:
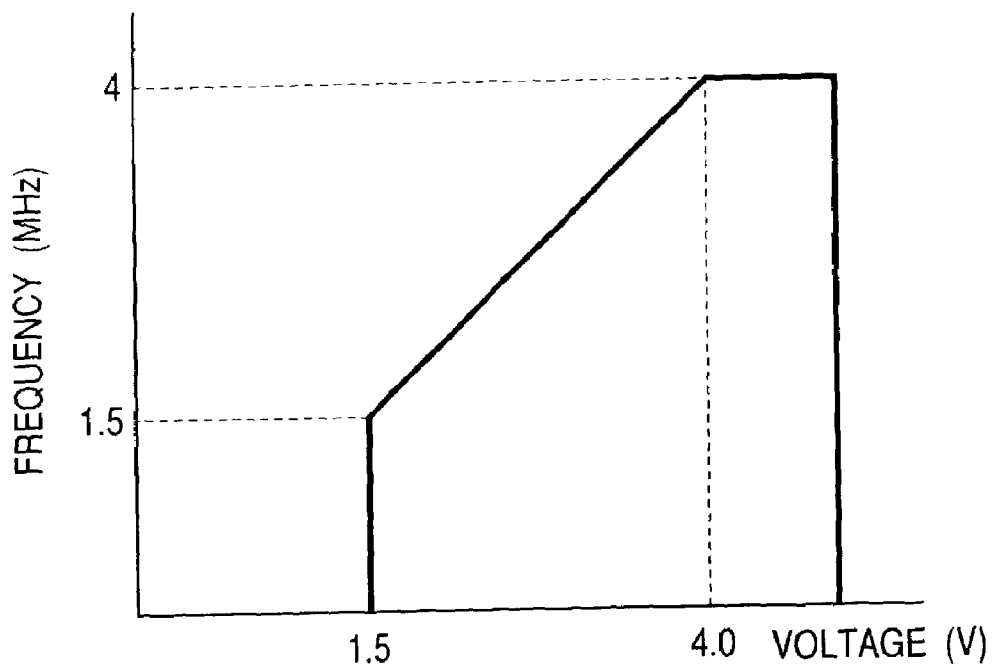
FIG. 35 is a graph showing an operating voltage-operating frequency characteristic for an EEPROM according to the eleventh embodiment and the twelfth embodiment of the present invention.

FIG. 35 is a characteristic graph showing the relationship between the operating voltage and the operating frequency according to an eleventh embodiment of the present invention.

Figure 36:
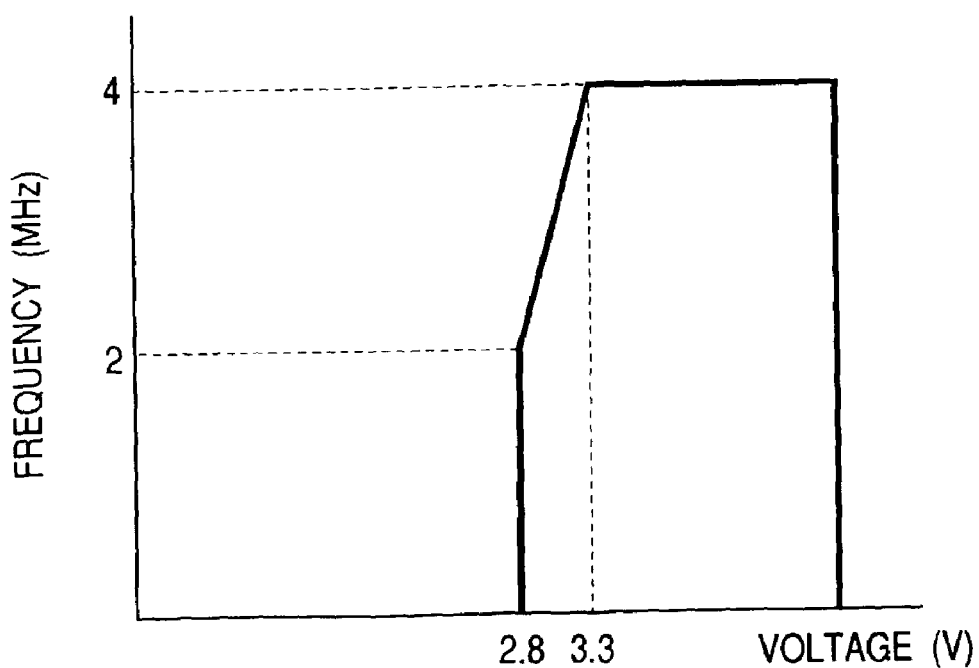
FIG. 36 is a graph showing an operating voltage-operating frequency characteristic for a flash memory according to the eleventh embodiment and the twelfth embodiment of the present invention.
Figure 37:
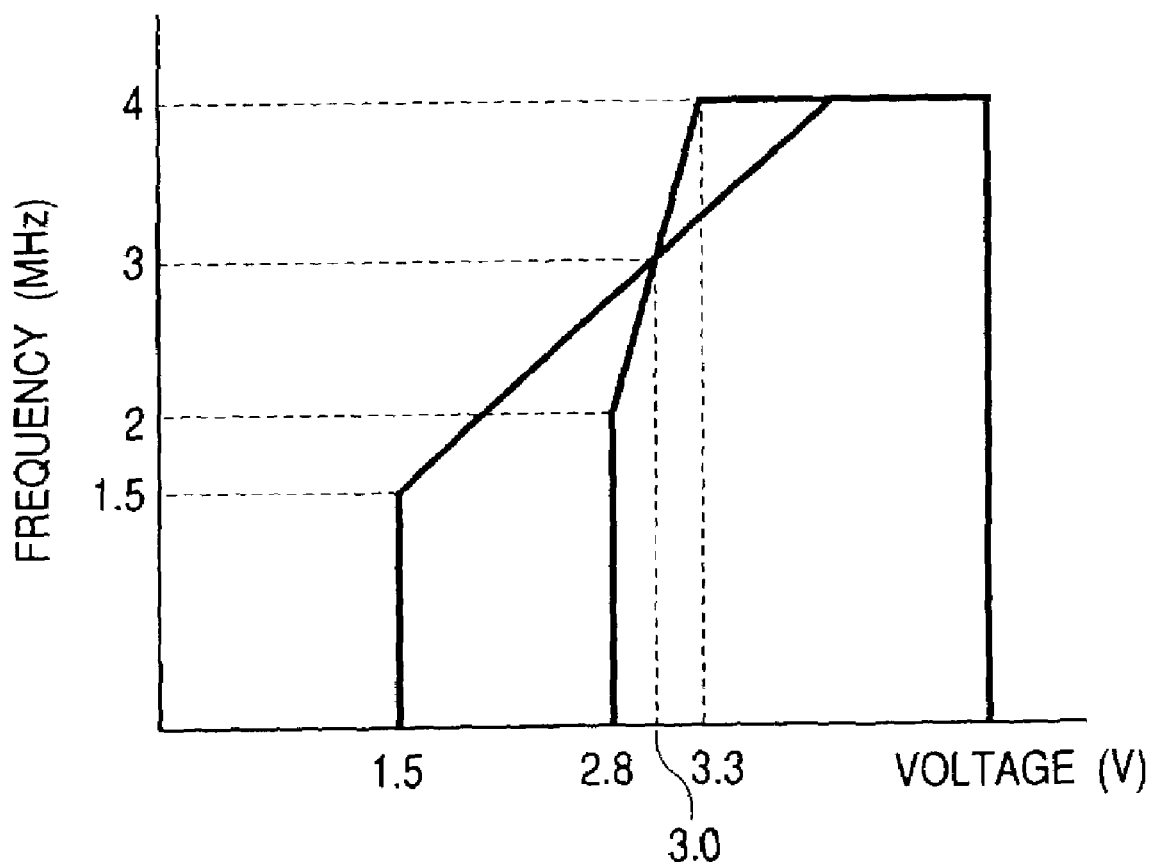
FIG. 37 is a graph showing an operating voltage-operating frequency characteristic for the EEPROM and the flash memory according to the eleventh embodiment and the twelfth embodiment of the present invention.

It is apparent from the characteristic graph that the relationship between the operating voltage and the operating frequency differs between the EEPROM and the flash memory. It is also found that the range for the operating voltage is narrow for the flash memory, and the selection range for the operating frequency relative to the operating voltage is large. FIG. 37 is a graph obtained by superimposing the graphs in FIGS. 35 and 36 together to easily understand the relationship. It is obvious that the upper limits of the operating frequency for the flash memory and the EEPROM are inverted at about 3 V. Specifically, it is found that, for the EEPROM, a high operating frequency can be set at the same voltage level in the range from 2.8 V to 3.0 V and that, for the flash memory, a high operating frequency can be set in the range from 3.0 V to 4.0 V. Whereas, from the viewpoint of the operating frequency as a reference, for the EEPROM, a low operating voltage can be set at the same operating frequency level in the range up to 3 MHz, and for the flash memory, a low operating voltage can be set at the same operating frequency level in the range above 3 MHz.

Figure 34B:
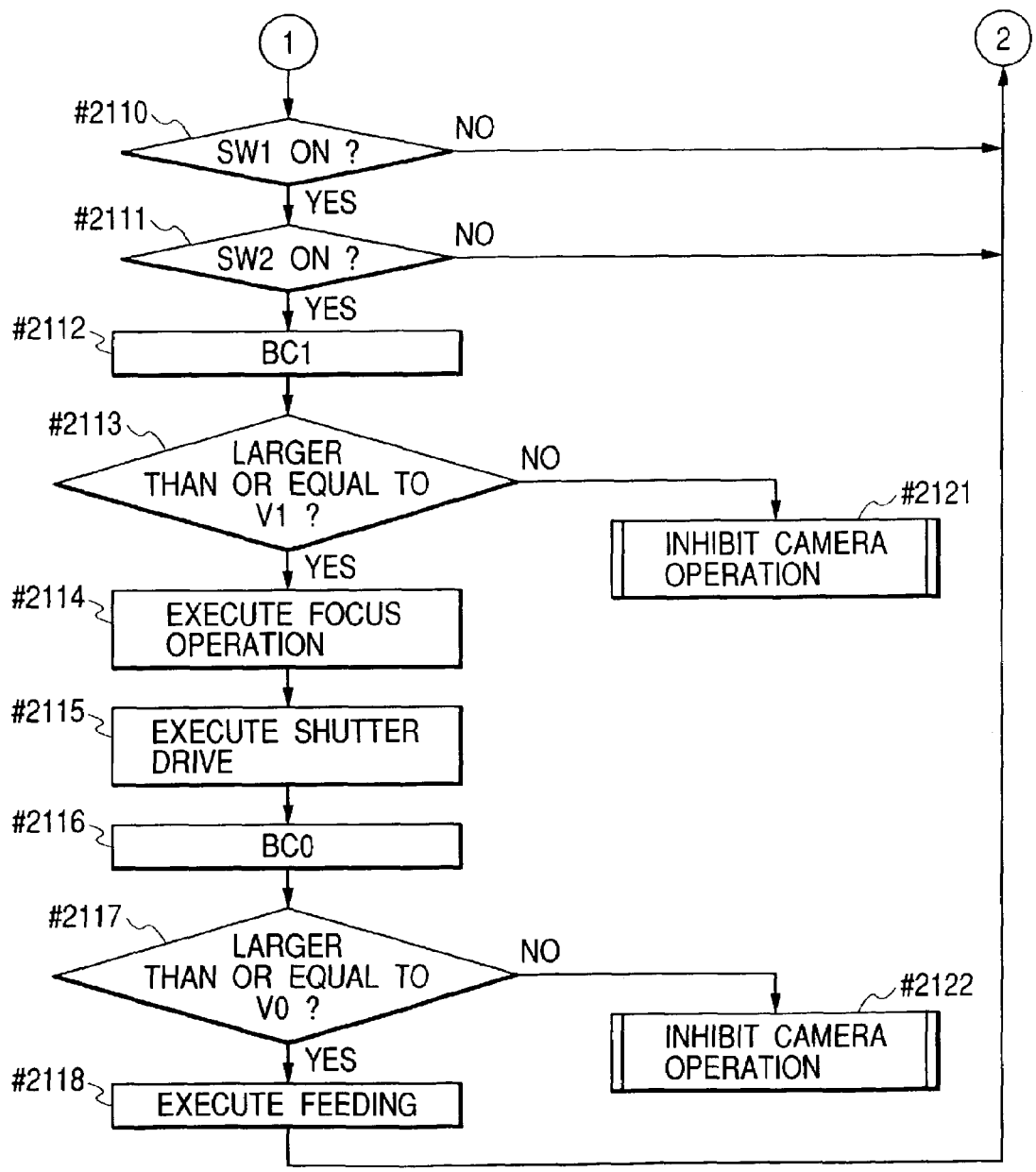
FIG. 34 is comprised of FIGS. 34A and 34B showing flowcharts of the release operation for the camera according to the eleventh embodiment of the present invention.

The camera operation at the release time will now be described while referring to the flowchart in FIGS. 34A and 34B. When a battery is loaded to a camera as a power source, power is supplied to the individual circuits of the camera, including the DC/DC circuit 206, and the camera initiates the operation based on a camera control program stored in the EEROM. At this time, the operating frequency is low operating clock supplied by the oscillation circuit 308.

First, at step #2101, the states of the operating switches of the camera are detected through the SW circuit 305 through an input/output port (not shown). When the change of the switch state is detected, at step #2102 the battery check operation for the power source voltage is performed by the BC circuit 311. At step #2103, the voltage detected at step #2102 is compared with a predetermined voltage value V1 (=2.8 V) that is stored in advance as the lowest operating voltage of the flash memory. When the detected voltage is equal to or higher than 2.8 V, program control advances to step #2104. When the detected voltage is lower than 2.8 V, program control is shifted to step #2119.

At step #2104, the operating frequency is changed to a high frequency, and in accordance with the switch detection control program stored in the flash memory, the state of the switch SW1 is detected by the SW circuit 305 through the input/output port (not shown) of the microcomputer. Since the control programs for steps #2105 to #2108 are also stored in the flash memory, the camera operation is performed using the flash memory.

When it is ascertained at step #2104 that the switch SW1 is ON, program control advances to step #2105 to start the release preparation. The distance measurement circuit 302 is operated to obtain the information for a distance to the object, and at step #2106, the photometry circuit 206 is operated to obtain information for the brightness of the object. At step #2107, the battery check operation for the power source voltage is performed by the BC circuit 311. At step #2108, the voltage detected at step #2107 is compared with a predetermined voltage value V0 (=1.5 V) that is stored in advance as the lowest operating voltage of the EEPROM. When the detected voltage is equal to or higher than 1.5 V, program control advances to step #2109. When the detected voltage is lower than 1.5 V, program control is shifted to step #2120.

At step #2109, the operating frequency is changed to low, and a charge control program, which is stored in the EEPROM to charge (strobe charge) a main capacitor that accumulates energy to emit a strobe, is executed until the strobe charging is completed. When the strobe charging is terminated, program control advances to step #2110. Since the control programs for steps #2110 to #2113 are also stored in the EEPROM, the camera operation is performed using the EEPROM.

At steps #2110 and #2111, a check is performed to determine whether the switches SW1 and SW2 are ON. When both switches SW1 and SW2 are ON, program control advances to step #2112. At step #2112, the battery check operation for the power source voltage is performed by the BC circuit 311. At step #2113, the voltage detected at step #2112 is compared with a predetermined voltage value V1 (=2.8 V) that is stored in advance as the lowest operating voltage of the flash memory. When the detected voltage is equal to or higher than 2.8 V, program control advances to step #2114. When the detected voltage is lower than 2.8 V, program control is shifted to step #2121.

At step #2114, the operating frequency is changed to high, and at step #2105, based on the distance information obtained at step #2105, the motor control circuit 310 controls a barrel motor (not shown) to focus an imaging lens (not shown) to the object. Since the control programs for steps #2114 to #2117 are stored in the flash memory, the operation up to step #2117 is performed using the flash memory.

At step #2115, in order to expose a film, the shutter control circuit 304 is operated to energize and control the shutter to open the shutter, and the timer circuit (not shown) counts a predetermined period of time to measure the shutter opening period. Then, the shutter control circuit 304 is operated to perform the close operation of the shutter. Further, at this time, the strobe emission information based on the brightness information obtained at step #2106 is examined, and when the strobe emission is designated as an emission condition, the strobe is emitted. At step #2116, the battery check operation for the power source voltage is performed by the BC circuit 311, and at step #2117, the voltage detected at step #2116 is compared with a predetermined voltage value V0 (=1.5 V) that is stored in advance as the lowest operating voltage of the EEPROM. When the detected voltage is equal to or higher than 1.5 V, program control advances to step #2118. When the detected voltage is lower than 1.5 V, program control is shifted to step #2122.

At step #2118, the operating frequency is changed to low, and in accordance with the feeding program stored in the EEPROM, the motor control circuit 309 energizes the feeding motor (not shown) to perform the film feeding operation (winding the film). After the film feeding operation, program control returns to step #2101, and waits for the depression of a switch.

At steps #2119 and #2121, an inhibition program stored in the EEPROM for memory shifting is performed, and the camera operation is inhibited. At steps #2120 and #2122, an inhibition program stored in the flash memory to inhibit the memory shifting is performed, and the camera operation is inhibited.

According to the eleventh embodiment, the memory is shifted to a different memory during the camera control process, by confirming that the voltage matches the operating condition of a memory at a destination (steps #2103, #2108, #2113 and #2117). Therefore, the control process where the operations of the individual memories are ensured can be performed.

Figure 38B:
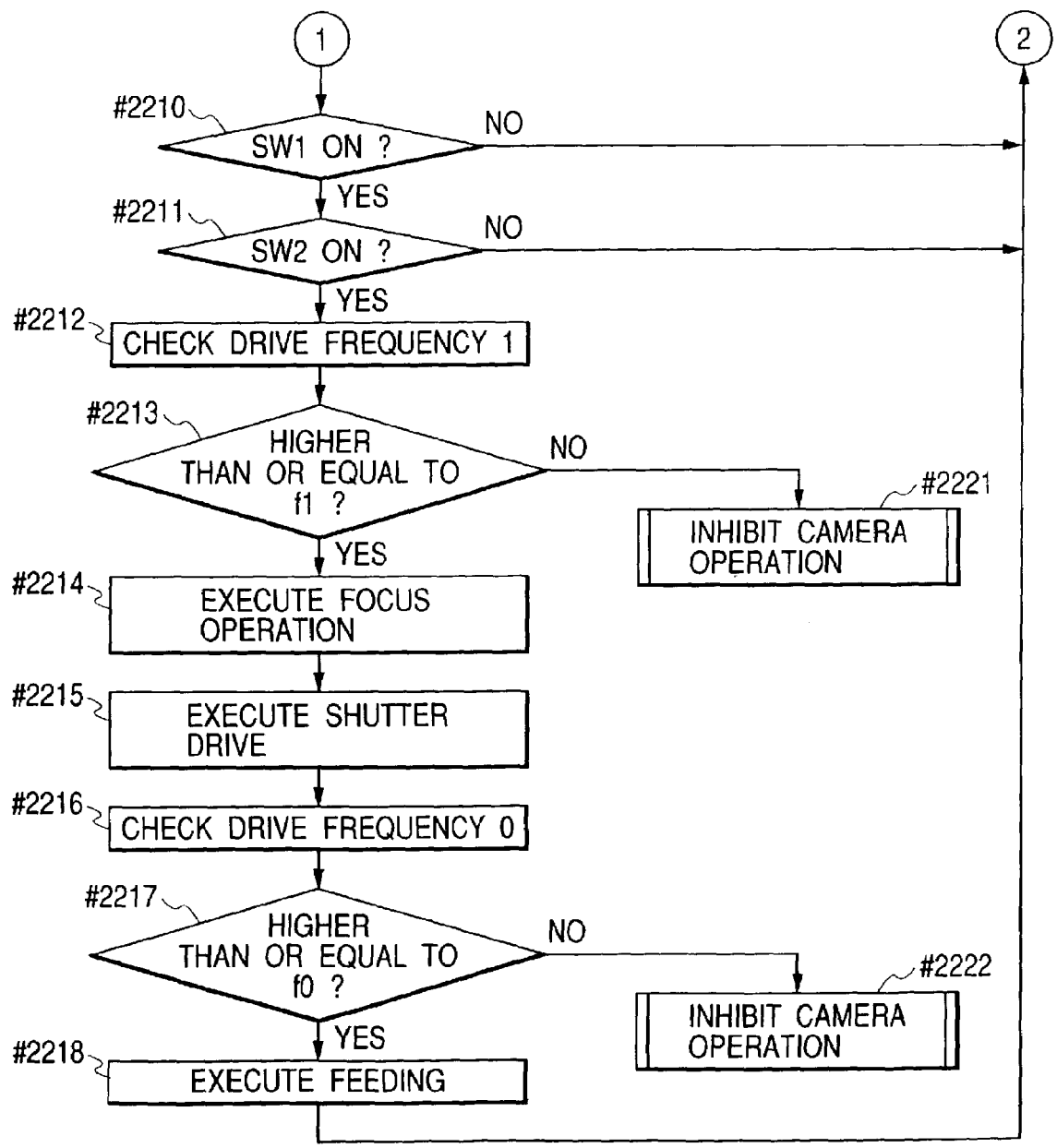
FIG. 38 is comprised of FIGS. 38A and 38B showing flowcharts of the photographing operation of the camera according to the twelfth embodiment of the present invention.

The camera release operation according to a twelfth embodiment of the present invention will now be described while referring to the flowchart in FIGS. 38A and 38B. The circuit structure of the camera is the same as that in FIG. 33. When a battery that is a power source is loaded to the camera, power is supplied to the individual circuits, such as a DC/DC circuit 306, and the camera starts the operation in accordance with a camera control program stored in the EEPROM. At this time, the operating frequency is a low operating clock supplied by an oscillation circuit 308.

First, at step #2201, the state of each operation switch of the camera is detected by a switch circuit 305 through an input/output port (not shown). When the change of the switch state is detected, program control advances to step #2202, and the operating frequency, which is generated by the oscillation circuit 308 that includes a ceramic oscillator using a ceramic vibrator, is changed. At step #2203, a frequency measured at step #2202 is compared with a predetermined frequency f1 (=2.0 MHz) that is stored in advance as the lowest operating frequency of the flash memory. When the detected frequency is equal to or higher than 2.0 MHz, program control advances to step #2204. When the detected frequency is lower than 2.0 MHz, program control is shifted to step #2219.

At step #2204, the operating frequency is changed to high, and in accordance with the switch detection control program in the flash memory, the microcomputer permits the switch circuit 305 to detect the state of the switch SW1 through an input/output port (not shown). Since the control programs for steps #2205 to #2208 are stored in the flash memory, the camera operation is performed using the flash memory.

When it is ascertained at step #2204 that the switch SW1 is ON, program control advances to step #2205 to start the release preparation operation, and the distance measurement circuit 302 performs the distance measurement operation to obtain information for a distance to the object. At step #2206, the photometry circuit 303 is operated to obtain information of the brightness of the object. At step #2207, the operating frequency is changed by the oscillation circuit 308, and is measured by using the timer circuit provided for the microcomputer. At step #2208, the operating frequency measured at step #2207 is compared with a predetermined frequency f0 (=1.5 MHz) that is stored in advance as the lowest operating frequency of the EEPROM. When the operating frequency is equal to or higher than 1.5 MHz, program control advances to step #2209. When the operating frequency is lower than 1.5 MHz, program control is shifted to step #2220.

At step #2209, the operating frequency is changed to low, and a charge control program, which is stored in the EEPROM to charge (strobe charge) a main capacitor for accumulating energy to perform strobe emission, is executed until the strobe charging is completed. When the strobe charging is terminated, program control advances to step #2210. Since the control programs at steps #2210 to #2213 are also stored in the EEPROM, the camera operation is performed using the EEPROM.

At steps #2210 and #2211, a check is performed to determine whether the switches SW1 and SW2 are ON. When these switches SW1 and SW2 are ON, program control advances to step #2212, and the operating frequency is changed by the oscillation circuit 308, and is measured by using the timer circuit provided for the microcomputer. At step #2213, the frequency obtained at step #2212 is compared with a predetermined frequency f0 (=2.0 MHz) that is stored in advance as the lowest operating frequency of the flash memory. When the frequency is equal to or higher than 2.0 MHz, program control advances to step #2214. When the frequency is not lower than 2.0 MHz, program control is shifted to step #2221.

At step #2214, the operating frequency is changed to high, and in accordance with the distance information obtained at step #2205, a motor control circuit 310 controls a barrel motor (not shown) to focus an imaging lens (not shown) to the object. Since the control programs for steps #2214 to #2217 are stored in the flash memory, the operation up to step #2217 is performed using the flash memory.

At step #2215, to expose the film, a shutter control circuit 304 that energizes and controls a shutter is operated to open the shutter, and the timer circuit (not shown) measures a predetermined period in order to count the shutter open period. Then, the shutter control circuit 304 closes the shutter. Furthermore, at this time, strobe emission information based on the brightness information obtained at step #2206 is examined, and when the strobe emission is designated as an emission condition, the strobe emission is performed. At step #2216, the operating frequency is changed by the oscillation circuit 308, and is measured by using the timer circuit of the microcomputer. At step #2217, the frequency obtained at step #2216 is compared with a predetermined frequency f1 (=1.5 MHz) that is stored in advance as the lowest operating frequency of the EEPROM. When the frequency is equal to or higher than 1.5 MHz, program control advances to step #2218. When the frequency is lower than 1.5 MHz, program control is shifted to step #2222.

At step #2218, the operating frequency is changed to low, and in accordance with a feeding program stored in the EEPROM, the motor control circuit 309 energizes a feeding motor (not shown) to perform the film feeding operation (film winding). After the film feeding operation, program control returns to step #2210, and waits until a switch is depressed.

At steps #2219 and #2221, an inhibition program, which is stored in the EEPROM to inhibit the memory shifting, is performed, and the camera operation is inhibited. At steps #2220 and #2222, an inhibition program, which is stored in the flash memory to inhibit the memory shifting, is performed and the camera operation is inhibited.

According to the twelfth embodiment, in the camera control processing, the memory is shifted to another memory by confirming that the operating frequency matches the operating condition for a memory at a destination (steps #2203, #2208, #2213 and #2217). Thus, the camera control process for ensuring the operations for the individual memories can be performed.

According to the eleventh embodiment and twelfth embodiment, a one-chip microcomputer that incorporates the flash memory and the EEPROM has been explained. IN addition to the one-chip microcomputer, the same effects can be obtained through the same processing when various other memories, such as an EPROM, a mask ROM and an FRAM, are employed together.

As is described above, according to the eleventh embodiment and the twelfth embodiment, in the camera control process, the memory to be controlled is changed to another memory by confirming that the operating voltage or the operating frequency matches the operating condition of a memory at a destination. Therefore, the camera control process for ensuring the operations of the individual memories can be performed.

Figure 39:
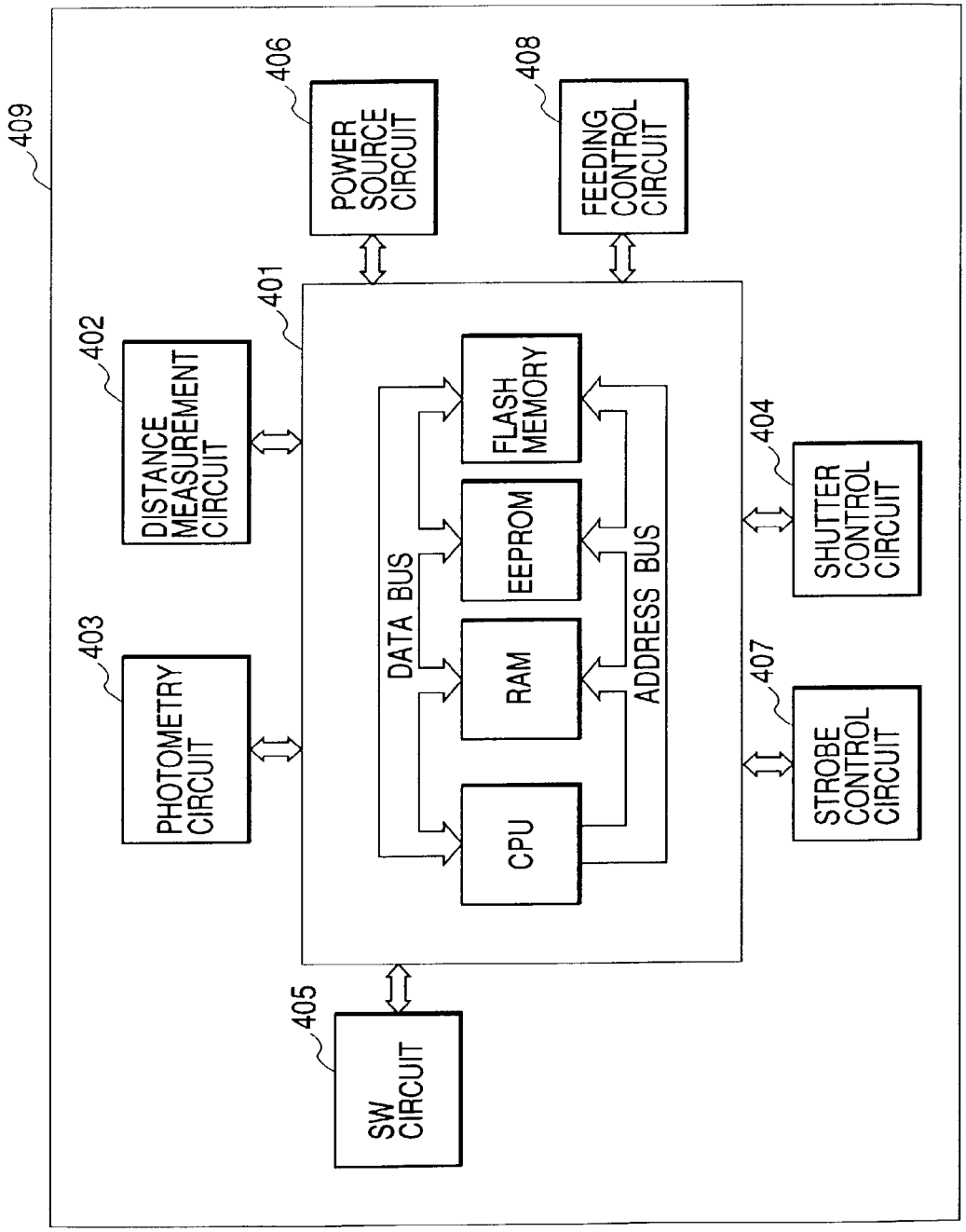
FIG. 39 is a block diagram showing the circuit configuration of the essential portion of a camera according to a thirteenth embodiment of the present invention.

FIG. 39 is a block diagram showing the circuit structure of the essential portion of a camera according to a thirteenth embodiment of the present invention.

In FIG. 39, a one-chip microcomputer 401 controls various operations of a camera 409, and includes a central processing unit (CPU), a flash memory, a RAM, an EEPROM and peripheral circuits (not shown). A distance measurement circuit 402 employs a distance measurement sensor (not shown) to obtain information for a distance to an object. A photometry circuit 403 employs a photometry sensor (not shown) to obtain information for the brightness of an object. A shutter control circuit 404 performs the control of open and close of a shutter. A SW circuit 405 includes operation switches, such as switches SW1 and SW2 that are turned on respectively by half-depression and full-depression of a release switch (not shown), and switches for setting image taking modes. A power source circuit 406 supplies power to the individual circuits. A strobe control circuit 407 charges a main capacitor (not shown) for light emission. A feeding control circuit 408 controls a feeding motor to wind or rewind a film (not shown).

Control programs for controlling the camera operations, such as detection of the states of the operation switches, photometry, distance measurement, film feeding and strobe charging, are stored in a flash memory. Various control data that are frequently rewritten are stored in an EEPROM. For each product type, the minimum data unit (e.g., 128 bytes) to be written or erased is defined for the flash memory, and even when a small amount of data is to be written or erased, the minimum data unit must be collectively handled. Therefore, when there are multiple data sets that are frequently rewritten, unnecessary writing and erasing would be performed for many cells, so that the reliability would be lost easily. To avoid the reduction of the reliability, the control data that are frequently rewritten are stored in the EEPROM in which rewriting of data by a small data unit is enabled.

The control programs in the flash memory and the EEPROM and the control data in the EEPROM are read and executed by the CPU.

While referring to the flowchart in FIG. 40, an explanation will be given for the control processing of the camera 409 according to the thirteenth embodiment of the present invention, i.e., the shutter driving processing for which a large current is required and a power source voltage is greatly dropped.

At step #2301, the microcomputer 401 determines whether the switch SW1 is turned on. When the switch SW1 is not turned on, the microcomputer 401 waits until it is turned on. When the ON state of the switch SW1 is detected, program control advances to step #2302, and the distance measurement circuit 402 measures the distance to an object. At step #2303, the photometry circuit 403 measures the brightness of the object. At step #2304, the battery check operation is performed. In this operation, it is confirmed that a battery power enough to normally operate the camera is provided for the camera operation, such as the shutter driving operation, that requires a large current.

Figure 41:
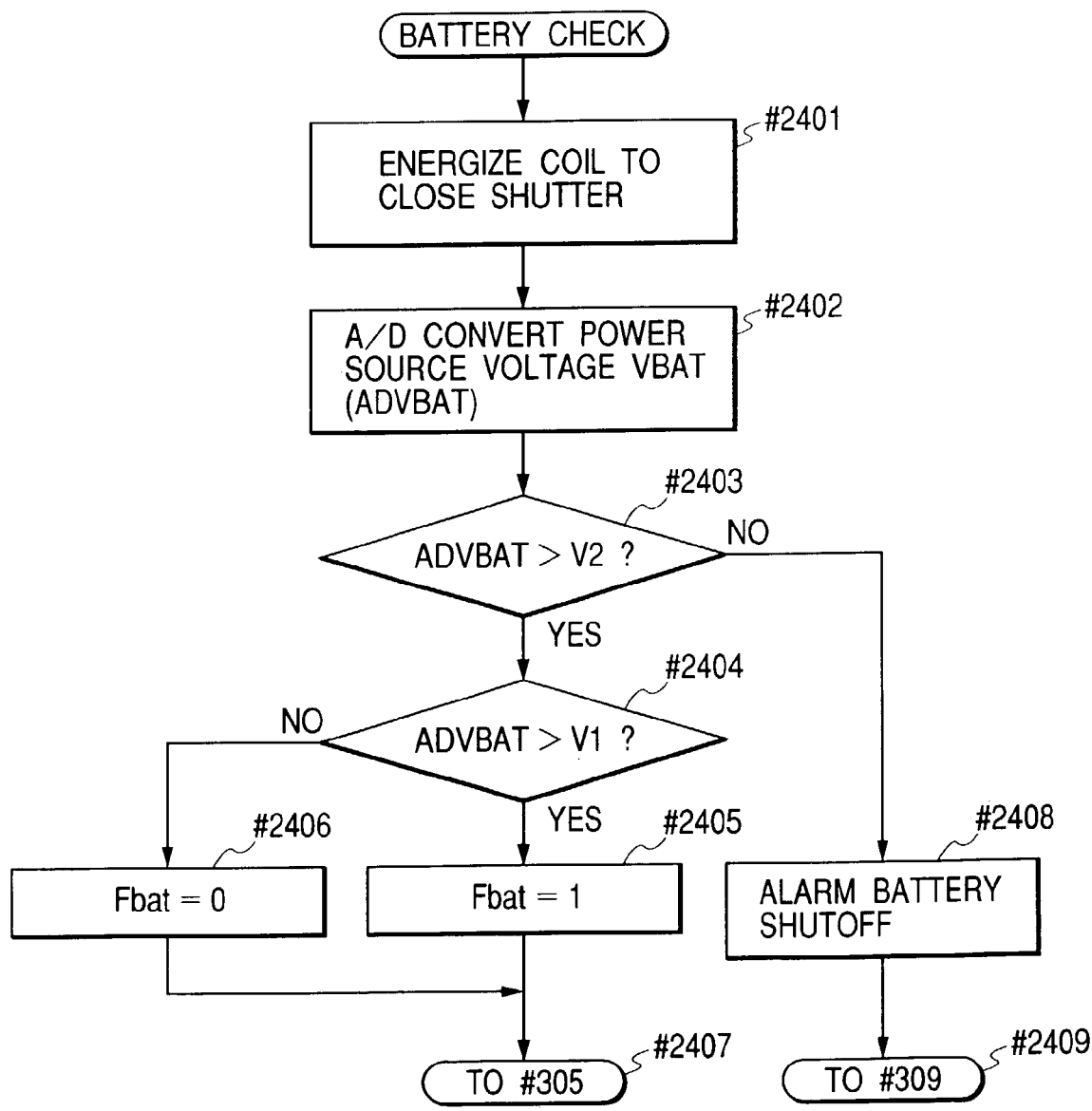
FIG. 41 is a flowchart showing the battery check operation of the camera according to the thirteenth embodiment of the present invention.

The battery check operation will now be described while referring to the flowchart in FIG. 41.

When the battery check operation is started, at step #2401, for a short time period (e.g., 5 mS), a predetermined amount of power is supplied to a shutter driving coil in the direction in which the shutter is closed. This is because the drop of the power source voltage VBAT under the application of a predetermined load is measured to determine whether the battery capacity enough to normally operate a camera is provided for a camera operation, such as a shutter driving operation, wherein a large current is required. The load imposed in the battery check operation is not limited to energization of the shutter coil, and can be any other load so long as the usability of the camera is not deteriorated.

At step #2402, after the shutter is energized for a period of 5 mS, the A/D conversion is performed for the power source voltage VBAT into a value ADVBAT, and the value ADVBAT is stored. At steps #2403 and #2404, a check is performed to determine whether the value ADVBAT obtained by A/D conversion for the value VBAT represents the battery power enough to normally operate the camera.

This determination process will now be described.

At a clock (e.g., 16 MHz) in the normal operation of the camera 409, the lowest operation-enabled voltage differs in each memory, e.g., 1.8 V for a RAM, 2.4 V for a flash memory and 2.8 V for an EEPROM. Therefore, to ensure the normal camera operation, a voltage that all the memories can be operated even when the VBAT is dropped, i.e., the battery power that ensures 2.8 V that is the EEPROM can be operated, need only be provided.

Whereas, so long as the camera operation can be performed only by using a memory the operation of which is guaranteed, the camera operation can be performed at a lower voltage. For example, when the operation is performed by using the flash memory, the operation can be performed at 2.4 V, which is lower than 2.8 V.

According to the thirteenth embodiment, therefore, multiple battery check levels are provided in accordance with the lowest operating voltages of the individual memories. The available memory is selected in accordance with the battery power, and the control program or the control data is transmitted to the selected memory, so that the normal camera operation can be performed at a lower voltage. Specifically, assume that V1 (2.8 V in this case) denotes a battery check level whereat, when the camera operation that requires a large current is executed, it can be guaranteed that the power source voltage will not be reduced to equal to or lower than the lowest operating voltages of all the memories, and V2 (2.4 V<V2<2.8 V) denotes a battery check level whereat the operation of the EEPROM is not guaranteed while the flash memory can be operated. In accordance with the battery check level, the control program and the control data are transmitted to the memory that can be operated.

At step #2403, a check is performed to determine whether ADVBAT is greater than V2. When ADVBAT is equal to or smaller than V2, the following camera operation can not be guaranteed, and program control is shifted to step #2408. An alarm for battery shutoff is displayed for a user, and at step #2409, the camera operation is terminated.

When at step #2403 ADVBAT is greater than V2, at step #2404, a check is performed to determine whether ADVBAT is greater than V1. When ADVBAT is greater than V1, at step #2405 "1" is substituted into a battery check flag Fbat representing that the operations of all the memories can be performed. Program control returns to the image taking sequence in FIG. 40. When ADVBAT is equal to or smaller than V1, at step #2406, since the operation at the EEPROM is disabled, "0" is substituted into Fbat. Program control returns to the image taking sequence in FIG. 40.

Figure 40:
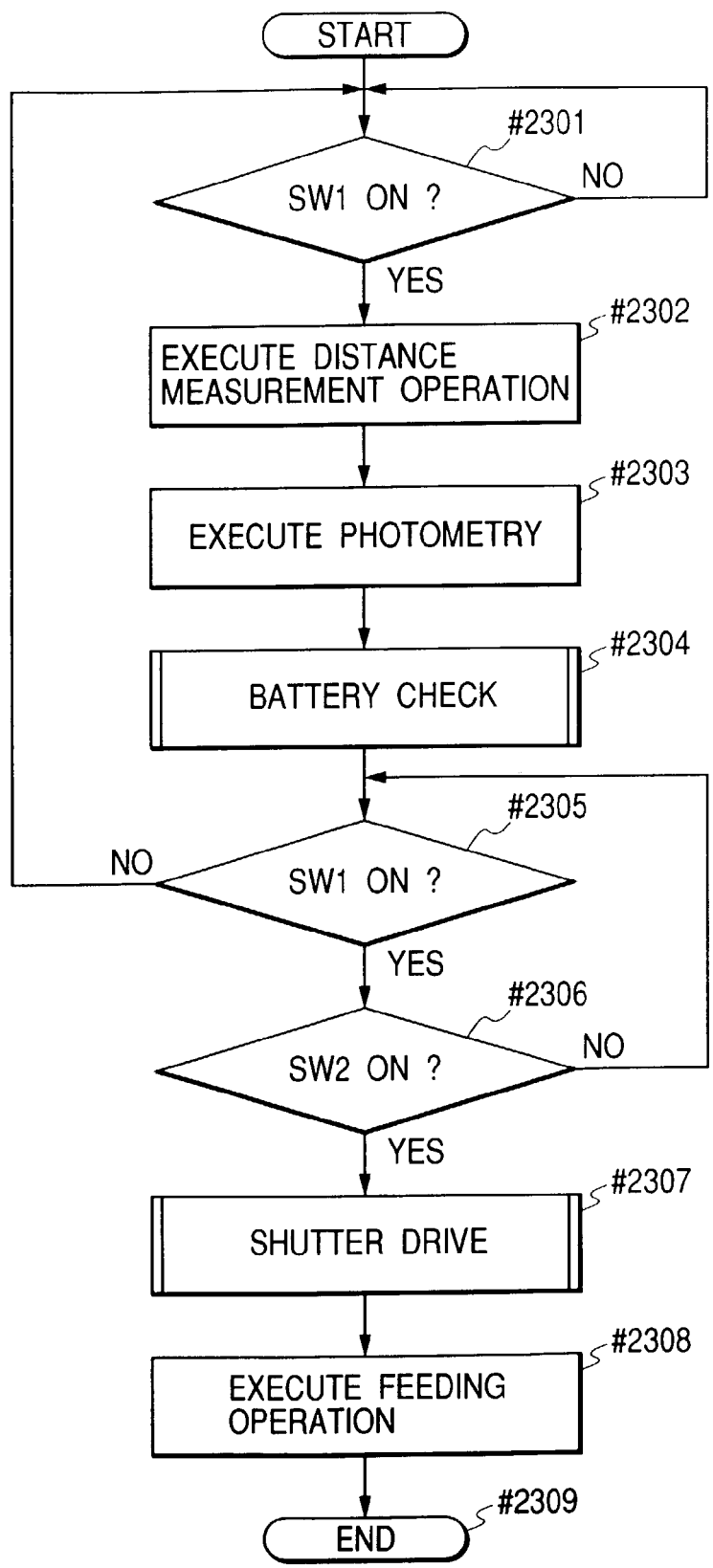
FIG. 40 is a flowchart showing the photographing operation of the camera according to the thirteenth embodiment of the present invention.

In the image taking sequence in FIG. 40, at step #2305, a check is performed to determine whether the switch SW1 is ON. When the switch SW1 is not ON, program control returns to step #2301. When the switch SW1 is ON, at step #2306 the state of the switch SW2 is examined. When the switch SW2 is ON, at step #2307, under the image taking condition set by the microcomputer 401, the shutter control circuit 404 is driven to perform the exposure operation. When the switch SW2 is not ON, program control returns to step #2305.

While referring to FIGS. 42 and 43, an explanation will now be given for the shutter driving operation as the camera operation that requires a large current, which is the essential processing for the thirteenth embodiment.

According to a well known shutter driving technique, with a constant current, a movable coil is driven as a source for driving a shutter blade (not shown), a slit formed in the shutter blade is detected in accordance with a pulse signal detected by a photointerrupter, and the opening time and the light emission timing are controlled to drive the shutter blade. Therefore, the shutter driving sequence is implemented by performing control programs that are: an "initialization operation" block for performing initial operation, for example, setting threshold values of a comparator that converts into pulses a current supplied to the photointerrupter, a detected resistance of the photointerrupter, and the output of the photointerrupter; and a "coil driving" block for permitting a shutter drive movable coil to control the shutter, so that appropriate exposure can be performed in accordance with the photometry results.

Figure 42:
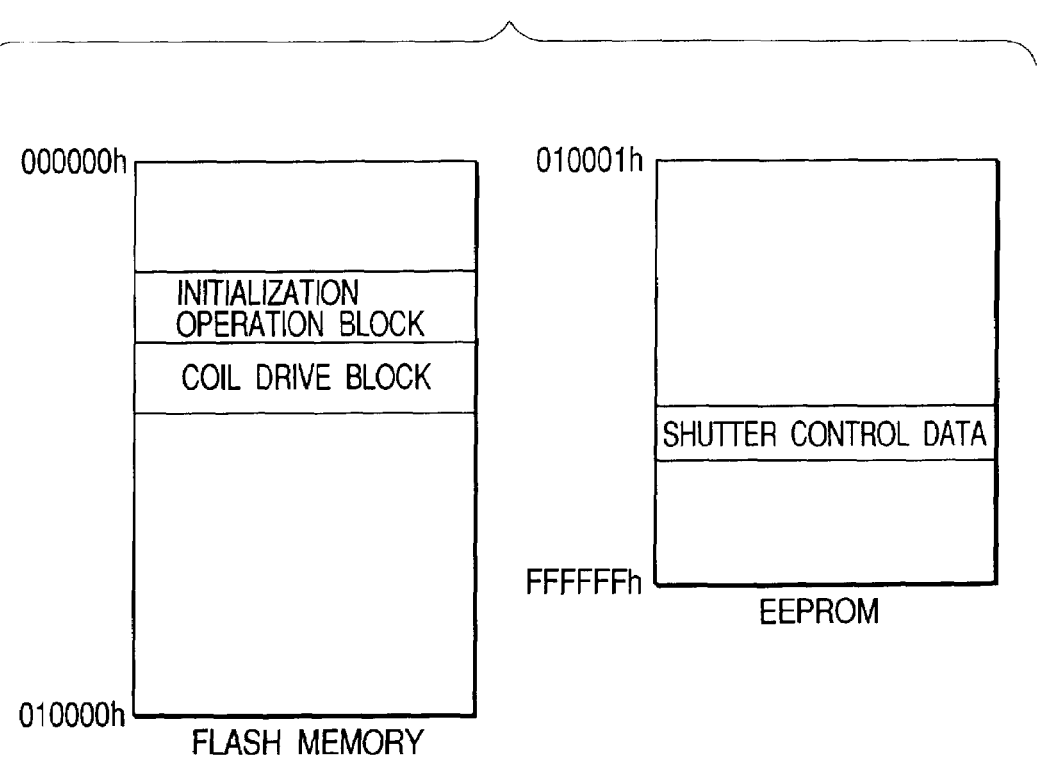
FIG. 42 is a diagram showing a shutter control program and the arrangement of control data in a memory according to the thirteenth embodiment of the present invention.

FIG. 42 is a diagram showing how a control program for driving a shutter and control data are stored in a memory. As is shown in FIG. 42, the control programs for the initialization operation block and the coil driving block are stored in a flash memory, while the control data, such as the current value and the detected resistance of the photointerrupter, the threshold values of the comparator and the current supplied to the shutter, are stored in an EEPROM. Therefore, in order to drive the shutter, the programs and data stored in the flash memory and the EEPROM are required.

Figure 43:
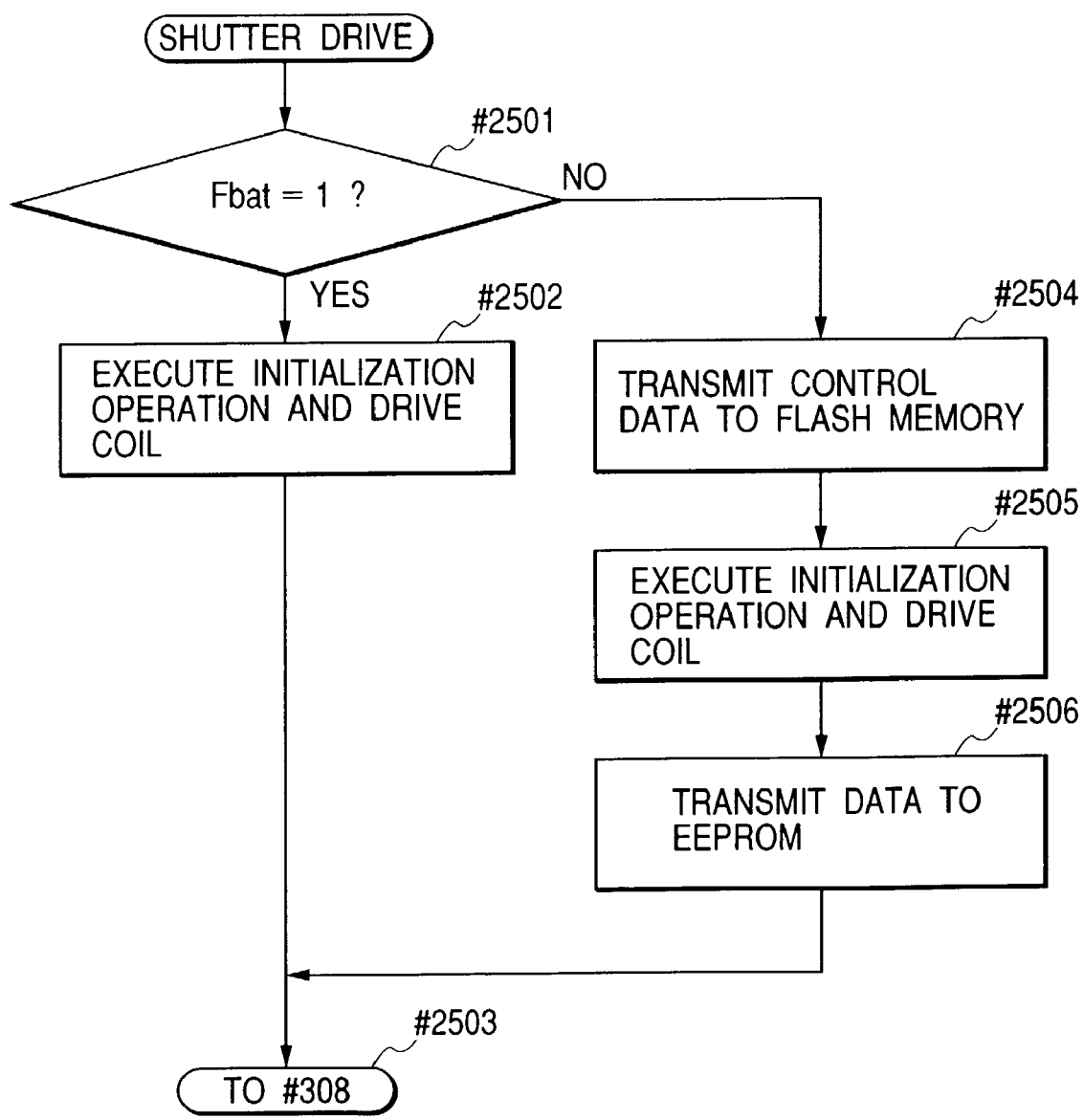
FIG. 43 is a flowchart showing the shutter drive operation of the camera according to the thirteenth embodiment of the present invention.

In FIG. 43, when the shutter driving sequence is started, at step #2501 a check is performed to determine whether the battery check flag Fbat at step #2304 is set to "1". When it is ascertained that the flag Fbat is "1", a large current is supplied to the shutter driving coil. Since the operation in all the memories is guaranteed when the drop of a power source voltage occurs, the flash memory and the EEPROM are accessed as needed. At step #2502, the control programs of the "initialization operation" and the "coil driving" are employed to drive the shutter, and at step #2503, program control returns to the image taking sequence in FIG. 40.

When it is ascertained at step #2501 that the battery check flag Fbat is not set to "1", a large current is supplied to the shutter driving coil. Since, when the drop of the power source voltage occurs, the operation of the flash memory is guaranteed but the operation of the EEPROM is not guaranteed, program control advances to step #2504 and the control data for the current value and the detected resistance of the photointerrupter, the threshold values of the comparator and the current supplied to the shutter, all of which are stored in the EEPROM, are transmitted to the flash memory.

At step #2505, the shutter is driven by using the control programs for the "initialization operation" and the "coil driving".

A difference of step #2505 from step #2502 is that the programs are not performed by accessing the flash memory and the EEPROM as needed, and when the data stored in the EEPROM are required, data transferred in advance to the flash memory at step #2504 are employed instead of accessing the EEPROM. That is, when the battery check flag is "0", the address used to refer to the data stored in the EEPROM is changed to the address of data transferred to the flash memory by the control programs for the "initialization operation" and the "coil driving". Similarly, for data writing, when the shutter is driven, data to be originally stored in the EEPROM are stored in the flash memory, instead of accessing the EEPROM.

When the control programs are also stored in the EEPROM, naturally these programs are transmitted to the flash memory together with the control data.

At step #2506, when the shutter has been energized and the access of all the memories is enabled, the data temporarily stored in the flash memory are transferred to the EEPROM, and program control returns again to the image taking sequence in FIG. 40.

Referring again to FIG. 40, after the exposure operation is completed, program control advances to step #2308, and the feeding control circuit 408 energizes a feeding motor (not shown) to perform the feeding operation, so that the film is wound.

In the thirteenth embodiment, the shutter driving process during the exposure operation has been explained. However, the exposure operation can also be performed in the same manner during the other camera operation, such as the feeding operation or the strobe charge operation, which requires a large current. The control for the flash memory and the EEPROM has also been explained, and the same control process may be performed for other built-in memories.

Furthermore, while taking into account that the internal resistance of a battery is varied due to the change in the circumference, such as a temperature, the battery check level may be variable in accordance with the change of the circumference.

According to the thirteenth embodiment, a camera that employs a one-chip microcomputer incorporating multiple memories and that stores the control programs and the control data in these memories can be efficiently used even at a low voltage.

A fourteenth embodiment of the present invention will now be described. In this fourteenth embodiment, a camera control apparatus that can be operated at a lower voltage is implemented by varying the operating frequency of a camera in accordance with the battery check determination results. Since the operation sequence of the camera other than the battery check process is the same as that for the thirteenth embodiment, no further explanation for it will be given.

Figure 44:
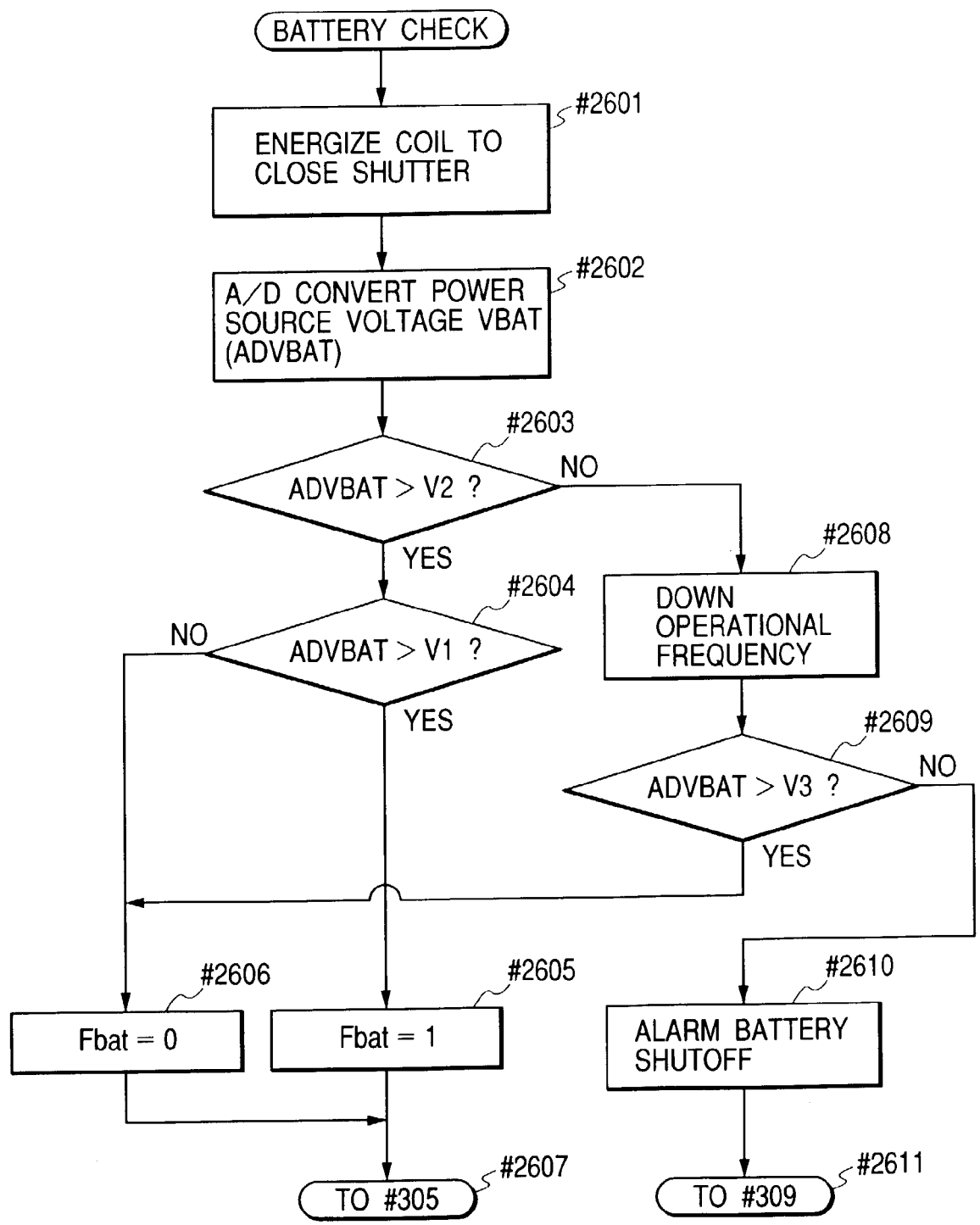
FIG. 44 is a flowchart showing the battery check operation of a camera according to a fourteenth embodiment of the present invention.

The battery check operation according to the fourteenth embodiment of the present invention will now be described while referring to the flowchart in FIG. 44.

When the battery check operation is started, first at step #2601, for a short period of time (e.g., 5 mS) a predetermined amount of current is supplied to a shutter driving coil in the direction in which a shutter is closed. At step #2602, in the state where the shutter has been energized, A/D conversion is performed for the power source voltage VBAT, and the obtained value ADVBAT is stored. At steps #2603 and #2604, a check is performed to determine whether the value ADVBAT by obtaining the A/D conversion for the value VBAT is a battery capacity enough to normally operate the camera.

The determination processes at steps #2603 and #2604 are performed in the same manner as in the thirteenth embodiment. That is, assume that V1 denotes a battery check level whereat it can be guaranteed that, during the camera operation requiring a large current, the power source voltage does not fall below the lowest operating voltages for all the memories, and that V2 denotes a battery check level whereat the operation of the EEPROM can not be guaranteed while the operation of the flash memory can be guaranteed. At step #2603, a check is performed to determine whether the value ADVBAT is greater than V2. When the value ADVBAT is greater than V2, program control advances to step #2604, and a check is performed to determine whether the value ADVBAT is greater than V1. When it is ascertained that the value ADVBAT is greater than V1, program control advances to step #2605. "1" is substituted into the battery check flag Fbat representing that the operation using all the memories is enabled, and program control returns to the image taking sequence in FIG. 40. When the value ADVBAT is equal to or smaller than V1, program control is shifted to step #2606. Since the operation using the EEPROM can not be guaranteed, "0" is substituted into the battery check flag Fbat, and program control returns to the image taking sequence in FIG. 40.

As is explained in the thirteenth embodiment, when the battery check flag represents "1", a predetermined camera operation, such as shutter driving, is performed while appropriately accessing the flash memory and the EEPROM. When the battery check flag represents "0", before the predetermined camera operation such as the shutter driving is performed, the control programs and the control data are transmitted to the flash memory and the camera operation is initiated by using the flash memory.

An explanation will now be given for an example wherein it is ascertained at step #2603, which the essential portion of the fourteenth embodiment, that the value ADVBAT is equal to or smaller than V2.

In this case, since the normal operation at clock 16 MHz is disabled, at step #2608 the operating clock is reduced to 4 MHz, because the memory operation enabled voltage is changed in accordance with the operating frequency. For example, since 2.1 V is the lowest operation enabled voltage for the flash memory at 4 MHz, and 2.5 V is the lowest operation enabled voltage for the EEPROM, the operating frequency is reduced to 4 MHz. Furthermore, the data are transferred from the EEPROM to the flash memory, and the camera operation is performed using the flash memory, so that the battery check level V3 lower than the battery check level V2 is available for the camera operation. In this case, V3 is a battery check level wherein, at the operating frequency of 4 MHz, during the camera operation requiring a large current, the operation of the EEPROM can not be guaranteed but the flash memory can be operated. That is, V3 is a battery check level whereat it is guaranteed that power source voltage will not be reduced to equal to or lower than 2.1 V.

At step #2609, a check is performed to determine whether the value ADVBAT is greater than V3. When the value ADVBAT is equal to or smaller than V3, the camera operation can not be guaranteed, and program control advances to step #2610 whereat "battery shutoff" message is displayed for a user. At step #2611, the camera operation is terminated.

When at step #2609 the value ADVBAT is greater than V3, program control is shifted to step #2606. Since the operation using the EEPROM is not guaranteed while the operation using the flash memory can be operated, "0" is substituted into the battery check flag Fbat, and program control returns to the image taking sequence in FIG. 40. In the photographing sequence, at the operating frequency of 4 MHz, the control programs and the control data are transferred to the flash memory before a predetermined camera operation, such as shutter driving, is initiated, and the camera operation is performed using the flash memory.

According to the fourteenth embodiment, when the battery capacity is sufficient, the camera operation can be performed at a high speed, and when the battery capacity is not sufficient, the operating frequency can be reduced to efficiently perform the camera operation even at a low voltage. Therefore, the camera that can be used for a long time can be provided without the deterioration of the usability.

What is claimed is:

1. A control system comprising:
a plurality of nonvolatile memories in which a plurality of different programs respectively are stored; and
an operating circuit for, in accordance with a function to be processed, reading at least one of said plurality of programs from a corresponding nonvolatile memory, and for processing the program,
wherein, to read and process the programs in accordance with predetermined functions, the operating circuit supplies power only to one of said plurality of nonvolatile memories in which programs corresponding to the predetermined functions are stored.

2. A control system comprising:
a plurality of nonvolatile memories in which a plurality of different programs are stored, and for which different amounts of current are consumed during operation; and
an operating circuit for, in accordance with a function to be processed, reading at least one of said plurality of programs from a corresponding nonvolatile memory, and for processing the program,
wherein, to read and process the programs in accordance with predetermined functions, the operating circuit does not supply power to the nonvolatile memories in which programs corresponding to the predetermined functions are not stored, and for which the amounts of current consumed during operation are equal to or greater than a predetermined amount.

3. A control system comprising:
a plurality of nonvolatile memories in which a plurality of different programs are stored; and
an operating circuit for, in accordance with a function to be processed, reading at least one of said plurality of programs from a corresponding nonvolatile memory and for processing the program,
wherein, during the process for reading the programs stored in the nonvolatile memories, in order to perform predetermined functions, when the predetermined functions require a processing speed equal to or higher than a predetermined value, the operating circuit constantly supplies power to the nonvolatile memories for reading the programs concerning the predetermined functions, and
wherein, when the predetermined functions require a processing speed smaller than the predetermined value, the operating circuit supplies power only to one of said plurality of nonvolatile memories for which the operating circuit is currently reading data.

4. A control system according to claim 3, wherein the processing speed equal to or higher than the predetermined value is determined in accordance with a rising time beginning when the operating circuit started to supply power to one of the nonvolatile memories and continuing until the nonvolatile memories are set so as to be appropriately operated.

5. A control system comprising:
a plurality of nonvolatile memories in which a plurality of different programs are stored; and
an operating circuit for, in accordance with a function to be processed, reading at least one of said plurality of programs from a corresponding nonvolatile memory and for processing the program,
wherein, during the process for reading the programs stored in the nonvolatile memories, in order to perform predetermined functions, when the predetermined functions require a processing speed equal to or higher than a predetermined value, the operating circuit constantly supplies power to the nonvolatile memories for reading the programs concerning the predetermined functions, and
wherein, when the predetermined functions require a processing speed smaller than the predeterinined value, the operating circuit supplies power to a non-rewritable nonvolatile memory and a nonvolatile memory for which the operating circuit is currently reading data.

6. A control system comprising:
a plurality of nonvolatile memories in which a plurality of programs are stored; and
an operating circuit for, in accordance with a function to be processed, reading at least one of said plurality of programs from a corresponding nonvolatile memory and for processing the program,
wherein, during the process for reading the programs stored in the nonvolatile memories in order to perform predetermined functions, the operating circuit supplies power to the nonvolatile memories, and
wherein, when a specific program has been read from a specific nonvolatile memory and there is a predetermined interval before the reading of the next data from the specific memory, the operating circuit halts the supply of power to the specific nonvolatile memory.

7. A control system according to claim 6, wherein, at a predetermined period of time before reading is started, the operating circuit begins to supply power to the nonvolatile memories from which data are to be read.

8. A control system according to claim 7, wherein the predetermined period of time is determined in accordance with a rising time beginning when the operating circuit started to supply power to one ot the nonvolatile memories and continuing until the nonvolatile memories are set so as to be appropriately operated.

9. An electronic apparatus comprising:
a plurality of nonvolatile memories in which a plurality of different programs are stored; and
an operating circuit for, in accordance with a function to be processed, reading at least one of said plurality of programs from a corresponding nonvolatile memory, and for processing the program,
wherein, to read and process the programs in accordance with predetermined functions, the operating circuit supplies power only to one of said plurality of nonvolatile memories in which programs corresponding to the predetermined functions are stored.

10. An electronic apparatus comprising:

a plurality of nonvolatile memories in which a plurality of different programs are stored, and for which different amounts of current are consumed during operation; and an operating circuit for, in accordance with a function to be processed, reading at least one of said plurality of programs from a corresponding nonvolatile memory, and for processing the program, wherein, to read and process the programs in accordance with predetermined functions, the operating circuit does not supply power to the nonvolatile memories in which programs corresponding to the predetermined functions are not stored, and for which the amounts of current consumed during operation are equal to or greater than a predetermined amount.

11. An electronic apparatus comprising:

a plurality of nonvolatile memories in which a plurality of different programs are stored; and an operating circuit for, in accordance with a function to be processed, reading at least one of said plurality of programs from a corresponding nonvolatile memory and for processing the program, wherein, during the process for reading the programs stored in the nonvolatile memories, in order to perform predetermined functions, when the predetermined functions require a processing speed equal to or higher than a predetermined value, the operating circuit constantly supplies power to the nonvolatile memories for reading the programs concerning the predetermined functions, and wherein, when the predetermined functions require a processing speed smaller than the predetermined value, the operating circuit supplies power only to one of said plurality of nonvolatile memories for which the operating circuit is currently reading data.

12. An electronic apparatus comprising:

a plurality of nonvolatile memories in which a plurality of different programs are stored; and an operating circuit for, in accordance with a function to be processed, reading at least one of said plurality of programs from a corresponding nonvolatile memory and for processing the program, wherein, during the process for reading the programs stored in the nonvolatile memories, in order to perform predetermined functions, when the predetermined functions require a processing speed equal to or higher than a predetermined value, the operating circuit constantly supplies power to the nonvolatile memories for reading the programs concerning the predetermined functions, and wherein, when the predetermined functions require a processing speed smaller than the predetermined value, the operating circuit supplies power to a non-rewritable nonvolatile memory and a nonvolatile memory for which the operating circuit is currently reading data.

13. An electronic apparatus comprising:

a plurality of nonvolatile memories in which a plurality of programs are stored; and an operating circuit for, in accordance with a function to be processed, reading at least one of said plurality of programs from a corresponding nonvolatile memory and for processing the program, wherein, during the process for reading the programs stored in the nonvolatile memories in order to perform predetennined functions, the operating circuit supplies power to the nonvolatile memories, and wherein, when a specific program has been read from a specific nonvolatile memory and there is a predetermined interval before the reading of the next data from the specific memory, the operating circuit halts the supply of power to the specific nonvolatile memory.

* * * * *

UNITED STATES PATENT AND TRADEMARK OFFICE
CERTIFICATE OF CORRECTION

PATENT NO. : 7,111,109 B2 Page 1 of 1
APPLICATION NO. : 10/383950
DATED : September 19, 2006
INVENTOR(S) : Takanobu Tsunemiya et al.

It is certified that error appears in the above-identified patent and that said Letters Patent is hereby corrected as shown below:

Column 15, line 55, delete " tAf1 " and insert -- tAF1 --

Column 15, line 61, delete " tAf1 " and insert -- tAF1 --

Column 17, line 48, delete " before At " and insert -- before Δt --

Column 32, line 52, delete " one ot " and insert -- one of --

Signed and Sealed this

Thirtieth Day of October, 2007

JON W. DUDAS
*Director of the United States Patent and Trademark Office*